(12) United States Patent
Kinoshita et al.

(10) Patent No.: US 8,892,280 B2
(45) Date of Patent: Nov. 18, 2014

(54) SPRUNG MASS DAMPING CONTROL SYSTEM OF VEHICLE

(75) Inventors: Gohki Kinoshita, Susono (JP); Koichiro Muta, Okazaki (JP); Toshiya Hashimoto, Miyoshi (JP); Eiji Fukushiro, Nagoya (JP); Takanori Aoki, Nisshin (JP); Akihiro Kimura, Toyota (JP); Shunsuke Oyama, Aichi-gun (JP); Masaya Yamamoto, Toyota (JP); Kaiji Itabashi, Susono (JP); Yoshitaka Oikawa, Susono (JP); Takashi Saito, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 386 days.

(21) Appl. No.: 13/320,439

(22) PCT Filed: May 11, 2010

(86) PCT No.: PCT/IB2010/001069
§ 371 (c)(1),
(2), (4) Date: Nov. 14, 2011

(87) PCT Pub. No.: WO2010/131091
PCT Pub. Date: Nov. 18, 2010

(65) Prior Publication Data
US 2012/0059544 A1 Mar. 8, 2012

(30) Foreign Application Priority Data

May 13, 2009 (JP) ................................. 2009-116945

(51) Int. Cl.
*B60W 30/20* (2006.01)
*B60W 20/00* (2006.01)
(Continued)

(52) U.S. Cl.
CPC ...... *B60G 17/0195* (2013.01); *B60W 2510/244* (2013.01); *B60G 2800/014* (2013.01); *B60G 2800/213* (2013.01); *B60G 2600/187* (2013.01);
(Continued)

(58) Field of Classification Search
CPC .......... B60G 2400/00; B60G 2800/00; B60W 2510/00; Y02T 10/56
USPC ..................... 701/1, 37, 38, 51, 70, 104, 111; 318/139, 400.15, 432, 609
See application file for complete search history.

(56) References Cited

U.S. PATENT DOCUMENTS 5,532,921 A * 7/1996 Katsuda ......................... 701/37
6,018,198 A   1/2000 Tsuzuki et al.
(Continued)

FOREIGN PATENT DOCUMENTS

EP   1 221 394   7/2002
EP   1 637 388   3/2006
(Continued)

OTHER PUBLICATIONS

International Search Report Issued Mar. 3, 2011 in PCT/IB10/001069 Filed May 11, 2010.

Primary Examiner — John R Olszewski
Assistant Examiner — Truc M Do
(74) Attorney, Agent, or Firm — Oblon, Spivak, McClelland, Maier & Neustadt, L.L.P.

(57) ABSTRACT

A sprung mass damping control system of a vehicle, which aims to suppress sprung mass vibration generated in a vehicle body of a vehicle provided with at least a motor-generator (first and second motor-generators) as a drive source, includes a sprung mass damping control amount calculating device that sets a sprung mass damping control amount for suppressing the sprung mass vibration, and a drive source control device (a motor-generator control device) that executes sprung mass damping control by controlling a motor-generator control amount of the motor-generator to realize the sprung mass damping control amount.

15 Claims, 32 Drawing Sheets

(51) Int. Cl.
  *B60G 17/016* (2006.01)
  *B60W 10/08* (2006.01)
  *B60G 17/0195* (2006.01)
  *B60W 10/06* (2006.01)
  *B60K 6/365* (2007.10)
  *B60K 6/445* (2007.10)
  *B60K 1/02* (2006.01)

(52) U.S. Cl.
  CPC ......... *B60G 2600/09* (2013.01); *B60G 2300/50* (2013.01); *B60L 2240/423* (2013.01); *B60W 20/00* (2013.01); *B60G 2500/10* (2013.01); *B60G 2800/85* (2013.01); *B60G 2800/162* (2013.01); *B60G 2400/32* (2013.01); *B60G 2400/204* (2013.01); *B60G 17/0164* (2013.01); *B60G 2600/11* (2013.01); *B60W 10/08* (2013.01); *B60G 2800/922* (2013.01); *B60G 2400/208* (2013.01); *B60K 1/02* (2013.01); *B60G 2800/215* (2013.01); *Y02T 10/6239* (2013.01); *Y02T 10/642* (2013.01); *B60W 2710/083* (2013.01); *B60W 10/06* (2013.01); *B60G 2800/952* (2013.01); *B60G 2400/302* (2013.01); *B60W 2710/0666* (2013.01); *B60G 2800/916* (2013.01); *Y02T 10/56* (2013.01); *Y02T 10/6286* (2013.01); *B60K 6/365* (2013.01); *B60K 6/445* (2013.01); *B60G 2400/34* (2013.01)
  USPC ...... 701/22; 701/1; 701/37; 701/51; 701/104; 318/400.15; 318/432; 318/609; 318/139

(56) References Cited

U.S. PATENT DOCUMENTS

| | | | | |
|---|---|---|---|---|
| 6,055,471 | A * | 4/2000 | Ohsaku et al. | 701/37 |
| 6,314,353 | B1 * | 11/2001 | Ohsaku et al. | 701/37 |
| 6,621,244 | B1 | 9/2003 | Kiyomiya et al. | |
| 6,654,675 | B2 * | 11/2003 | Pedersen et al. | 701/36 |
| 7,493,980 | B2 * | 2/2009 | Hidaka | 180/65.25 |
| 7,759,885 | B2 * | 7/2010 | Yamada et al. | 318/400.15 |
| 7,783,402 | B2 * | 8/2010 | Sawada et al. | 701/38 |
| 8,082,081 | B2 * | 12/2011 | Matsumoto et al. | 701/48 |
| 8,340,864 | B2 * | 12/2012 | Itabashi et al. | 701/37 |
| 8,626,388 | B2 * | 1/2014 | Oikawa | 701/37 |
| 2005/0038576 | A1 * | 2/2005 | Hara et al. | 701/22 |
| 2005/0049761 | A1 * | 3/2005 | Kataoka et al. | 701/1 |
| 2005/0234620 | A1 * | 10/2005 | Roll et al. | 701/37 |
| 2006/0041353 | A1 | 2/2006 | Sawada et al. | |
| 2006/0243501 | A1 | 11/2006 | Hidaka | |
| 2007/0005196 | A1 | 1/2007 | Oikawa et al. | |
| 2007/0118255 | A1 * | 5/2007 | Wakashiro et al. | 701/22 |
| 2007/0225886 | A1 * | 9/2007 | Morris | 701/51 |
| 2007/0225888 | A1 * | 9/2007 | Morris | 701/51 |
| 2007/0225889 | A1 * | 9/2007 | Morris | 701/53 |
| 2008/0051962 | A1 | 2/2008 | Nakai et al. | |
| 2008/0249690 | A1 | 10/2008 | Matsumoto et al. | |
| 2009/0065275 | A1 * | 3/2009 | Akimoto et al. | 180/65.28 |
| 2009/0071736 | A1 | 3/2009 | Mori et al. | |
| 2009/0160380 | A1 | 6/2009 | Yamada et al. | |
| 2010/0004806 | A1 | 1/2010 | Soma | |
| 2010/0127442 | A1 * | 5/2010 | Muragishi et al. | 267/140.14 |
| 2010/0228465 | A1 * | 9/2010 | Itabashi | 701/104 |
| 2010/0241305 | A1 | 9/2010 | Itabashi et al. | |
| 2010/0276896 | A1 * | 11/2010 | Sano | 280/5.509 |
| 2011/0077835 | A1 * | 3/2011 | Otsuka | 701/99 |
| 2012/0059544 | A1 * | 3/2012 | Kinoshita et al. | 701/22 |

FOREIGN PATENT DOCUMENTS

| | | |
|---|---|---|
| EP | 1 717 084 | 11/2006 |
| EP | 1 978 278 | 10/2008 |
| EP | 2 036 794 | 3/2009 |
| JP | 9-84211 A | 3/1997 |
| JP | 11-82261 A | 3/1999 |
| JP | 2004-36428 A | 2/2004 |
| JP | 2004 168148 | 6/2004 |
| JP | 2006 060936 | 3/2006 |
| JP | 2006 069472 | 3/2006 |
| JP | 2008-220129 A | 9/2008 |
| JP | 2009 132380 | 6/2009 |
| WO | 2006 109658 | 10/2006 |
| WO | 2007 086200 | 8/2007 |
| WO | WO 2007086200 A1 * | 8/2007 |
| WO | 2008 050782 | 5/2008 |

* cited by examiner

SPRUNG MASS DAMPING CONTROL SYSTEM OF VEHICLE

INCORPORATION BY REFERENCES

The disclosure of Japanese Patent Applications No. 2009-116945 filed on May 13, 2009, including the specification, drawings and abstract is incorporated herein by references in its entirety.

BACKGROUND OF THE INVENTION

1. Field of the Invention

The invention relates to a sprung mass damping control system of a vehicle, which suppresses sprung mass vibration generated in a body of a vehicle provided with at least a motor-generator as a drive source.

2. Description of the Related Art

Technology referred to as sprung mass damping control that suppresses sprung mass vibration generated in a vehicle body using predetermined vibration damping means is well known. For example, Japanese Patent Application Publication No. 2004-168148 (JP-A-2004-168148) and Japanese Patent Application Publication No. 2006-69472 (JP-A-2006-69472) describe technologies that control the driving force of a vehicle in order to suppress sprung mass vibration in the vehicle. In the technologies described in JP-A-2004-168148 and JP-A-2006-69472, the driving force is controlled by increasing or decreasing the engine torque. To perform this control, these technologies increase or decrease the engine torque as necessary by adjusting the intake air amount, the fuel injection amount, and the ignition timing and the like of the engine.

However, the states of the air and fuel that are supplied to the engine are not always constant. For example, the temperature and humidity of the air changes according to changes in the ambient air temperature and the altitude and the like. Also, with commercially available fuel, there are different types of a given gasoline fuel which differ from one another in terms of their octane numbers, for example, and even with the same type of gasoline fuel, there may be different compositions due to differences in additives and impurities. Furthermore, some engines may be able to use either a gasoline fuel or an alcohol blend, for example. Therefore, the fuel stored in the fuel tank of the vehicle may not necessarily be homogenous fuel. If air of a different temperature or a different type of fuel are supplied, for example, the engine torque that is output will change compared with a case in which air and fuel of given reference states are supplied, even if all of the other conditions are the same. Also, if the air pressure changes due to a change in altitude or the like, the intake air amount will change. Therefore, in this case as well, there will be a difference in the engine torque that is output, even if the other conditions are the same. Moreover, engines have poorer responsiveness for generating the required torque (i.e., engine torque) than motors do. Therefore, the control precision of sprung mass damping control may decease if engine torque is used.

SUMMARY OF THE INVENTION

Thus, in view of the foregoing problems, the invention provides a sprung mass damping control system capable of executing highly precise sprung mass damping control.

Accordingly, a first aspect of the invention relates to a sprung mass damping control system of a vehicle, which aims to suppress sprung mass vibration generated in a vehicle body of a vehicle provided with at least one of a motor-generator, a motor, or a generator capable of operating as motor, as a drive source. This sprung mass damping system includes a sprung mass damping control amount calculating device that sets a sprung mass damping control amount for suppressing the sprung mass vibration; and a drive source control device that executes sprung mass damping control by controlling a motor-generator control amount of the motor-generator or a motor control amount of the motor or the generator to realize the sprung mass damping control amount.

Here, in the sprung mass damping control system described above, when the vehicle is a hybrid vehicle that is also provided with an engine as the drive source, sprung mass damping control may be executed by controlling the motor-generator control amount of the motor-generator or the motor control amount of the motor or the generator even while the engine is operating.

Also, the sprung mass damping control system described above may also include a required vehicle driving amount calculating device that overlaps the sprung mass damping control amount with a required vehicle driving amount when setting a final required vehicle driving amount of a hybrid vehicle that is also provided with an engine as the drive source; an engine control amount calculating device that sets an engine control amount of the engine; and a motor-generator control amount calculating device that calculates the motor-generator control amount of the motor-generator by subtracting the engine control amount from the final required vehicle driving amount, or calculates the motor control amount of the motor or the generator by subtracting the engine control amount from the final required vehicle driving amount.

Further, the sprung mass damping control system described above may also include a required vehicle driving amount calculating device that overlaps the sprung mass damping control amount with the required vehicle driving amount before a basic performance compensating amount of the hybrid vehicle is overlapped with the required vehicle driving amount, when setting a final required vehicle driving amount of a hybrid vehicle that is also provided with an engine as the drive source.

Also, in the sprung mass damping control system described above, when the vehicle is a hybrid vehicle that is also provided with an engine as the drive source, the sprung mass damping control using the motor-generator, the motor, or the generator may be executed in a region where sprung mass damping control is not possible using the engine.

Also, the sprung mass damping control system described above may also include a sprung mass damping control responsiveness compensating device that, when the sprung mass damping control responsiveness decreases due to a smoothing process being performed on the set sprung mass damping control amount, performs a compensating process that compensates for that decrease in order to achieve a desired sprung mass damping control responsiveness.

The compensating process for the sprung mass damping control responsiveness may be a process in which the set sprung mass damping control amount is input to an inverse function of a transfer function of the smoothing process, or a process that compensates for a phase lag amount of the sprung mass damping control amount that results from the smoothing process.

Also, in the sprung mass damping control system described above, i) when the motor-generator control amount is a value that is the same as or close to a voltage increase determining threshold value of a system voltage of an inverter, sprung mass damping control using the motor-generator may be restricted by prohibiting sprung mass damping control using the motor-generator or by reducing the sprung mass damping control amount, or ii) when the motor control amount is a value that is the same as or close to a voltage increase determining threshold value of a system voltage of an inverter, sprung mass damping control using the motor or the generator may be restricted by prohibiting sprung mass damping control using the motor or the generator or by reducing the sprung mass damping control amount.

Also, in the sprung mass damping control system described above, a voltage increase determining threshold value of a system voltage of an inverter may be changed according to whether sprung mass damping control using the motor-generator, the motor, or the generator is being executed.

Also, in the sprung mass damping control system described above, the control mode of sprung mass damping control may be determined according to the usage state of the motor-generator, the motor, or the generator.

For example, the usage state of the motor-generator, the motor, or the generator may be a state in which output of the motor-generator, the motor, or the generator is being used to execute damping control other than the sprung mass damping control.

Also, in the sprung mass damping control system described above, the other damping control may be drive train damping control that suppresses drive train vibration in the vehicle, and when the drive train damping control is executed simultaneously with sprung mass damping control using the motor-generator, the motor, or the generator, sprung mass damping control using the motor-generator, the motor, or the generator may be restricted by prohibiting sprung mass damping control using the motor-generator, the motor, or the generator, or by reducing the sprung mass damping control amount.

Also, in the sprung mass damping control system described above, when the vehicle is a hybrid vehicle that is also provided with an engine as the drive source, sprung mass damping control using the motor-generator, the motor, or the generator may be restricted by prohibiting sprung mass damping control using the motor-generator, the motor, or the generator, or by reducing the sprung mass damping control amount, when a crank angle position is being controlled using output from the motor-generator, the motor, or the generator while the engine is stopped.

Also, in the sprung mass damping control system described above, when motor load ratio restricting control of the motor-generator, the motor, or the generator is being executed, sprung mass damping control using the motor-generator, the motor, or the generator may be restricted by prohibiting sprung mass damping control using the motor-generator, the motor, or the generator, or by reducing the sprung mass damping control amount.

In the sprung mass damping control system described above, when there is a possibility of resonance that accompanies execution of the sprung mass damping control being amplified, sprung mass damping control using the motor-generator, the motor, or the generator may be restricted by prohibiting sprung mass damping control using the motor-generator, the motor, or the generator, or by reducing the sprung mass damping control amount.

In the sprung mass damping control system described above, there may be a possibility of resonance that accompanies execution of the sprung mass damping control being amplified when the speed of the drive source is within a predetermined range.

Also, in the sprung mass damping control system described above, there may be a possibility of resonance that accompanies execution of the sprung mass damping control being amplified when, if the vehicle is a hybrid vehicle that is also provided with an engine as the drive source, i) there is a misfire in the engine, ii) catalyst degradation suppressing control of the engine is being executed, or iii) the speed of the engine is being controlled by the output of the motor-generator, the motor, or the generator.

In the sprung mass damping control system described above, the sprung mass damping control may be restricted by filtering an input signal to the sprung mass damping control amount calculating device at a predetermined frequency.

The sprung mass damping control system of a vehicle according to this invention executes sprung mass damping control using output from the motor-generator, which enables sprung mass damping control that is more precise than sprung mass damping control performed using output from the engine to be performed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiments of the sprung mass damping control system of a vehicle according to the invention will be described in greater detail below with reference to the accompanying drawings, but the invention is not limited to these example embodiments.

First, a sprung mass damping control system of a vehicle according to a first example embodiment of the invention will be described with reference to FIGS. 1 to 8.

A vehicle to which the sprung mass damping control system according to the first example embodiment can be applied is a vehicle that is provided with at least a motor-generator as a drive source. The vehicle may be a so-called hybrid vehicle that also has an engine as a drive source, or an electric vehicle that has only a motor-generator as the drive source. In this first example embodiment, the vehicle described is a hybrid vehicle.

Figure 1:
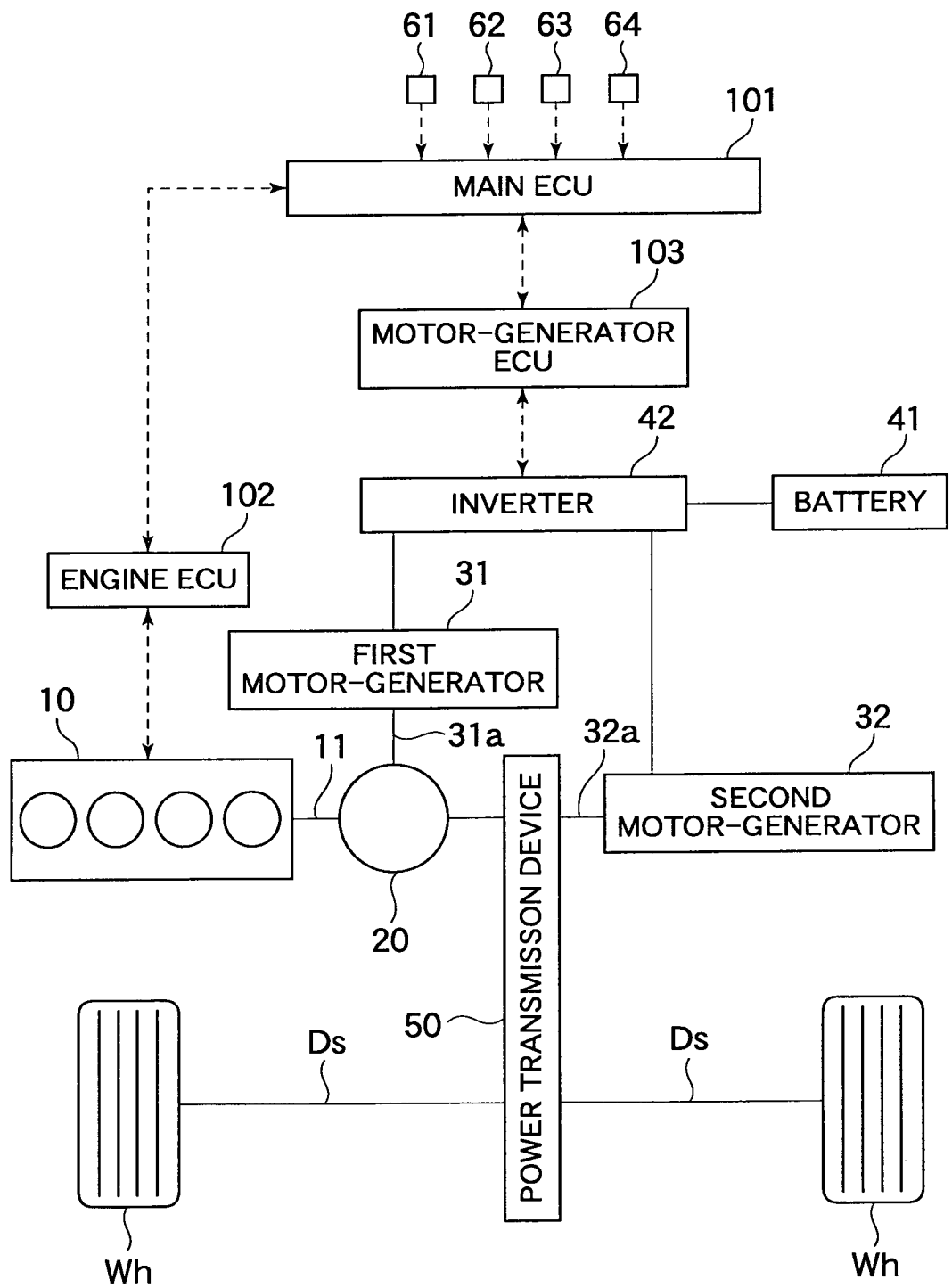
FIG. 1 is a diagram of one example of a vehicle to which the sprung mass damping control system according to the invention is applied.

The hybrid vehicle described here is provided with an engine 10, a power split device 20, a first motor-generator 31, a second motor-generator 32, and a power transmission device 50, as shown in FIG. 1. The power split device 20 splits (i.e., distributes) engine torque output from the engine 10. The first motor-generator 31 operates mainly as a generator using some of the engine torque distributed by the power split device 20 (hereinafter this torque will be referred to as "first split torque"). The second motor-generator 32 operates mainly as a motor using the power generated by the first motor-generator 31 and/or power from a battery 41. The power transmission device 50 transmits output torque from the drive source to driving wheels Wh and Wh (i.e., drive shafts (Ds and Ds).

The hybrid vehicle is also provided with an electronic control unit 101 that controls the operation of the entire vehicle (hereinafter, this electronic control unit will be referred to as the "main ECU 101"), an electronic control unit 102 that controls the operation of the engine 10 (hereinafter, this electronic control unit will be referred to as the "engine ECU 102"), and an electronic control unit 103 that controls the operation of both the first motor-generator 31 and the second motor-generator 32 (hereinafter, this electronic control unit will be referred to as the "motor-generator ECU 103"). The main ECU 101 is connected to the engine ECU 102 and the motor-generator ECU 103, such that signals and commands, such as detections signals from various sensors and control commands, can be transmitted between them. The main ECU 101, the engine ECU 102, and the motor-generator ECU 103 are each formed of, for example, a CPU (Central Processing Unit), ROM (Read Only Memory) in which predetermined control programs and the like are stored in an advance, RAM (Random Access Memory) that temporarily stores the calculation results of the CPU, and backup RAM which stores information such as map data that has been prepared in advance, none of which are shown. The sprung mass damping control system of a vehicle according to this first example embodiment is formed of the main ECU 101, the engine ECU 102, and the motor-generator ECU 103.

The engine 10 is a heat engine such as an internal combustion engine or an external combustion engine that converts heat energy into mechanical energy. As an example in this case, the engine 10 is an internal combustion engine that is a reciprocating piston engine in which pistons are forced back and forth by combusting fuel in a combustion chamber, not shown, so as to generate mechanical power (i.e., engine torque) in an output shaft (i.e., a crankshaft) 11.

The engine 10 is provided with an electronically controlled throttle device, a fuel injection device, and an ignition device, and the like, none of which are shown. These devices are controlled by the engine ECU 102. In this first example embodiment, the main ECU 101 sets the control amount of the engine 10 (i.e., the engine control amount as the driving control amount), and the engine ECU 102, which receives information regarding the engine control amount from the main ECU 101, controls the engine 10. That is, the main ECU 101 includes an engine control amount calculating device that sets the engine control amount, and the engine ECU 102 includes an engine control device that serves as a drive source control device that controls the engine 10. The engine control amount refers to the required engine torque Ter to be generated at the output shaft 11, and the required engine speed Ner when generating this required engine torque Ter.

Figure 2:
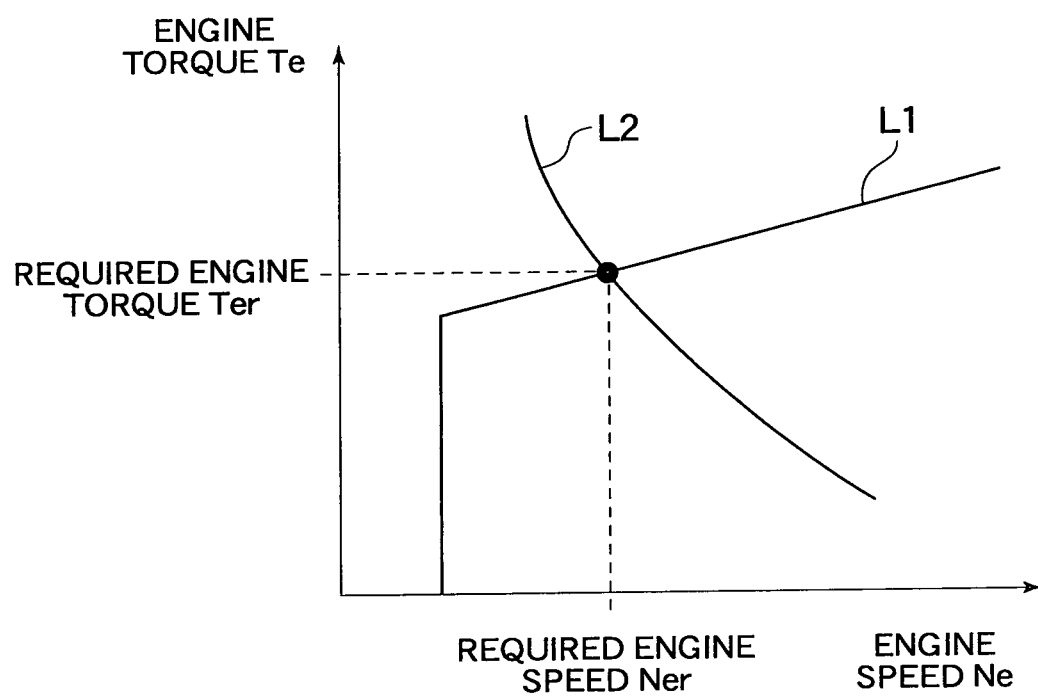
FIG. 2 is a view of an example of an engine control map.

The engine control amount calculating device of the main ECU 101 sets the required engine torque Ter and the required engine speed Ner using the engine control map shown in FIG. 2, for example.

The engine control map shown in FIG. 2 is one example of map data indicative of operating points of the engine 10 that correspond to the engine speed Ne and the engine torque Te, for deriving operating points (Ne and Te) for generating required engine power Per while maintaining fuel efficiency. This engine control map has a fuel efficiency line L1 plotted by combinations of the engine speed Ne and the engine torque Te which exhibit good fuel efficiency characteristics of the engine 10, and a constantly required engine power line L2 plotted by combinations of the engine speed Ne and the engine torque Te which generate the required engine power Per. The engine control amount calculating device obtains as an operating point the point of intersection of the fuel efficiency line L1 and the constantly required engine power line L2 according to the required engine power Per on this engine control map, and sets the engine speed Ne and the engine torque Te at that point of intersection as the required engine speed Ner and the required engine torque Ter.

Here, this required engine power Per is obtained based on the driving torque Twr at the driving wheels Wh and Wh (i.e., the drive shafts Ds and Ds) corresponding to the driving force required by the driver (hereinafter, referred to as the "driver required torque"), the angular velocity ω0 of the driving wheels Wh and Wh which is detected by a wheel speed sensor 62 or the vehicle speed V which is detected by a vehicle speed sensor 61, and the SOC (state-of-charge) of the battery 41. The driving force required by the driver refers to the accelerator operation amount θa detected by an accelerator operation amount sensor 63, for example. Also, the motor-generator ECU 103 ascertains the SOC of the battery 41 via an inverter 42, and outputs this information to the main ECU 101. The required engine power Per is calculated by the engine control amount calculating device of the main ECU 101.

The main ECU 101 is connected to the vehicle speed sensor 61, the wheel speed sensor 62, and the accelerator operation amount sensor 63. Also, the main ECU 101 receives information regarding the shift position SHp of a transmission from a shift position sensor 64. In this hybrid vehicle, the power split device 20 functions as the transmission. The driver required torque calculating device of the main ECU 101 obtains the driver required torque Twr based on the accelerator operation amount θa, the shift position SHp, and the vehicle speed V or the angular velocity ω0 of the driving wheels Wh and Wh. Also, when using the detection signal from the vehicle speed sensor 61, the engine control amount calculating device of the main ECU 101 obtains the angular velocity ω0 of the driving wheels Wh and Wh (i.e., the drive shafts Ds and Ds) based on that detection signal. The engine control amount calculating device then obtains the required engine power Per by multiplying the driver required torque Twr by the angular velocity ω0, and adding a correction power Pbat that corresponds to the information of the SOC of the battery 41 to the product. This correction power Pbat results in an increase in the amount of the first split torque by the amount of the correction power Pbat, and thus an increase in the amount of power generated by the first motor-generator 31 by the amount of the correction power Pbat. Therefore, this correction power Pbat increases as the required SOC of the battery 41 increases, for example.

The engine control amount calculating device outputs information related to the required engine torque Ter and the required engine speed Ner calculated and set as described above to the engine ECU 102. The engine control device of the engine ECU 102 controls the throttle opening amount and the like to realize the set required engine torque Ter and the set required engine speed Ner. As a result, the engine 10 rotates the output shaft 11 at the required engine speed Ner and generates the required engine torque Ter.

The first and second motor-generators 31 and 32 are structured as well-known synchronous motor-generators able to be driven as a motor or a generator, and send or receive power to or from the battery 41 via the inverter 42. The inverter 42 is controlled by a motor-generator control device, which functions as a drive source control device, of the motor-generator ECU 103.

For example, when generating the required vehicle driving torque Tdr as the required vehicle driving amount at the driving wheels Wh and Wh using only the motor-generator torque (more specifically, the output torque generated by the motor-generator operating as a motor), the motor-generator control amount calculating device of the main ECU 101 obtains a target motor-generator torque for the second motor-generator 32 based on that required vehicle driving torque Tdr and the gear ratio of the power transmission device 50. This target motor-generator is the required motor-generator torque Tmg2r of the second motor-generator 32. The motor-generator control amount calculating device then instructs the motor-generator ECU 103 to control the inverter 42 so that the second motor-generator 32 generates that required motor-generator torque Tmg2r. As a result, the second motor-generator 32 outputs that required motor-generator torque Tmg2r (in this case, the output torque of the motor-generator operating as a generator), and generates the required vehicle driving torque Tdr at the driving wheels Wh and Wh.

The required vehicle driving torque Tdr refers to the vehicle driving torque ultimately required at the driving wheels Wh and Wh, and is set by the required vehicle driving torque calculating device, which serves as the required vehicle driving amount calculating device, of the main ECU 100. For example, the required vehicle driving torque Tdr is mainly torque that takes into account the HV basic performance compensation amount required to compensate for a decrease in the basic performance required of the hybrid vehicle (hereinafter, referred to as the "HV basic performance"). This HV basic performance includes, for example, drivability, gear grinding noise and vibration performance (so-called "sound vibration performance"), battery input/output, power input/output between the engine 10 and the motor-generator (i.e., the first and second motor-generators 31 and 32) in order to keep the battery input/output within a specified range, and the protection of parts and the like. Also, the HV basic performance compensation amount is a value set according to the difference between the current vehicle state and the HV basic performance, and is for example a correction coefficient or a correction value necessary for maintaining the HV basic performance. The required vehicle driving torque calculating device includes an HV basic performance maintaining portion. If the vehicle state falls outside of the HV basic performance, this HV basic performance maintaining portion sets the HV basic performance compensation amount according to the difference between the current vehicle state and the HV basic performance. This HV basic performance compensation amount is prepared as map data in advance, and may be derived from this map data using the current vehicle state, e.g., the vehicle speed and the SOC of the battery 41 or the like, as parameters. The required vehicle driving torque calculating device multiplies the driver required torque Twr by a correction coefficient, or divides the driver required torque Twr by a correction coefficient, or adds a correction coefficient to the driver required torque Twr, or subtracts a correction coefficient from the driver required torque Twr, and sets a required vehicle driving torque Tdr in which that driver required torque Twr has been increased or decreased to a value that can maintain the HV basic performance. Incidentally, the hybrid vehicle may also be a four-wheel-drive vehicle in which either the front wheels or the rear wheels are driven by the engine and the other wheels are driven by the motor-generator.

Here, in this hybrid vehicle, braking force may be applied to the controlled wheels such as the driving wheels Wh and Wh to stabilize the vehicle behavior. Also, the driver may switch from an accelerator operation to a brake operation. In this case, braking torque Tb corresponding to the required braking force is applied to the driving wheels Wh and Wh. Therefore, when braking force is generated, the braking torque Tb is subtracted from the driver required torque Twr and the HV basic performance compensation amount is determined according to this subtracted value.

The power split device 20 is formed as a planetary gear set that has a sun gear which is a gear with external teeth, a ring gear which is a gear with internal teeth that is arranged concentric with the sun gear, a plurality of pinions that are in mesh with both the sun gear and the ring gear, and a planetary carrier that pivotally and rotatably retains these pinions, none of which are shown. This power split device 20 performs a differential operation, with the sun gear, the ring gear, and the planetary carrier serving as rotating elements. The sun gear is coupled to a rotating shaft 31a of the first motor-generator 31. The ring gear is coupled via a ring gear shaft to a reduction gear of the power transmission device 50 which is formed of a reduction gear and a differential gear unit and the like. In this power transmission device 50, the reduction gear is coupled to a rotating shaft 32a of the second motor-generator 32, and the differential gear unit is coupled to the drive shafts Ds and Ds of the driving wheels Wh and Wh. Also, the planetary carrier is coupled to the output shaft 11 of the engine 10.

In the power split device 20, the engine torque is distributed and transmitted via the planetary carrier to the sun gear and the ring gear which are in mesh with the pinions that are supported on the planetary carrier. This distribution ratio is determined by the gear ratio of the sun gear and the ring gear. The first split torque is transmitted to the sun gear, and the rest of the engine torque (hereinafter, referred to as the "second split torque") is transmitted to the ring gear.

The first split torque that is transmitted to the sun gear makes the first motor-generator 31 operate as a generator. At this time, the power generated by the first motor-generator 31 is output to the inverter 42, after which it is used to charge the battery 41 or supplied to the second motor-generator 32. The second split torque that is transmitted to the ring gear is used to directly drive the drive shafts Ds and Ds via the power transmission device 50. Also, this power split device 20 can also be used to control the amount of engine torque by adjusting the motor-generator torque Tmg1 of the first motor-generator 31.

Figure 3:
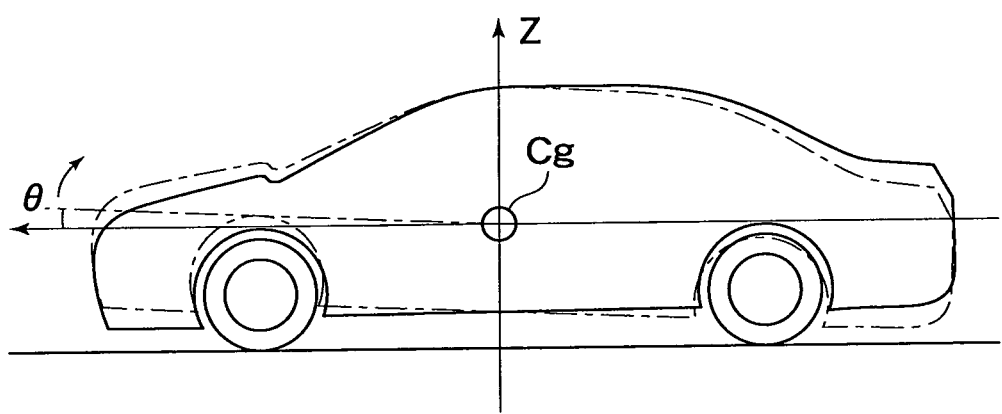
FIG. 3 is a view illustrating state variables of sprung mass vibration of the sprung mass damping control system according to the invention.

In this hybrid vehicle, when external force or torque (i.e., disturbance) is applied to the wheels of the hybrid vehicle due to dips and bumps in the road and the like when the hybrid vehicle is traveling, that external force and the like is transmitted to the vehicle body via the wheels and suspension, not shown. Therefore, input from the road while the vehicle is traveling may cause vibrations of 1 to 4 Hz, or more accurately, approximately 1.5 Hz, in the vehicle body via the wheels and suspension. This sprung mass vibration has two components, i.e., a component in the vertical direction (Z direction) of the hybrid vehicle (the vehicle center of gravity Cg, strictly speaking) (hereinafter, this component will be referred to as "bounce vibration"), and a component in the pitch direction ($\theta$ direction) about the vehicle center of gravity Cg (hereinafter, this component will be referred to as "pitch vibration"), as shown in FIG. 3. When sprung mass vibration occurs, at least one of bounce vibration or pitch vibration is generated. Incidentally, FIG. 3 shows an example of the posture of the hybrid vehicle during nose lift. Also, similar sprung mass vibration (i.e., at least one of bounce vibration or pitch vibration) may also be generated in the hybrid vehicle if the engine 10 or the first and second motor-generators 31 and 32, which serve as vehicle drive apparatuses, start to operate based on the driving force required by the driver or the like such that there is a fluctuation in the wheel torque (i.e., the wheel driving force) of the driving wheels Wh and Wh.

The hybrid vehicle according to this first example embodiment has a sprung mass damping control system that performs sprung mass damping control to suppress sprung mass vibration. The sprung mass damping control system in this first example embodiment aims to suppress sprung mass vibration generated in the vehicle body by adjusting the motor-generator torque Tmg2 of the second motor-generator 32 to increase or decrease the wheel torque of the driving wheels Wh and Wh. This sprung mass damping control system is formed by the main ECU 101, the engine ECU 102, and the motor-generator ECU 103, as described above.

Figure 4A:
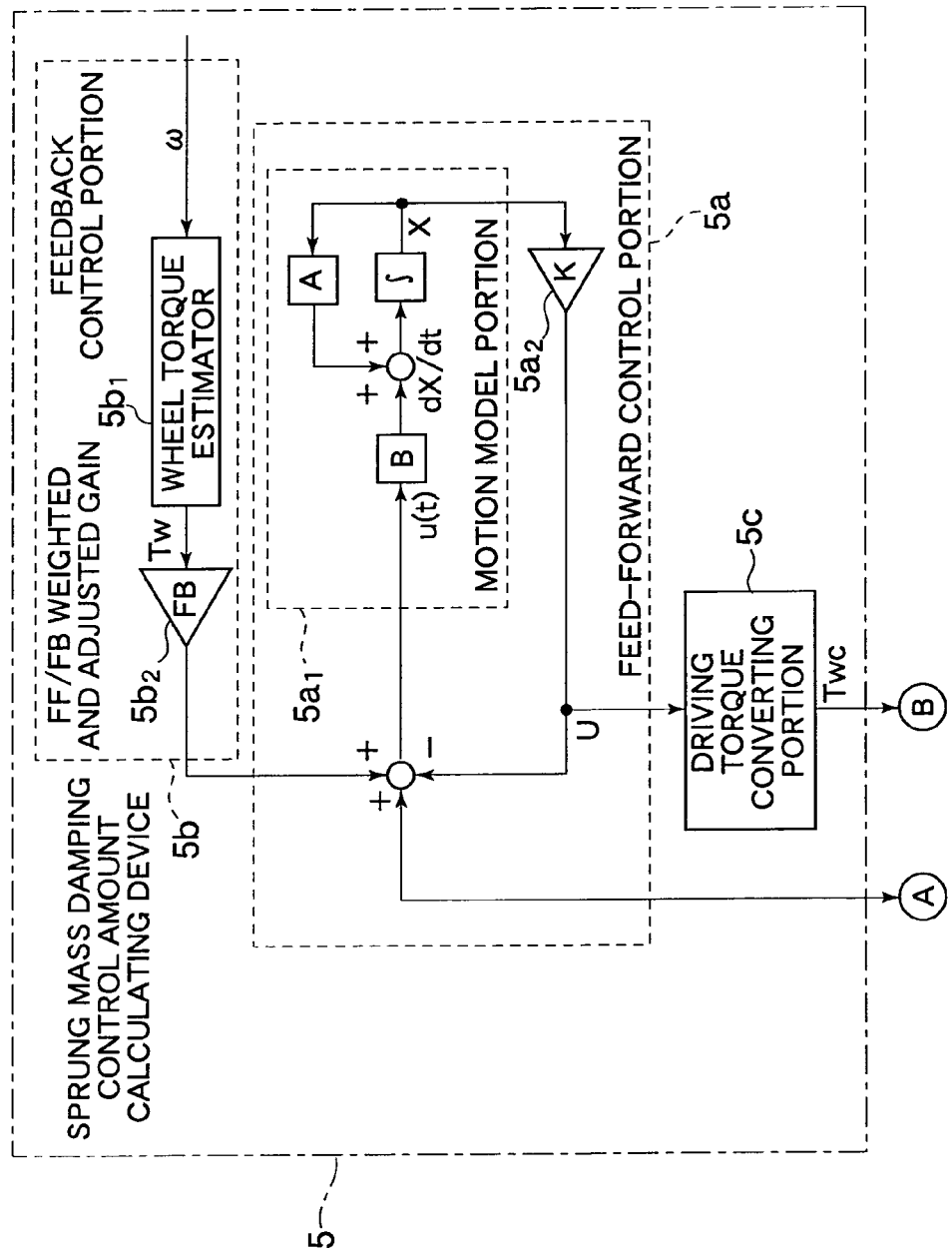
FIGS. 4A and 4B are views in the form of control blocks showing frame formats of an example of the functional structure of a sprung mass damping control system according to a first example embodiment of the invention.
Figure 4B:
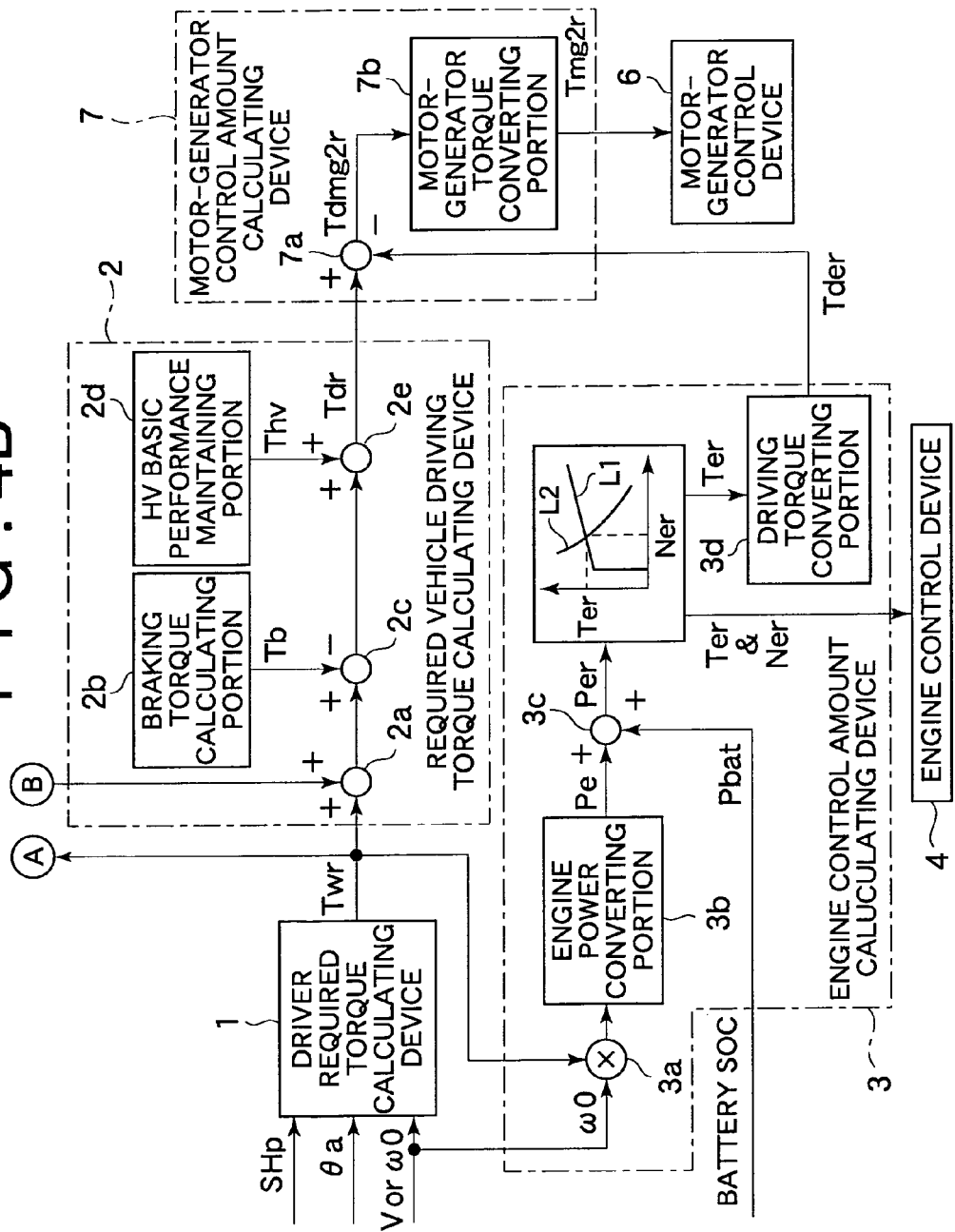

FIGS. 4A and 4B are control block diagrams showing frame formats of the structure of this sprung mass damping control system.

This sprung mass damping control system has a driver required torque calculating device 1, a required vehicle driving torque calculating device 2, an engine control amount calculating device 3, an engine controlling device 4, a sprung mass damping control amount calculating device 5, a motor-generator controlling device 6, and a motor-generator control amount calculating device 7. The driver required torque calculating device 1 sets the driver required torque Twr at the driving wheels Wh and Wh corresponding to the driving force required by the driver. The required vehicle driving torque calculating device 2 obtains the vehicle driving torque (i.e., the required vehicle driving torque Tdr) ultimately required at the driving wheels Wh and Wh of the hybrid vehicle. The engine control amount calculating device 3 sets the engine control amount (i.e., the required engine torque Ter and the required engine speed Ner) corresponding to that driver required torque Twr and the like. The engine control device 4 controls the engine 10 based on that engine control amount.

The sprung mass damping control amount calculating device 5 sets the sprung mass damping control amount for suppressing sprung mass vibration of the vehicle body (i.e., bounce vibration and pitch vibration). The motor-generator control device 6 functions as a sprung mass damping control executing device that executes sprung mass damping control by adjusting the motor-generator torque. The motor-generator control amount calculating device 7 sets that motor-generator torque (i.e., the motor-generator control amount as the driving control amount). As described above, the driver required torque calculating device 1, the required vehicle driving torque calculating device 2, the engine control amount calculating device 3, and the motor-generator control amount calculating device 7 are provided in the main ECU 101. Also, the engine control device 4 is provided in the engine ECU 102, and the motor-generator control device 6 is provided in the motor-generator ECU 103. In this first example embodiment, the sprung mass damping control amount calculating device 5 is provided in the main ECU 101.

As shown in FIG. 4B as well, the driver required torque calculating device 1 obtains the driver required torque Twr based on the shift position SHp, the accelerator operation amount θa, and the vehicle speed or the angular velocity ω0 of the driving wheels Wh and Wh. This driver required torque Twr is the wheel torque that is generated at the driving wheels Wh and Wh to obtain the driving force required by the driver, and is vehicle driving torque that corresponds to the driving force required by the driver. This driver required torque Twr is transmitted to the required vehicle driving torque calculating device 2, the engine control amount calculating device 3, and the sprung mass damping control amount calculating device 5.

The required vehicle driving torque calculating device 2 includes an adder 2a that receives driver required torque Twr and the sprung mass damping control amount (i.e., sprung mass damping control torque Twc which will be described later) that is set by the sprung mass damping control amount calculating device 5. This adder 2a adds the sprung mass damping control torque Twc to the driver required torque Twr. The added value is the required vehicle driving torque Td for the driving wheels Wh and Wh to achieve both the driving force required by the driver and sprung mass damping control. If the sprung mass damping control torque Twc is a positive value, the required vehicle driving torque Td is greater than the driver required torque Twr. If on the other hand the sprung mass damping control torque Twc is a negative value, the required vehicle driving torque Td is less than the driver required torque Twr.

Also, the required vehicle driving torque calculating device 2 has a braking torque calculating portion 2b that sets the braking torque Tb described above, and a subtracter 2c that subtracts this braking torque Tb from the required vehicle driving torque Td obtained by the adder 2a. Therefore, when braking force is generated, the subtracted value in the subtracter 2c is set as the required vehicle driving torque Td (i.e., Td←Td−Tb). Incidentally, when braking force is not generated, the braking torque Tb is 0 so even after the subtracter 2c, the sum obtained in the adder 2a is the required vehicle driving torque Td.

Also, the required vehicle driving torque calculating device 2 is provided with a HV basic performance maintaining portion 2d that obtains the HV basic performance maintaining value described above. For example, in this case, it is assumed that a correction value which is added to the required vehicle driving torque Td that has been through the subtracter 2c is obtained as the HV basic performance maintaining value. The HV basic performance maintaining value Thy is obtained as a positive or negative value according to the current vehicle state and the HV basic performance. The required vehicle driving torque calculating device 2 is provided with an adder 2e which adds the required vehicle driving torque Td that has been through the subtracter 2c to the HV basic performance maintaining value Thy. Therefore, the added value of the adder 2e becomes the required vehicle driving torque Td for the driving wheels Wh and Wh (i.e., Td←Td+Thy). Then the required vehicle driving torque calculating device 2 sets the required vehicle driving torque Td that has been through the adder 2e as the final required vehicle driving torque Tdr. This final required vehicle driving torque Tdr is the vehicle driving torque at the driving wheels Wh and Wh that is able to satisfy all of i) the driving force required by the driver, ii) sprung mass damping control, and iii) HV basic performance. In this first example embodiment, this final required vehicle driving torque Tdr is output to the motor-generator control amount calculating device 7.

As described above, the driver required torque Twr is also input to the engine control amount calculating device 3. In this first example embodiment, the engine control amount (i.e., the required engine torque Ter and the required engine speed Ner) corresponding to the driver required torque Twr is set by the engine control amount calculating device 3, and the driving force corresponding to the driving force required by the driver is generated by the output of the engine 10.

The engine control amount calculating device 3 also receives information related to the vehicle speed V or the angular velocity ω0 of the driving wheels Wh and Wh, and information related to the SOC of the battery 41. The engine control amount calculating device 3 multiplies the angular velocity ω0 of the driving wheels Wh and Wh by the driver required torque Twr with a multiplier 3a. The multiplied value is the required vehicle power at the driving wheels Wh and Wh. This engine control amount calculating device 3 converts that multiplied value into engine power Pe in an engine power converting portion 3b. The engine power converting portion 3b takes the gear ratio of the power transmission apparatus such as the power transmission device 50 and the power split mechanism 20 into account at the time of this conversion. This engine control amount calculating device 3 obtains the required engine power Per for the engine 10 by adding the correction power Pbat that corresponds to the information related to the SOC of the battery 41 to the engine power Pe in the adder 3c. Then the engine control amount calculating device 3 checks the required engine power Per on the engine control map in FIG. 2 described above, and obtains the engine control amount (i.e., the required engine torque Ter and the required engine speed Ner). The required engine torque Ter and the required engine speed Ner are then output to the engine control device 4. Also, the required engine torque Ter is converted into required vehicle driving torque Tder from the engine output at the driving wheels Wh and Wh with a driving torque converting portion 3d. This driving torque converting portion 3d takes the gear ratio of the power transmission apparatus into account at the time of this conversion. The required vehicle driving torque Tder from the engine output is output to the motor-generator control amount calculating device 7.

The engine control device 4 controls the throttle opening amount and the like to achieve the received engine control amount (i.e., the required engine torque Ter and the required engine speed Ner) so that driving force corresponding to the driving force required by the driver is generated in the vehicle.

The sprung mass damping control in the first example embodiment is executed by obtaining the sprung mass damping control amount for suppressing sprung mass vibration generated in the vehicle body, and generating this sprung mass damping control amount in the vehicle body using the motor-generator torque Tmg2 of the second motor-generator 32, as described above. This sprung mass damping control amount may be obtained using a well-known method in this technical field, and is calculated by the sprung mass damping control amount calculating device 5. For example, a motion model of the sprung mass vibration (i.e., bounce vibration and pitch vibration) of the vehicle is created, and the sprung mass damping control amount calculating device 5 calculates the state variables of the sprung mass vibration with this motion model. These state variables of the sprung mass vibration are i) the displacements z and θ of the vehicle body when the driver required torque Twr at the driving wheels Wh and Wh corresponding to the driving force required by the driver (i.e., the required wheel torque of the driving wheels Wh and Wh corresponding to the driving force required by the driver) and the current wheel torque at the driving wheels Wh and Wh (more specifically, the estimated value of that wheel torque) are input to the motion model, and the rate of changes dz/dt and dθ/dt of those displacements. This sprung mass damping control amount calculating device 5 obtains the wheel torque of the driving wheels Wh and Wh that brings the state variables of the sprung mass vibration to 0 or the minimum value, and then sets this as the sprung mass damping control torque Twc (i.e., the sprung mass damping control amount).

More specifically, the sprung mass damping control amount calculating device 5 is provided with a feed-forward control portion 5a and a feedback control portion 5b.

The feed-forward control portion 5a has the structure of a so-called optimum regulator, and includes a motion model portion $5a_1$ and a driver required torque correcting portion $5a_2$. In this feed-forward control portion 5a, the driver required torque Twr is input to the motion model portion $5a_1$ of the sprung mass vibration of the vehicle body. This motion model portion $5a_1$ is used to calculate the response of the state variables of the vehicle body with respect to the input driver required torque Twr. Also, the driver required torque correcting portion $5a_2$ is used to calculate a correction amount of the driver required torque Twr to minimize those state variables.

The feedback control portion 5b also has the structure of an optimum regulator. In this feedback control portion 5b, the wheel torque estimated value Tw at the driving wheels Wh and Wh is calculated by a wheel torque estimator $5b_1$, as will be described later. Then FB gain (i.e., gain for adjusting the balance of the contribution of the wheel torque estimated value Tw and the driver required torque Twr in the motion model portion $5a_1$) is multiplied by that wheel torque estimated value Tw.

The wheel torque estimated value Tw that has been multiplied by the FB gain is then added to the driver required torque Twr in the feed-forward control portion 5a and to the motion model portion $5a_1$ as disturbance input. As a result, the correction amount of the driver required torque Twr for the disturbance is also calculated in this feed-forward control portion 5a.

In this way, in this sprung mass damping control, an equation-of-state of the state variables of the bounce direction and the pitch direction into which the driver required torque Twr and the wheel torque estimated value Tw (i.e., the disturbance) has been input is formed assuming a dynamic motion model of the sprung mass vibration (i.e., bounce vibration and pitch vibration) of the vehicle body. Then in this sprung mass damping control, an input (torque value) that brings the state variables of the bounce direction and the pitch direction to 0 using the theory of the optimum regulator is determined from that equation-of-state, and that torque value is made the sprung mass damping control amount (i.e., sprung mass damping control torque Twc).

An example of this dynamic motion model is a model in which the vehicle body is regarded as mass M and a rigid body S of the inertia moment I, and this rigid body S is supported by front-wheel suspension with a modulus of elasticity kf and an attenuation rate cf, and rear-wheel suspension with a modulus of elasticity kr and an attenuation rate cr (a sprung mass vibration model for the vehicle body). The equation of motion in the bounce direction and the equation of motion in the pitch direction at the vehicle center of gravity Cg in this case may be as illustrated in Expressions 1 and 2 below, respectively.

[Expression 1]

$$M\frac{d^2 z}{dt^2} = -kf(z + Lf \times \theta) - cf\left(\frac{dz}{dt} + Lf \times \frac{d\theta}{dt}\right) - kr(z - Lr \times \theta) - cr\left(\frac{dz}{dt} - Lr \times \frac{d\theta}{dt}\right) \quad (1)$$

[Expression 2]

$$I\frac{d^2 \theta}{dt^2} = -Lf\left\{kf(z + Lf \times \theta) + cf\left(\frac{dz}{dt} + Lf \times \frac{d\theta}{dt}\right)\right\} + Lr\left\{kr(z - Lr \times \theta) + cr\left(\frac{dz}{dt} - Lr \times \frac{d\theta}{dt}\right)\right\} + \frac{h}{r} \times T \quad (2)$$

In Expressions 1 and 2, Lf and Lr represent the distance from the vehicle center of gravity Cg to the front axle and the rear axle, respectively, and r represents the wheel radius. Also, h represents the distance from the road surface to the vehicle center of gravity Cg. Incidentally, in Expression 1, the first and second terms are components of force from the front axle, and the third and fourth terms are components of the force from the rear axle. Further, in Expression 2, the first term is the moment component of the force from the front axle, and the second term is the moment component of the force from the rear axle. Also, the third term in Expression 2 is the moment component of the force applied by the wheel torque T (=Twr+Tw) generated at the driving wheels Wh and Wh about the vehicle center of gravity Cg.

Expressions 1 and 2 can be rewritten in the form of an equation-of-state (of a linear system) as shown in Expression 3 below, with the displacements of the vehicle body z and θ and the rate of changes dz/dt and dθ/dt of those displacements as the state variable vector X(t).

[Expression 3]

$$dX(t)/dt = A \times X(t) + B \times u(t) \quad (3)$$

In Expression 3, X(i), A, and B are as illustrated below.

[Expression 4]

$$X(t) = \begin{pmatrix} z \\ \frac{dz}{dt} \\ \theta \\ \frac{d\theta}{dt} \end{pmatrix},\ A = \begin{pmatrix} 0 & 1 & 0 & 0 \\ a1 & a2 & a3 & a4 \\ 0 & 0 & 0 & 1 \\ b1 & b2 & b3 & b4 \end{pmatrix},\ B = \begin{pmatrix} 0 \\ 0 \\ 0 \\ p1 \end{pmatrix}$$

The elements a1 to a4 and b1 to b4 in matrix A are provided by Expressions 1 and 2, respectively, by combining the coefficients of z, θ, dz/dt, and dθ/dt, such that
a1=−(kf+kr)/M,
a2=−(cf+cr)/M,
a3=−(kf×Lf−kr×Lr)/M, $a4=-(cf \times Lf-cr \times Lr)/M$,
$b1=-(Lf \times kf-Lr \times kr)/I$,
$b2=-(Lf \times cf-Lr \times cr)/I$,
$b3=-(Lf^2 \times kf+Lr^2 \times kr)/I$,
$b4=-(Lf^2 \times cf+Lr^2 \times cr)/I$.

Also, u(t) in Expression 3 above is shown in Expression 5 below, and is the input of the linear system shown by Expression 3.
[Expression 5]

$$u(t)=T \quad (5)$$

Therefore, from Expression 2 above, element p1 in matrix B can be expressed by Expression 6 below.
[Expression 6]

$$p1=h/(I \times r) \quad (6)$$

If u(t) in Expression 3 (an equation-of-state) above is as shown in Expression 7 below, then Expression 3 can be written as shown in Expression 8 below.
[Expression 7]

$$u(t)=-K \times X(t) \quad (7)$$

[Expression 8]

$$dX(t)/dt=(A-B \times K) \times X(t) \quad (8)$$

Therefore, when the initial value $X_0(t)$ of X(t) is set to $X_0(t)=(0, 0, 0, 0)$ (assuming that there is no vibration before torque is input) and the differential equation (Expression 8) of the state variable vector X(t) is solved, the torque value u(t) that suppresses sprung mass vibration is determined by determining the gain K that brings X(t), i.e., the displacement in the bounce direction and the pitch direction and the amount of that time rate of change, to 0.

The gain K can be determined using the theory of the so-called optimum regulator. According to this theory, when the value of an evaluation function J (with an integration range of 0 to infinity) in quadratic form in Expression 9 is minimized, X(t) stably converges in the equation-of-state (Expression 3) and the matrix K that minimizes the evaluation function J is applied, as shown in Expression 10 below, which is known.
[Expression 9]

$$J=\int(X^T \times Q \times X+u^T \times R \times u)dt \quad (9)$$

[Expression 10]

$$K=R^{-1} \times B^T \times P \quad (10)$$

Here, P is the solution to a Riccardi equation (Expression 11). This Riccardi equation can be solved by any known method in the field of the linear system. From this, the gain K can be determined.
[Expression 11]

$$-dP/dt=A^T \times P+P \times A+Q-P \times B \times R^{-1} \times B^T \times P \quad (11)$$

Incidentally, Q and R in the evaluation function J and the Riccardi equation are a positive semidefinite symmetric matrix and a positive definite symmetric matrix, respectively, which are set arbitrarily and are weighting matrices of the evaluation function J determined by the designer of the system. For example, with Q and R in the motion model here, when the norm (magnitude) of specified components (such as dz/dt and dθ/dt) from among the components of the state variable vector X(t) is set larger than the norm of other components (such as z and θ), the components in which the norm is set higher converges more stably than the other components do. Also, when the value of the component of Q is increased, the transient characteristic value, i.e., the value of the state variable vector X(t), quickly converges on a stable value, and when the value of R is increased, the consumption energy decreases.

$$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1) \quad \text{[Expression 12]}$$

In actual sprung mass damping control of the sprung mass damping control system according to this first example embodiment, as shown in FIG. 4A, the state variable vector X(t) is calculated by solving the differential equation in Expression 3 using the torque input value by the motion model portion $5a_1$. In the system expressed by Expressions 1 and 2, the state variable vector X(t) which is the output of the motion model portion $5a_1$ is multiplied by the gain K that is determined in order to minimize the state variable vector X(t) or bring it to 0, as described above, by the driver required torque correcting portion $5a_2$. This multiplied value U(t) is a positive or negative value depending on the vibration direction of the sprung mass vibration. This multiplied value U(t) is then converted into wheel torque units of the driving wheels Wh and Wh by the driving torque converting portion 5c. This converted value is the sprung mass damping control torque Twc (i.e., the sprung mass damping control amount), and is output to the adder 2a of the required vehicle driving torque calculating device 2 where it is added to the driver required torque Twr. This system is a resonance system, and the value of the state variable vector X(t) with respect to a given input is essentially only the component of the natural frequency of the system. Therefore, by adding or subtracting the converted value of U(t) (=sprung mass damping control torque Twc) to or from the driver required torque Twr, the component of the natural frequency of the system within the driver required torque Twr, i.e., the component that causes sprung mass vibration of the vehicle body, can be corrected, thereby suppressing that sprung mass vibration. When the component of the natural frequency of the system in the required torque applied by the driver is eliminated, the component of the natural frequency of the system in the required vehicle driving torque Tdmg2r from the output of the second motor-generator 32 is only −U(t) so the vibration from wheel torque estimated value Tw (i.e., the disturbance) converges. In FIG. 4A, U(t) is looped to the input side of the motion model portion $5a_1$, but this loop may be eliminated to reduce the calculation amount as long as the desired sprung mass damping control performance can be obtained. Also, in FIG. 4A, FF/FB weighted and adjusted gain is applied by a FF/FB weighted and adjusted gain controlling portion $5b_2$ only in the feedback control. However, this FF/FB weighted and adjusted gain may also be applied in the feed-forward control.

The required vehicle driving torque Tdmg2r from the output of the second motor-generator 32 is the vehicle driving torque applied to the driving wheels Wh and Wh as a result of the second motor-generator 32 outputting the required motor-generator torque Tmg2r, and is calculated in an adder 7a of the motor-generator control amount calculating device 7. This required vehicle driving torque Tdmg2r is obtained by subtracting the required vehicle driving torque Tder from the engine output in the engine control amount calculating device 3, from the final required vehicle driving torque Tdr obtained by the required vehicle driving torque calculating device 2 described above. This required vehicle driving torque Tdmg2r is then converted to the required motor-generator torque Tmg2r for the second motor-generator 32 in the motor-generator torque converting portion 7b. The motor-generator torque converting portion 7b takes the gear ratio of the power transmission apparatus such as the power split device 20 and the power transmission device 50 into account at the time of this conversion. The required motor-generator torque Tmg2r is output to the motor-generator control device 6. This motor-generator control device 6 then controls the inverter 42 to control the second motor-generator 32 to output that required motor-generator torque Tmg2r.

In this first example embodiment, as described above, of the final required vehicle driving torque Tdr, the vehicle driving torque corresponding to the driving force required by the driver is generated by output from the engine 10 (i.e., the required engine torque Ter) and the rest is generated by the output of the second motor-generator 32 (i.e., the required motor-generator torque Tmg2r). The sprung mass damping control torque Twc (i.e., the sprung mass damping control amount) is incorporated into the required vehicle driving torque Tdmg2r from the output of the second motor-generator 32 so sprung mass vibration can be suppressed by having the second motor-generator 32 generate the required motor-generator torque Tmg2r which is the converted value of that required vehicle driving torque Tdmg2r.

Here, the wheel torque estimated value Tw estimated by the wheel torque estimator 5$b_1$ from another detectable value of the traveling hybrid vehicle is used for the wheel torque that is input as disturbance in the feedback controlling portion 5b in FIG. 4A. Alternatively, however, a torque sensor may also be provided for each wheel and the wheel torque that is input as that disturbance may be actually detected, for example.

This wheel torque estimated value Tw can be estimated or calculated from Expression 13 below using temporal differentiation of the angular velocity ω or the wheel speed Vw (=r×ω) obtained from the wheel speed obtaining device (i.e., the wheel speed sensors 62 and 62) of the driving wheels Wh and Wh, for example. In Expression 13, M is the mass of the hybrid vehicle, and r is the wheel radius.

[Expression 13]

$$Tw = M \times r^2 \times d\omega/dt \quad (13)$$

Here, when the sum of the driving force generated at the location where the driving wheels Wh and Wh contact the road surface is equal to the driving force M×G (G: vehicle longitudinal acceleration) of the entire vehicle, the wheel torque estimated value Tw is provided by Expression 14 below.

[Expression 14]

$$Tw = M \times G \times r \quad (14)$$

Also, the vehicle longitudinal acceleration G of the hybrid vehicle is provided by Expression 15 below by the differential value of the wheel speed r×ω.

[Expression 15]

$$G = r \times d\omega/dt \quad (15)$$

Therefore, the wheel torque estimated value Tw is estimated as shown in Expression 13 above.

Figure 5:
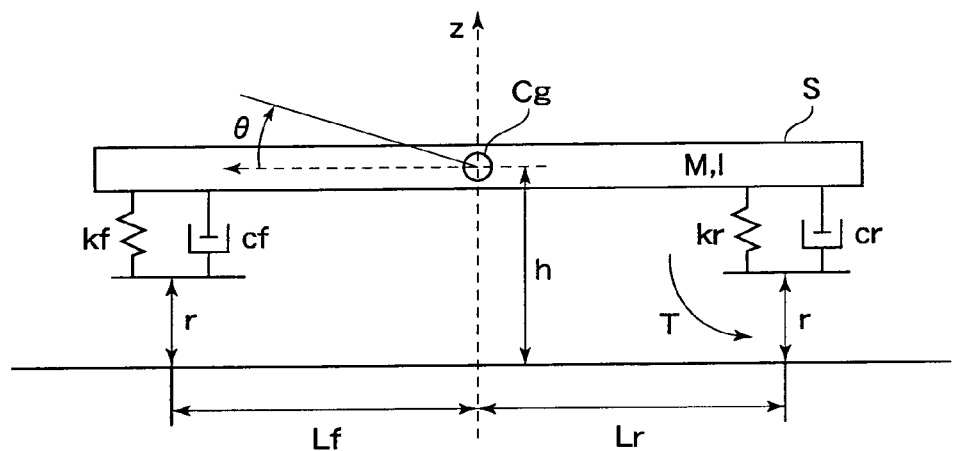
FIG. 5 is a diagram of an example of a dynamic motion model of assumed sprung mass vibration in the sprung mass damping control system according to the invention.
Figure 6:
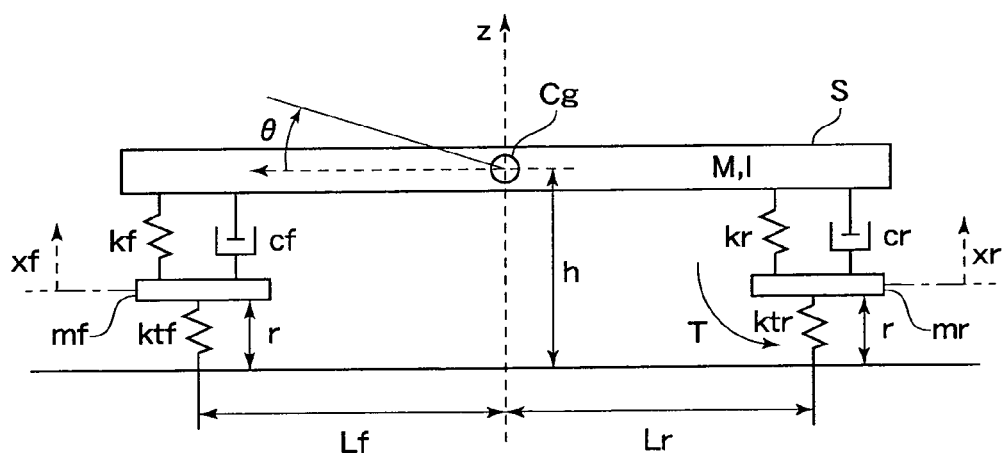
FIG. 6 is a diagram illustrating another example of a dynamic motion model of assumed sprung mass vibration in the sprung mass damping control system according to the invention.

Also, the dynamic motion model of the bounce direction and the pitch direction of the vehicle body in the example described above may be a model (vehicle body sprung mass/unsprung mass vibration model) that takes into account the spring elasticity of the front and rear wheel tires, in addition to the structure shown in FIG. 5, as shown in FIG. 6, for example. When the front wheel tires have a modulus of elasticity of ktf and the rear wheel tires have a modulus of elasticity of ktr, the equation of motion of the bounce direction of the vehicle center of gravity Cg and the equation of motion of the pitch direction of the vehicle center of gravity Cg can written as shown in Expressions 16a to 16d below, as is also evident from FIG. 6.

[Expression 16]

$$M\frac{d^2 z}{dt^2} = -kf(z + Lf \times \theta - xf) - cf\left(\frac{dz}{dt} + Lf \times \frac{d\theta}{dt} - \frac{dxf}{dt}\right) - \\ kf(z - Lf \times \theta - xr) - cr\left(\frac{dz}{dt} - Lr \times \frac{d\theta}{dt} - \frac{dxr}{dt}\right) \quad (16a)$$

$$I\frac{d^2 \theta}{dt^2} = -Lf\left\{kf(z + Lf \times \theta - xf) + cf\left(\frac{dz}{dt} + Lf \times \frac{d\theta}{dt} - \frac{dxf}{dt}\right)\right\} + \\ Lr\left\{kr(z - Lr \times \theta - xr) + cr\left(\frac{dz}{dt} - Lr \times \frac{d\theta}{dt} - \frac{dxr}{dt}\right)\right\} + \frac{h}{r} \times T \quad (16b)$$

$$mf\frac{d^2 xf}{dt^2} = \\ kf(z + Lf \times \theta - xf) + cf\left(\frac{dz}{dt} + Lf \times \frac{d\theta}{dt} - \frac{dxf}{dt}\right) + ktf \times xf \quad (16c)$$

$$mr\frac{d^2 xr}{dt^2} = kr(z - Lr \times \theta - xr) + cr\left(\frac{dz}{dt} - Lr \times \frac{d\theta}{dt} - \frac{dxr}{dt}\right) + ktr \times xr \quad (16d)$$

In these expressions, xf and xr are unsprung mass displacement amounts of the front and rear wheels, respectively, and mf and mr is the unsprung mass of the front and rear wheels, respectively. Expressions 16a to 16d form equations of state as shown in Expression 3 above, just like FIG. 5, with z, θ, xf, xr, and the time differential value thereof as the state variable vectors (where matrix A is eight rows and eight columns and matrix B is eight rows and one column). The gain matrix K that brings the state variable vectors to 0 can be determined according to the theory of the optimum regulator. The actual sprung mass damping control in this case is just as it is in FIG. 5.

Also, in addition to the vibration component that is input from the road surface via the wheels, the vibration component generated in the drive source such as the engine 10 and the vibration component generated in the power transmission apparatus such as the power split device 20 and the power transmission device 50 in the transmission path of the power from that power source can be considered as the vibration component to be suppressed in the hybrid vehicle. When suppressing the vibration of the vehicle body caused by these various vibration components, the torque adjusting amount (i.e., the sprung mass damping control amount) necessary to suppress the vibration components may obtained for each vibration component to be suppressed, and these torque adjusting amounts may be output as described above from the second motor-generator 32.

The sprung mass damping control torque Twc (i.e., the sprung mass damping control amount) is preferably reflected after the driver required torque Twr has been output to the engine control amount calculating device 3 but before the HV basic performance maintaining value Thy is taken into account in the calculation process of the final required vehicle driving torque Tdr. Therefore, the sprung mass damping control system may also be structured as shown in FIGS. 7A and 7B instead of as shown in FIGS. 4A and 4B.

Figure 7A:
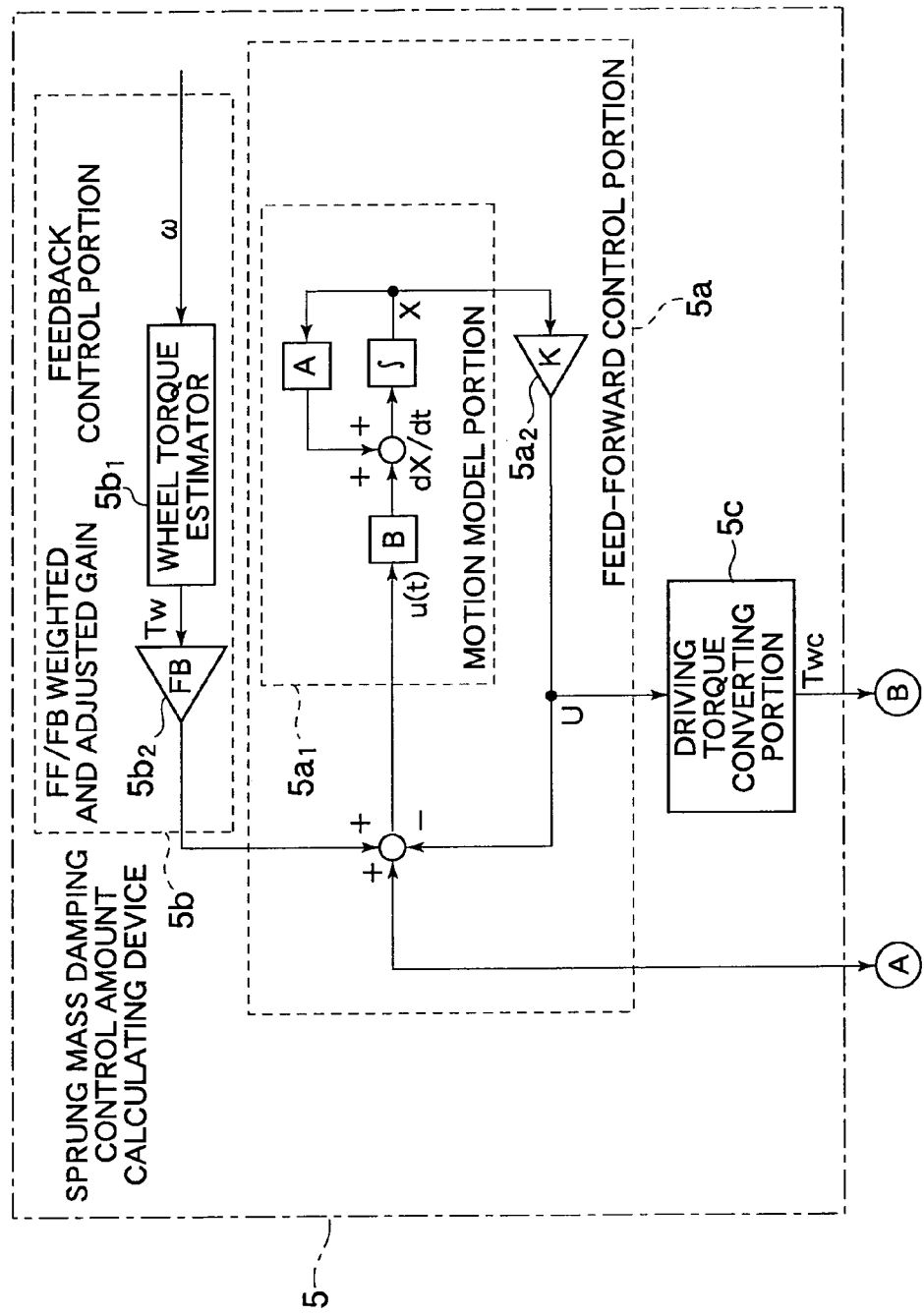
FIGS. 7A and 7B are views in the form of control blocks showing frame formats of another example of the functional structure of a sprung mass damping control system according to a first example embodiment of the invention.
Figure 7B:
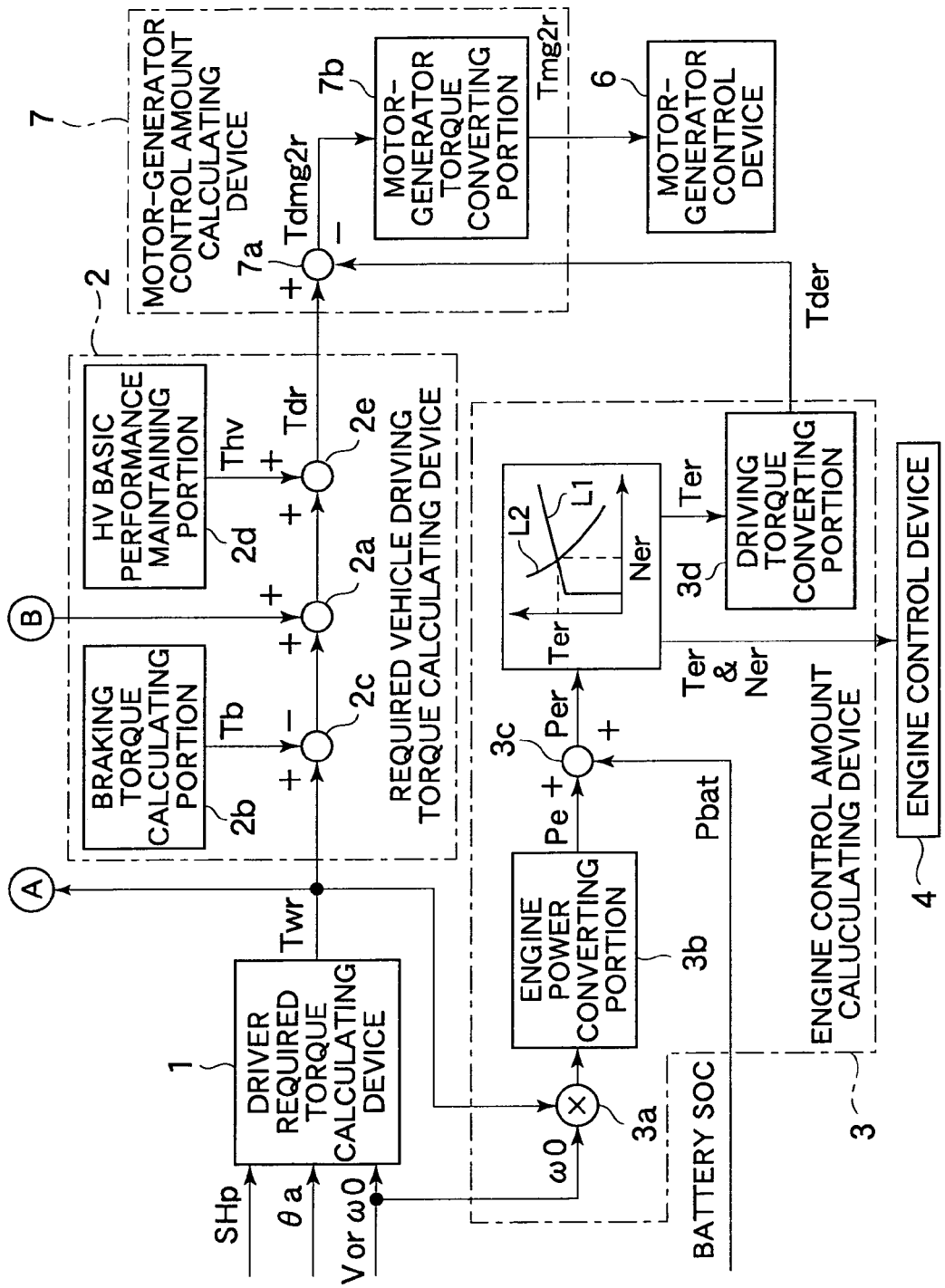
Figure 8:
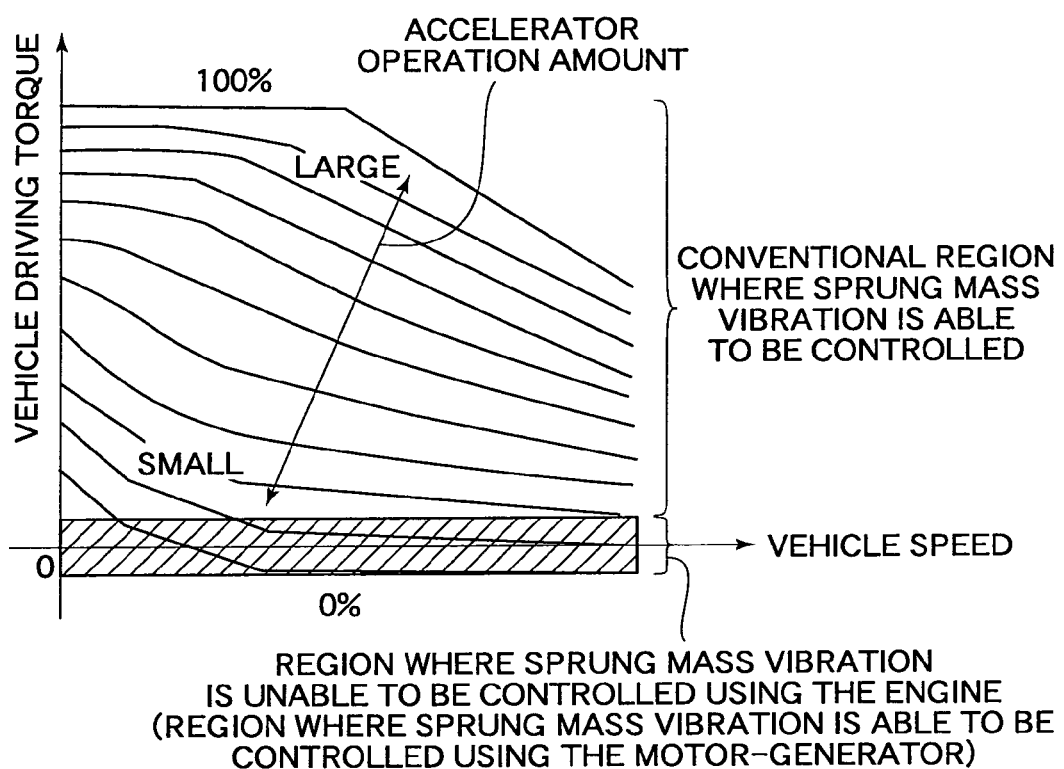
FIG. 8 is a graph showing a region where sprung mass vibration is able to be controlled using the engine and a region where sprung mass vibration is not able to be controlled using the engine.

With the sprung mass damping control system shown in FIGS. 7A and 7B, the positions of the adder 2a and the subtracter 2c in the structure shown in FIG. 4A and 4B are reversed. That is, the final required vehicle driving torque Tdr is calculated by first reflecting the braking torque Tb in the driver required torque Twr, then reflecting the sprung mass damping control torque Twc (i.e., the sprung mass damping control amount) in the driver required torque Twr before the HV basic performance maintaining value Thy is reflected in the driver required torque Twr.

As described above, the sprung mass damping control system according to this first example embodiment does not reflect the sprung mass damping control torque Twc (i.e., the sprung mass damping control amount) in the calculation process of the engine control amount (i.e., the required engine torque Ter and the required engine speed Ner). Instead, the sprung mass damping control torque Twc (i.e., the sprung mass damping control amount) is reflected in the required vehicle driving torque after the driver required torque Twr has been output to the engine control amount calculating device 3 and before the HV basic performance maintaining value Thy is reflected in the required vehicle driving torque. That is, in the structure shown in FIG. 4B, the adder 2a that reflects the sprung mass damping control torque Twc (i.e., the sprung mass damping control amount) is arranged after the portion that outputs the driver required torque Twr to the engine control amount calculating device 3 but before the subtracter 2c that reflects the braking torque Tb. Also, in the structure shown in FIG. 7B, the adder 2a is not only after the portion that outputs the driver required torque Twr to the engine control amount calculating device 3, but is also after the subtracter 2c that reflects the braking torque Tb and before the adder 2e that reflects the HV basic performance maintaining value Thv. Structuring the sprung mass damping control system of the first example embodiment in this way enables the engine control amount calculating device 3 to set the engine control amount corresponding to the driving force required by the driver, which does not fluctuate as a result of being affected by the sprung mass damping control torque Twc (i.e., the sprung mass damping control amount).

Here, assuming for example that torque in which the sprung mass damping control torque Twc (i.e., the sprung mass damping control amount) has been reflected in the driver required torque Twr is output to the engine control amount calculating device 3, the required engine power Per is affected by the sprung mass damping control torque Twc and thus fluctuates. As described above, in this hybrid vehicle, the point of intersection of the fuel efficiency line L1 and the constantly required engine power line L2 is the operating point of the engine 10. Therefore, if the required engine power Per fluctuates, the operating point of the engine 10 ends up moving on the fuel efficiency line L1, so the target engine control amount deviates from the driving force required by the driver. Accordingly, driving force of the vehicle that differs from the driving force requested by the driver may feel odd to the driver. Also, in this case, the target engine control amount, i.e., the required engine speed Ner, may fluctuate even though the accelerator operation amount is neither increase nor decreased, and the driver may find the noise associated with this fluctuation in the required engine speed Ner annoying. However, the sprung mass damping control system according to this first example embodiment does not reflect the sprung mass damping control torque Twc (i.e., the sprung mass damping control amount) in the calculation process of the engine control amount and is thus able to prevent this kind of annoyance.

Also, assuming for example that the sprung mass damping control torque Twc (i.e., the sprung mass damping control amount) is reflected after the HV basic performance maintaining value Thy has been reflected, the HV basic performance maintaining value Thy ends up fluctuating due to the effect of the sprung mass damping control torque Twc, so Hy basic performance such as drivability is no longer able to be maintained. However, the sprung mass damping control system according to this first example embodiment reflects the sprung mass damping control torque Twc (i.e., the sprung mass damping control amount) before the HV basic performance maintaining value Thy is reflected, so the HV basic performance maintaining value Thy can be generated by the output of the second motor-generator 32, thereby enabling HV basic performance to be maintained.

In this way, the sprung mass damping control system according to this first example embodiment executes sprung mass damping control using the output from the motor-generator (i.e., the second motor-generator 32) instead of the output from the engine 10. Therefore, this sprung mass damping control system is able to execute sprung mass damping control that is more precise than sprung mass damping control that is executed using engine torque.

Furthermore, because the sprung mass damping control system according to this first example embodiment is able to perform sprung mass damping control using the motor-generator torque, the region in which sprung mass damping control can be executed is larger than it is with sprung mass damping control performed using only the engine 10, so finer sprung mass damping control is possible. This is due to the difference between the region where motor-generator torque from the motor-generator can be output and the region where engine torque from the engine 10 can be output. That is, typically the motor-generator is able to output the required vehicle driving torque in a region where that required vehicle driving torque is extremely small close to 0, as well as in the negative region. In contrast, the engine 10 is unable to output engine torque in a region equal to or less than the operation compensating operating point, such as equal to or less than idle speed. As a result, the required vehicle driving torque is of course unable to be output in the negative region. Moreover, even in the positive region, in the region where the required vehicle driving torque is extremely small close to 0, the required vehicle driving torque is unable to be generated. In this case, the engine 10 is unable to generate the required vehicle driving torque in those regions (i.e., in the regions indicated by hatching in FIG. 8). Thus, engine torque is unable to be output unless the required vehicle driving torque region is larger than this. The boundary between the region where engine torque is able to be output and the region where engine torque is unable to be output (i.e., the boundary between the conventional region where sprung mass vibration is able to be controlled and the region where sprung mass vibration is unable to be controlled by the engine 10 in FIG. 8) differs depending on the performance of the engine 10. Therefore, sprung mass damping control using motor-generator torque is more useful than sprung mass damping control using engine torque.

In the example described above, sprung mass damping control is preferably executed using only motor-generator torque even while the engine 10 is operating (starting up). Also, in the example described above, sprung mass damping control is performed using only motor-generator torque, but this sprung mass damping control system is not necessarily limited to this. When necessary, sprung mass damping control using only engine torque or sprung mass damping control using both motor-generator torque and engine torque may also be performed. For example, sprung mass damping control may be executed using motor-generator torque and/or engine torque in the conventional region where sprung mass vibration is able to be controlled in FIG. 8, and executed using only motor-generator torque in the region where sprung mass vibration is unable to be controlled using the engine 10 in FIG. 8.

Next, a second example embodiment of the sprung mass damping control system of a vehicle according to the invention will be described with reference to FIGS. 9A and 9B.

The sprung mass damping control system in this second example embodiment differs from the sprung mass damping control system in the first example embodiment described above in the following ways.

Although not described in detail, when setting the final required vehicle driving torque Tdr in the sprung mass damping control system in the first example embodiment, the added value may be smoothed to inhibit a sudden change in torque, in a process prior to that process of setting of the final required vehicle driving torque Tdr. A smoothing portion, not shown, may be arranged between the driver required torque calculating device 1 and the required vehicle driving torque calculating device 2 in FIG. 4B or FIG. 7B, for example, and the driver required torque Twr set by the driver required torque calculating device 1 may be smoothed. When the driver required torque Twr is smoothed in this way, the smoothed sprung mass damping control amount (i.e., the sprung mass damping control torque Twc) is reflected, so appropriate sprung mass damping control that is based on that sprung mass damping control amount can be executed.

Meanwhile, when the driver required torque Twr is smoothed, the effect of inhibiting a sudden change in torque may be reduced due to the braking torque Tb and the HV basic performance maintaining value Thv that are reflected after the driver required torque Twr has been smoothed. Therefore, the smoothing portion, not shown, is provided in the required vehicle driving torque calculating device 2, and the required vehicle driving torque (i.e., that which is calculated as the final required vehicle driving torque Tdr in the first example embodiment) is smoothed after some calculated values of the required vehicle driving torque calculating device 2, most preferably the braking torque Tb and the HV basic performance maintaining value Thv, have been reflected. However, in this case, the sprung mass damping control amount (i.e., the sprung mass damping control torque Twc) is also smoothed so the required motor-generator torque Tmg2r ends up deviating from the amount originally required for sprung mass damping control by an amount corresponding to the smoothing. As a result in this case, the output responsiveness of the driving torque related to sprung mass damping control (hereinafter referred to as the "sprung mass damping control responsiveness") deteriorates by an amount corresponding to that deviation amount, such that it becomes difficult to achieve appropriate sprung mass damping control.

Therefore, anticipating that the sprung mass damping control responsiveness will decrease when the sprung mass damping control amount (i.e., the sprung mass damping control torque Twc) is smoothed, the sprung mass damping control system according to the second example embodiment is provided with a sprung mass damping control responsiveness compensating device that compensates in advance for that decrease in order to achieve a desired sprung mass damping control responsiveness.

Figure 9A:
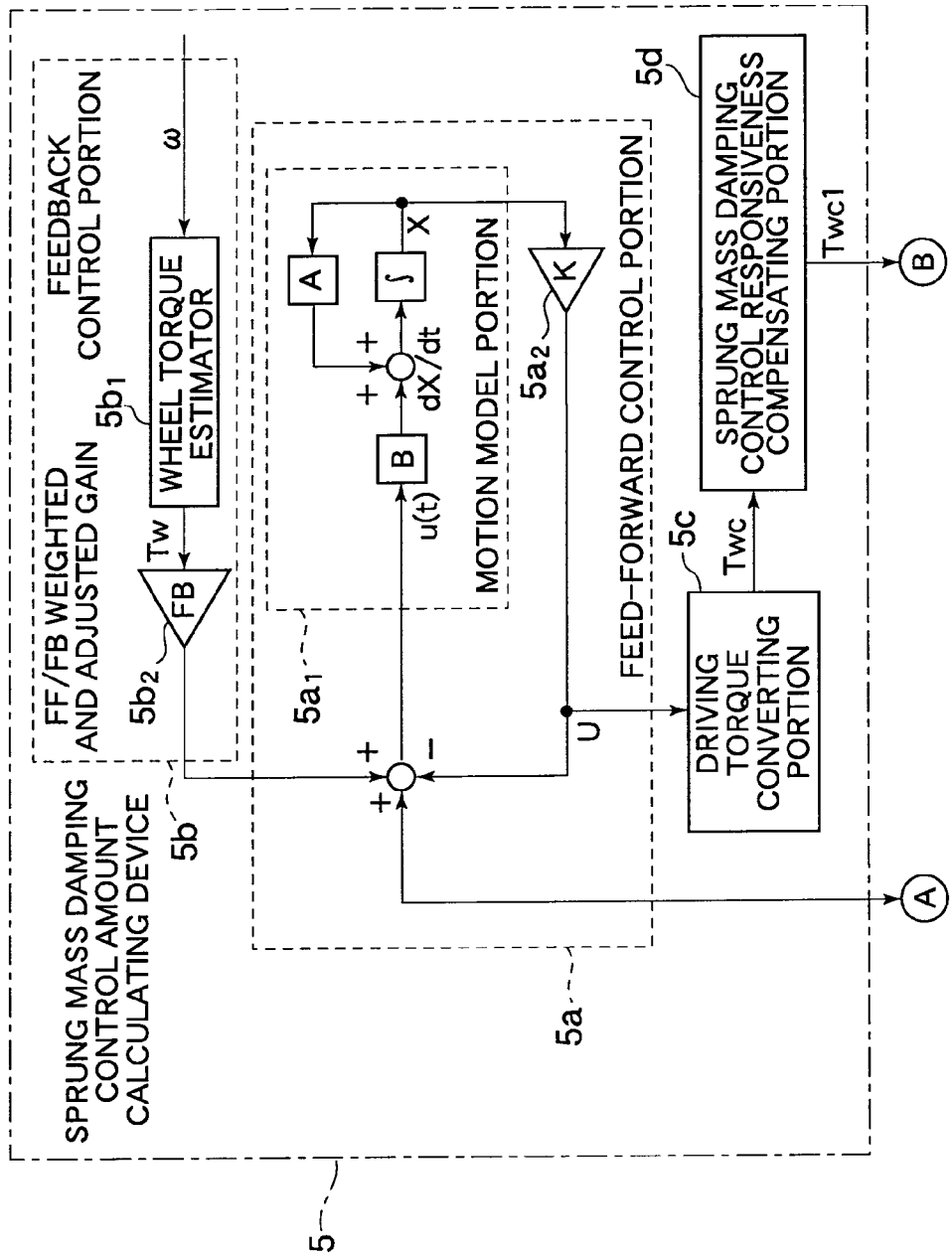
FIGS. 9A and 9B are views in the form of control blocks showing frame formats of an example of the functional structure of a sprung mass damping control system according to a second example embodiment of the invention.
Figure 9B:
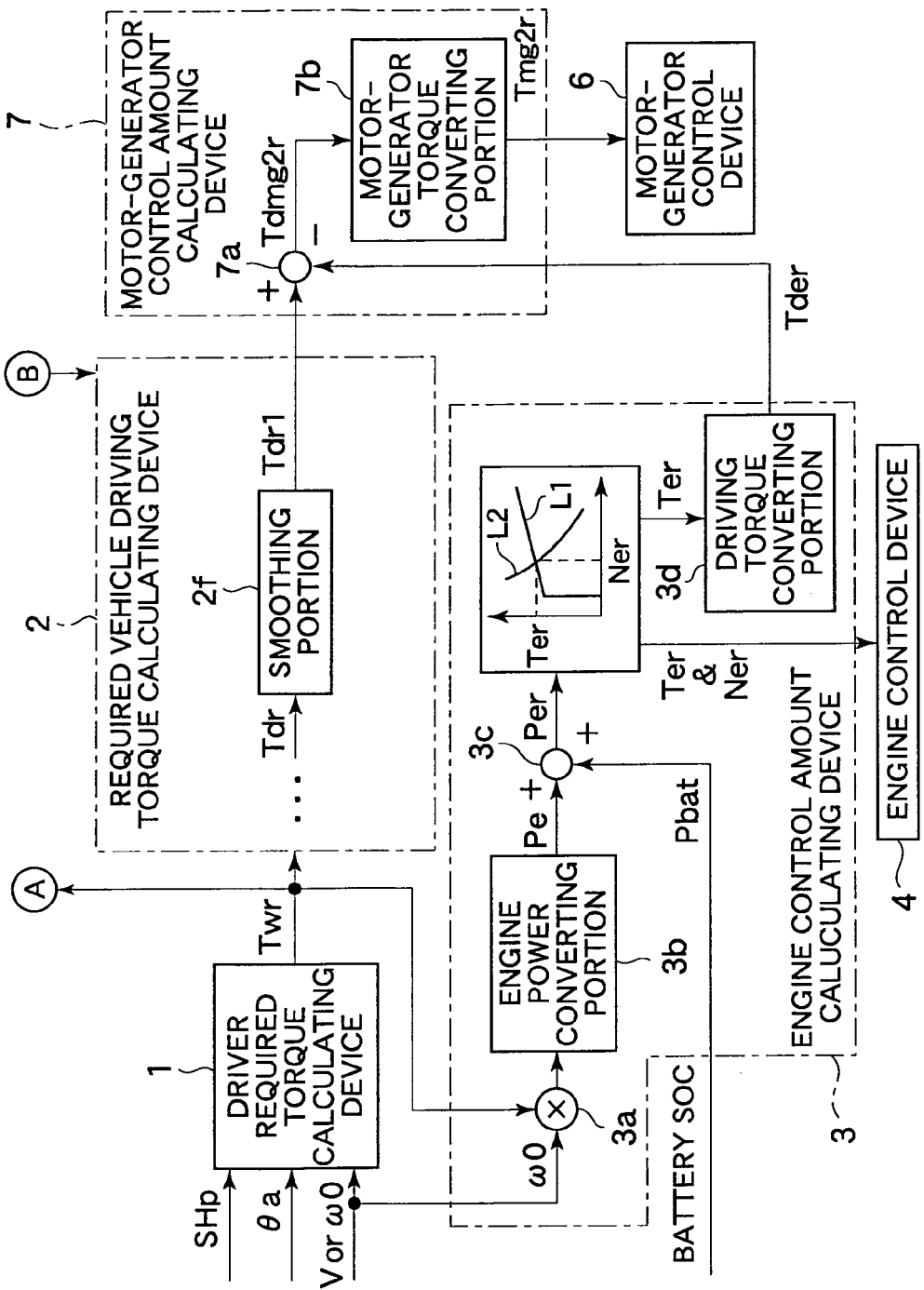

FIGS. 9A and 9B show an example of this sprung mass damping control system. In the sprung mass damping control system shown in FIGS. 9A and 9B, the sprung mass damping control amount calculating device 5 is provided with a sprung mass damping control responsiveness compensating portion 5d as the sprung mass damping control responsiveness compensating device.

In the sprung mass damping control system shown in FIGS. 9A and 9B, the required vehicle driving torque calculating device 2 has the same structure as that shown in FIGS. 4A and 4B or FIGS. 7A and 7B illustrated in the first example embodiment, with the exception of a smoothing portion 2f. Here, the smoothing portion 2f is arranged after the adder 2e that receives the HV basic performance maintaining value Thv, and smoothing is performed on the final required vehicle driving torque Tdr in the first example embodiment. In this case, the smoothed final vehicle driving torque Tdr1 is input to the adder 7a of the motor-generator control amount calculating device 7.

Also, the sprung mass damping control amount calculating device 5 in FIGS. 9A and 9B has the same structure as that shown in FIGS. 4A and 4B or FIGS. 7a and 7B illustrated in the first example embodiment, with the exception of the sprung mass damping control responsiveness compensating portion 5d. In this case, the sprung mass damping control responsiveness compensating portion 5d is arranged after the driving torque converting portion 5c, and the sprung mass damping control responsiveness compensating process described below is performed on the sprung mass damping control torque Twc (i.e., the sprung mass damping control amount) obtained by that driving torque converting portion 5c. The processed sprung mass damping control torque Twc1 is input to the adder 2a of the required vehicle driving torque calculating device 2.

The process described below is one possibility for the sprung mass damping control responsiveness compensating process.

Assuming that the smoothing portion 2f executes smoothing with a transfer function G(s), that "s" is a Laplace operator. In this case, the sprung mass damping control responsiveness compensating portion 5d may perform the sprung mass damping control responsiveness compensating process by making the inverse (i.e., the inverse function) of the transfer function G(s) of the smoothing process into a transfer function K(s) $\{=1/G(s)\}$. For example, if Expression 17 below is made the transfer function G(s) of the smoothing process, the transfer function K(s) of the sprung mass damping control responsiveness compensating process is Expression 18 below. "T0" in these expressions is a time constant.

[Expression 17]
$$G(s) = \frac{1}{T0 \times s + 1} \quad (17)$$

[Expression 18]
$$K(s) = \frac{T0 \times s + 1}{1} \quad (18)$$

By forming the sprung mass damping control responsiveness compensating portion 5d in this way, after the sprung mass damping control responsiveness compensating process has been performed on the sprung mass damping control torque Twc (i.e., the sprung mass damping control amount) with the transfer function K(s), the sprung mass damping control torque Twc (i.e., the sprung mass damping control amount) is then smoothed with the transfer function G(s) which is the inverse function of the transfer function K(s). Therefore, the sprung mass damping control torque Twc (i.e., the sprung mass damping control amount) set by the driving torque converting portion 5c of, the sprung mass damping control amount calculating device 5 is included in the smoothed final required vehicle driving torque Tdr, so the amount of required motor-generator torque Tmg2 set by the motor-generator control amount calculating device 7 is an amount that corresponds to that sprung mass damping control torque Twc (i.e., the sprung mass damping control amount). Accordingly, in this sprung mass damping control system, appropriate sprung mass damping control corresponding to the set sprung mass damping control torque Twc (i.e., the sprung mass damping control amount) is able to be executed with good responsiveness.

Also, the smoothing process creates a phase lag with respect to the sprung mass damping control torque Twc (i.e., the sprung mass damping control amount). Therefore, the sprung mass damping control responsiveness compensating process may compensate for the phase lag amount of the sprung mass damping control torque Twc (i.e., the sprung mass damping control amount), and advance the phase of the sprung mass damping control torque Twc (i.e., the sprung mass damping control amount) in advance by the amount of that phase lag. For example, a high-pass filter of the transfer function K(s) shown in Expression 19 below is used in this sprung mass damping control responsiveness compensating process. A primary high-pass filter is given as an example in Expression 19. The time constant T0 in Expression 19 is a design value set to compensate for the phase lag amount of the sprung mass damping control torque Twc (i.e., the sprung mass damping control amount) caused by the smoothing process. For example, sprung mass vibration is vibration of approximately 1.5 Hz as described in the first example embodiment, so the time constant T0 is set to advance a 1.5 Hz component as that sprung mass damping control amount.

[Expression 19]

$$K(s) = \frac{T0 \times s}{T0 \times s + 1} \tag{19}$$

By forming the sprung mass damping control responsiveness compensating portion 5d in this way, the phase lag from the smoothing process occurs after the sprung mass damping control responsiveness compensating process (a phase advancing process) has been performed on the sprung mass damping control torque Twc (i.e., the sprung mass damping control amount) with the transfer function K(s). Therefore, the sprung mass damping control torque Twc (i.e., the sprung mass damping control amount) set by the driving torque converting portion 5c of the sprung mass damping control amount calculating device 5 is included in the smoothed final required vehicle driving torque Tdr, so the amount of required motor-generator torque Tmg2 set by the motor-generator control amount calculating device 7 is an amount that corresponds to that sprung mass damping control torque Twc (i.e., the sprung mass damping control amount). Also, this phase advancing process does not increase the high frequency component of the required vehicle driving torque Tdr obtained through the smoothing process using the inverse function described above, which is helpful. Accordingly, in this sprung mass damping control system, appropriate sprung mass damping control corresponding to the set sprung mass damping control torque Twc (i.e., the sprung mass damping control amount) is able to be executed with even better responsiveness.

Also, the transfer function K(s) of the phase advancing process shown in Expression 20 below may be set instead of the high-pass filter described above. The same effect can be obtained with the sprung mass damping control responsiveness compensating portion 5d structured in this way as well. Moreover, in this case, it is also possible to advance the phase in only a particular frequency range. A compensator for a primary phase advancing process is given as an example in Expression 20. The "K" in Expression 20 is the gain and "α" is a coefficient (α<1). For example, the gain K is a design value set that enables the 1.5 Hz component that attenuates with the smoothing process to recover. Also, the time constant T0 and the coefficient a are design values set to advance the 1.5 Hz component as the sprung mass damping control amount.

[Expression 20]

$$K(s) = K \times \frac{T0 \times s + 1}{\alpha \times T0 \times s + 1} \tag{20}$$

As described above, the sprung mass damping control system according to this second example embodiment can execute appropriate sprung mass damping control with the required motor-generator torque Tmg2r necessary for the sprung mass damping control by providing the sprung mass damping control responsiveness compensating portion 5d described above.

Incidentally, the sprung mass damping control responsiveness compensating device is provided as the sprung mass damping control responsiveness compensating portion 5d in a portion of the process that is after the driving torque converting portion so that the sprung mass damping control responsiveness compensating process is performed on the sprung mass damping control torque Twc (i.e., the sprung mass damping control amount). However, the same effect as that of the example described above can also be obtained regardless of where the sprung mass damping control responsiveness compensating portion 5d is provided in the process as long as it is before the sprung mass damping control torque Twc (i.e., the sprung mass damping control amount) is reflected in the adder 2a. For example, the sprung mass damping control responsiveness compensating device may be provided in a portion of the process before or after the driver required torque calculating device 1 (i.e., before or after the driver required torque calculating device 1). Also, the sprung mass damping control responsiveness compensating device may be provided before or after the feed-forward control portion 5a of the sprung mass damping control amount calculating device 5 (i.e., before the driver required torque Twr is input or after the multiplied value U(t) of the driver required torque correcting portion $5a_2$ is output to the driving torque converting portion 5c).

Next, a third example embodiment of the sprung mass damping control system of a vehicle according to the invention will be described with reference to FIGS. 10 to 20.

Figure 10:
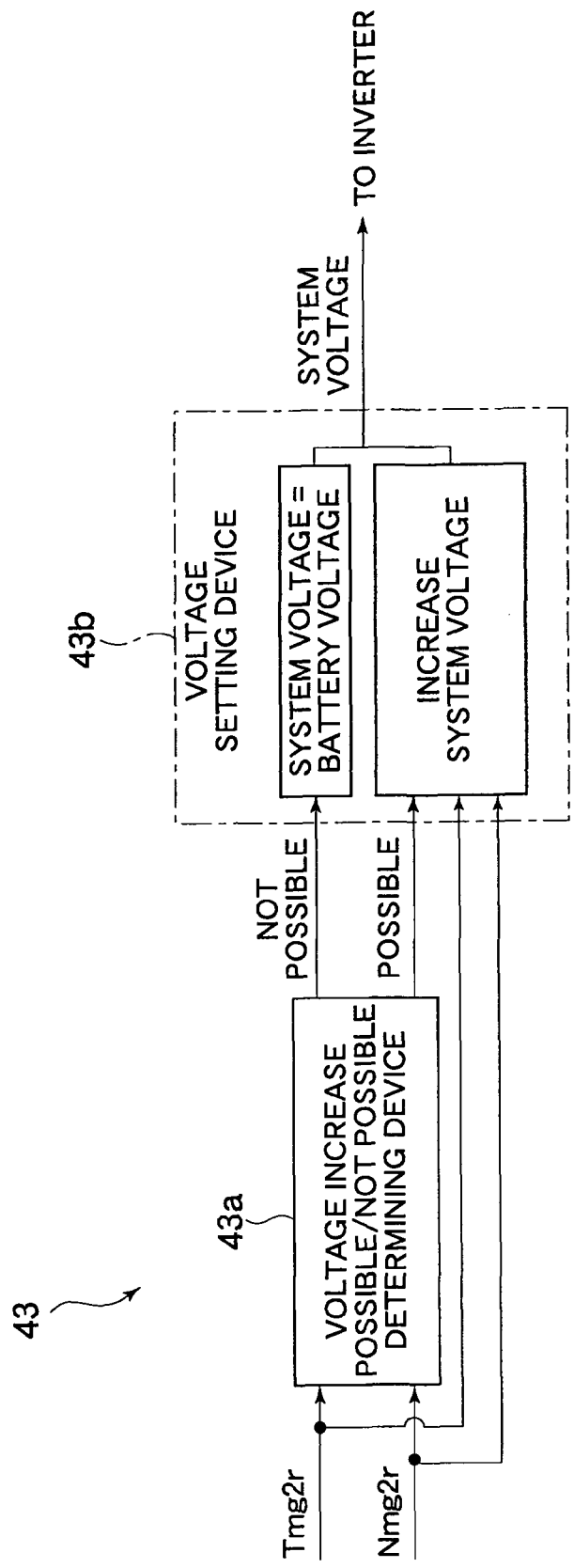
FIG. 10 is a view in the form of control blocks showing a frame format of an example of the functional structure of a system voltage setting apparatus of an inverter.

Some vehicles which use a motor-generator as the drive source are provided with a voltage increasing device that increases the system voltage of the inverter so that it is higher than the battery voltage, and applies that increased voltage to the motor-generator. In this type of vehicle, the determination as to whether to increase the system voltage is made according to the motor-generator control amount (i.e., the required motor-generator torque Tmg2r and the required motor-generator speed Nmg2r) for the motor-generator. FIG. 10 shows one example of a system voltage setting apparatus that includes this voltage increasing device.

The system voltage setting apparatus 43 shown in FIG. 10 is designed to set the system voltage of the inverter, i.e., set the voltage applied to the motor-generator. The system voltage setting apparatus 43 includes a voltage increase possible/not possible determining device 43a that determines whether to increase the system voltage according to the motor-generator control amount, and a voltage setting device 43b that sets the system voltage.

The voltage increase possible/not possible determining device 43a checks the motor-generator control amount (i.e., the required motor-generator torque Tmg2r and the required motor-generator speed Nmg2r) against a voltage increase determining threshold value, and determines whether it is possible to increase the system voltage based on that comparison. Here, increasing the system voltage of the inverter typically involves some loss, so in view of fuel efficiency it is preferable to avoid as much as possible frequently switching between a reference state, i.e., the normal battery voltage, and an increased voltage state. In this case, a voltage increase possible/not possible determining map shown in FIG. 11 that provides hysteresis with respect to that voltage increase determining threshold value is prepared to suppress hunting due to repeatedly switching between a voltage increase possible determination and a voltage increase not possible determination, which are on opposite sides of the voltage increase determining threshold value, and thus reduce loss that accompanies an increase in the system voltage.

In this voltage increase possible/not possible determining map, the vertical axis is represented by the required motor-generator torque Tmg2r and the horizontal axis is represented by the required motor-generator speed Nmg2r. This voltage increase possible/not possible determining map has a voltage increase determining line Lvs formed by a voltage increase determining threshold value plotted for each required motor-generator speed Nmg2r, for example, and a hysteresis line Lhys formed by hysteresis plotted for each voltage increase determining threshold value. According to this voltage increase possible/not possible determining map, the system voltage is increased when the motor-generator control amount (i.e., the required motor-generator torque Tmg2r and the required motor-generator speed Nmg2r) cross the voltage increase determining line Lvs, but is not increased when the motor-generator control amount crosses the hysteresis line Lhys. For example, the voltage increase possible/not possible determining device 43a determines that a voltage increase is not possible when the motor-generator control amount is at point a, as well as when the motor-generator control amount crosses the hysteresis line Lhys in a change from point a to point b. Also, the voltage increase possible/not possible determining device 43a determines that a voltage increase is possible when the motor-generator control amount crosses the voltage increase determining line Lvs in a change from point b to point c, as well as when the motor-generator control amount crosses the voltage increase determining line Lvs in a change from point c to point d. Further, the voltage increase possible/not possible determining device 43a determines that a voltage increase is not possible when the motor-generator control amount crosses the hysteresis line Lhys in a change from point d to point e.

When the voltage increase possible/not possible determining device 43a determines that the system voltage can be increased, the voltage setting device 43b sets the increase voltage of that system voltage. This increase voltage may be obtained based on map data which is prepared in advance and has the motor-generator control amount as parameters. Also, when the voltage increase possible/not possible determining device 43a determines that the system voltage cannot be increased, the voltage setting device 43b sets the system voltage to the battery voltage.

When the system voltage setting apparatus 43 is added to the sprung mass damping control system of the first or second example embodiment described above, the motor-generator control amount may frequently go back and forth across the voltage increase determining line Lvs due to the sprung mass damping control torque Twc (i.e., the sprung mass damping control amount) being added while the sprung mass damping control is being executed, or a change in that sprung mass damping control torque Twc (i.e., sprung mass damping control amount). At that time, the hunting described above may occur, and fuel efficiency may decrease due to an increase in the voltage increase loss.

Therefore, the sprung mass damping control system according to this third example embodiment is structured so that such problems will not occur. More specifically, the sprung mass damping control system is structured to prohibit execution of the sprung mass damping control when it is likely that the motor-generator control amount will go back and forth frequently across the voltage increase determining line Lvs.

In this case, the motor-generator control amount is likely to go back and forth frequently across the voltage increase determining line Lvs when the motor-generator control amount is a value that is close to or the same as the voltage increase determining threshold value (i.e., the voltage increase determining line Lvs). Hereinafter, this state will be referred to as the sprung mass damping control prohibiting condition. The sprung mass damping control system of this third example embodiment is provided with a sprung mass damping control mode setting apparatus that determines whether this sprung mass damping control prohibiting condition is satisfied, and sets the control mode of the sprung mass damping control according to that determination result.

Figure 12:
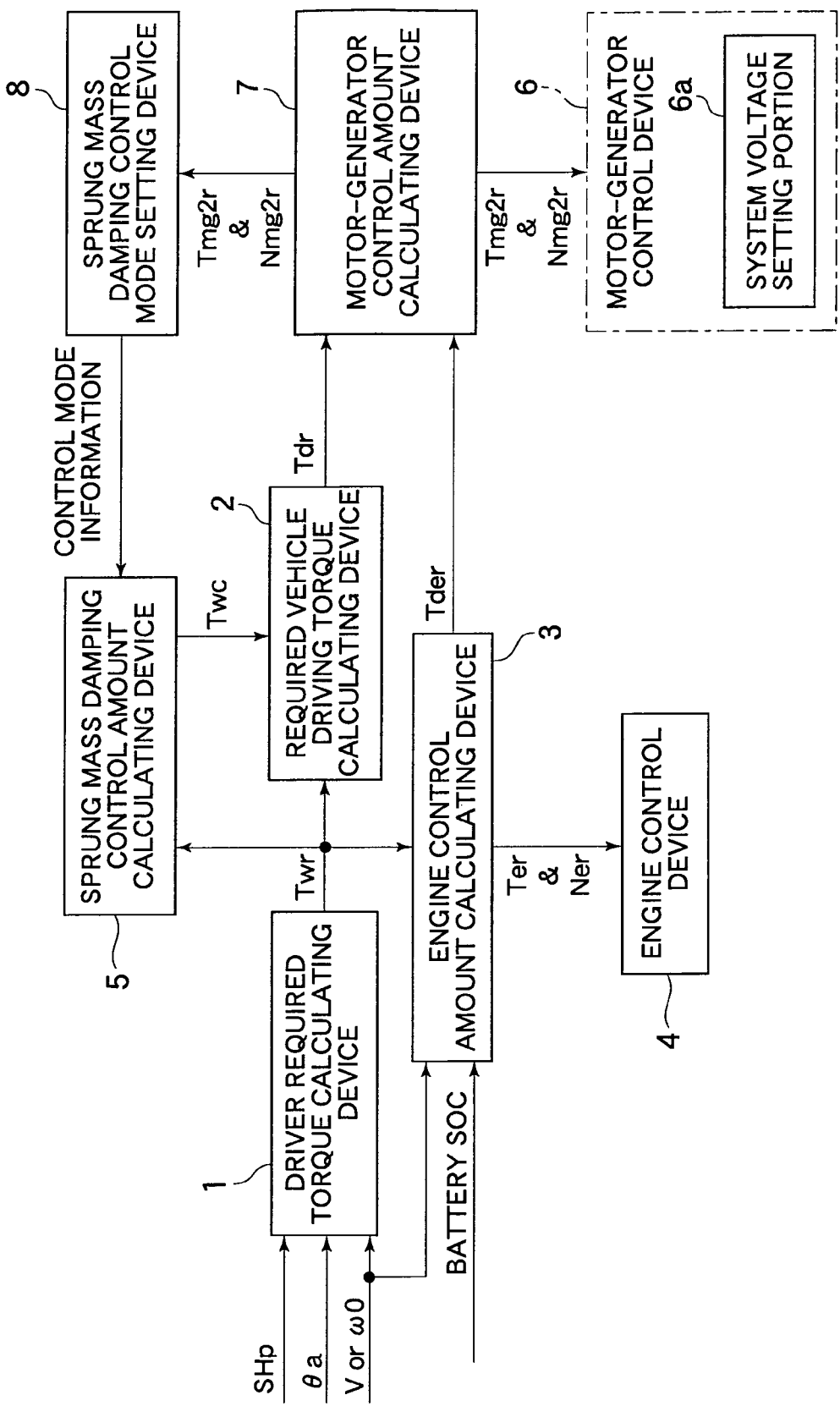
FIG. 12 is a view in the form of control blocks showing a frame format of an example of the functional structure of a sprung mass damping control system according to a third example embodiment of the invention.

The sprung mass damping control system of this third example embodiment is the same as the sprung mass damping control system of the first or second example embodiment described above but with the addition of the system voltage setting apparatus and the sprung mass damping control mode setting apparatus. FIG. 12 shows an example of the sprung mass damping control system according to the third example embodiment. The sprung mass damping control system shown in FIG. 12 is formed of the sprung mass damping control system according to the first or second example embodiment with the addition of i) a system voltage setting portion 6a as the system voltage setting apparatus 43 provided in the motor-generator control device 6, and ii) a sprung mass damping control mode setting device 8. The sprung mass damping control mode setting device 8 illustrated here is provided in the main ECU 101. Incidentally, when based on the second example embodiment, "Twc" in FIG. 12 is read as "Twc1" and "Tdr" is read as "Tdr1".

Figure 13:
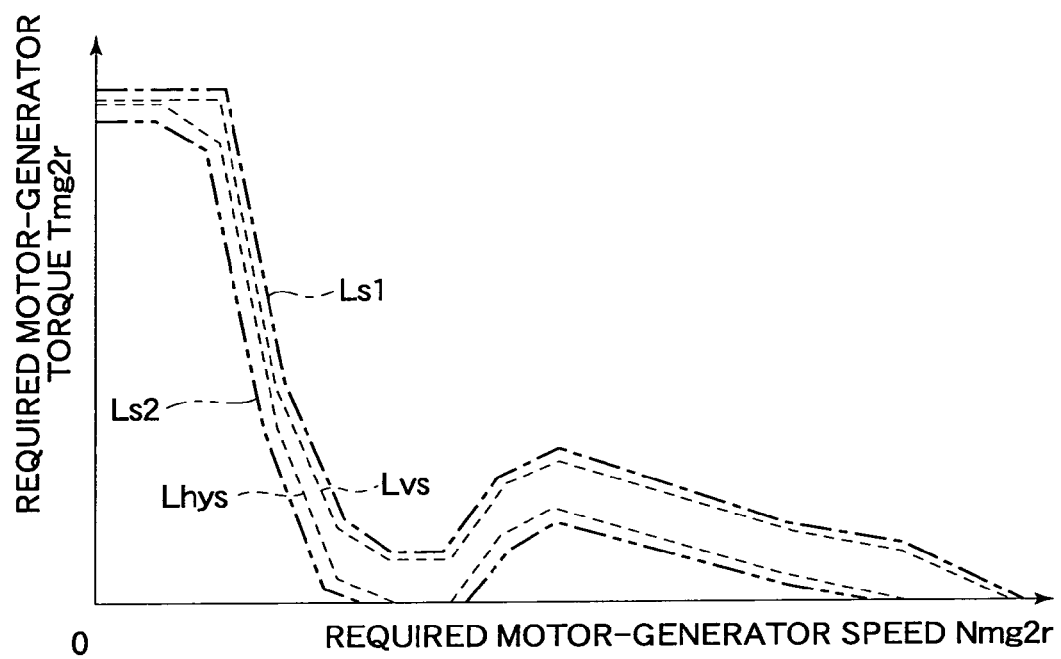
FIG. 13 is a view illustrating an example of a map for determining whether the system voltage of the inverter in the sprung mass damping control system according to the third example embodiment can be increased.

The sprung mass damping control mode setting device 8 determines whether the, sprung mass damping control prohibiting condition is satisfied using a map that is similar to the voltage increase possible/not possible determining map described above. Map data used for this determination (hereinafter referred to as a "sprung mass damping control prohibiting condition determining map") is the voltage increase possible/not possible determining map in FIG. 11 with the addition of the sprung mass damping control prohibiting condition, and is set in advance as shown in FIG. 13, for example. In this sprung mass damping control prohibiting condition determining map, taking calculation error and detection error and the like into account, the broad region with more leeway than the region between the voltage increase determining line Lvs and the hysteresis line Lhys is used as the region that satisfies the sprung mass damping control prohibiting condition. The region that satisfies the sprung mass damping control prohibiting condition refers to the region sandwiched between a first sprung mass damping control prohibiting line Ls1 and a second sprung mass damping control prohibiting line Ls2. For example, when viewed at a given required motor-generator speed Nmg2r, the first sprung mass damping control prohibiting line Ls1 is a line at which the motor-generator torque is a predetermined value larger than the torque value of the voltage increase determining line Lvs, and the second sprung mass damping control prohibiting line Ls2 is a line at which the motor-generator torque is a predetermined value smaller than the torque value of the hysteresis line Lhys. Here, the system voltage is increased when the motor-generator control amount crosses the first sprung mass damping control prohibiting line Ls1, not the voltage increase determining line Lvs. That is, on this sprung mass damping control prohibiting condition determining map, the first sprung mass damping control prohibiting line Ls1 is a voltage increase determining line. Incidentally, if this first sprung mass damping control prohibiting line Ls1 is not provided, the system voltage is increased when the motor-generator control amount crosses the voltage increase determining line Lvs.

Also, the motor-generator control amount calculating device 7 in this third example embodiment sets the required motor-generator speed Nmg2r as well as the required motor-generator torque Tmg2r as the motor-generator control amount, and outputs this motor-generator control amount to the motor-generator control device 6 and the 8.

Figure 14:
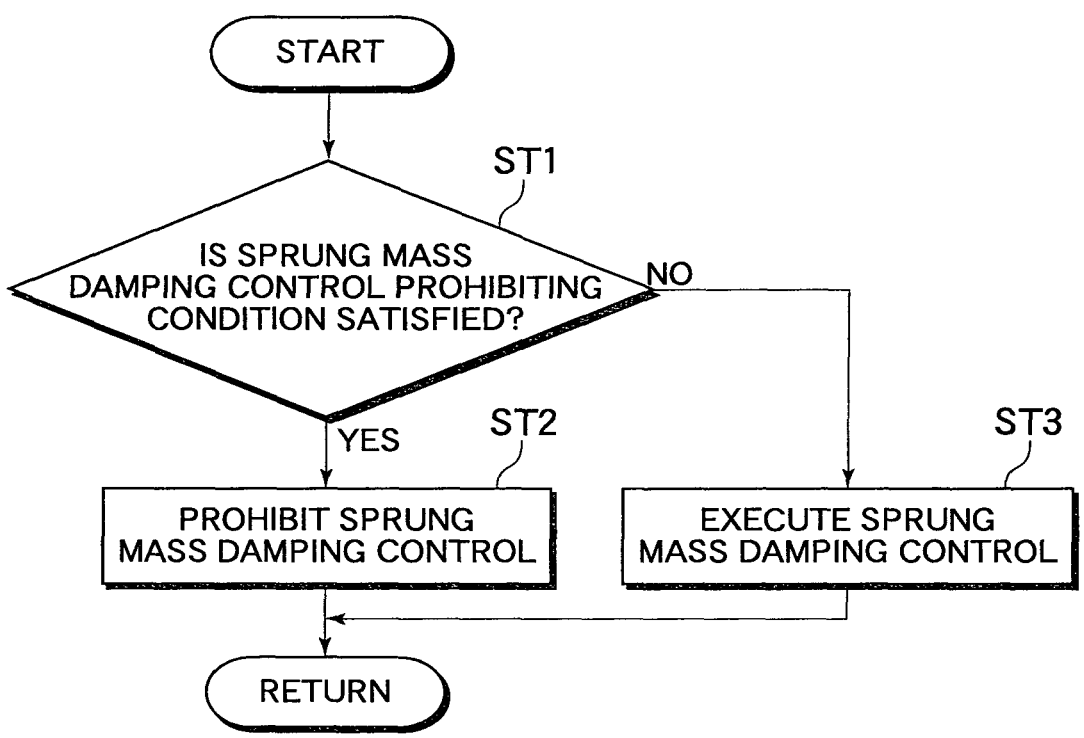
FIG. 14 is a flowchart illustrating a sprung mass damping control prohibiting operation of the sprung mass damping control system according to the third example embodiment.

As shown in the flowchart in FIG. 14, the sprung mass damping control mode setting device 8 determines whether the motor-generator control amount corresponds to (i.e., satisfies) the sprung mass damping control prohibiting condition (step ST1).

In step ST1, the received motor-generator control amount (i.e., the required motor-generator torque Tmg2r and the required motor-generator speed Nmg2r) are checked on the sprung mass damping control prohibiting condition determining map in FIG. 13. If the motor-generator control amount is within the sprung mass damping control prohibiting region which is sandwiched between the first sprung mass damping control prohibiting line Ls1 and the second sprung mass damping control prohibiting line Ls2, the sprung mass damping control mode setting device 8 determines that the motor-generator control amount satisfies the sprung mass damping control prohibiting condition. If, on the other hand, the motor-generator control amount is outside of that sprung mass damping control prohibiting region, the sprung mass damping control mode setting device 8 determines that the motor-generator control amount does not satisfy the sprung mass damping control prohibiting condition.

If it is determined that the sprung mass damping control prohibiting condition is satisfied, the sprung mass damping control system of this third example embodiment prohibits execution of the sprung mass damping control (step ST2). In contrast, if it is determined that the sprung mass damping control prohibiting condition is not satisfied, the sprung mass damping control system executes the sprung mass damping control as usual like in the first and second example embodiments described above (step ST3).

For example, the sprung mass damping control mode setting device 8 raises a sprung mass damping control prohibiting flag in step ST2, but raises a sprung mass damping control executing flag in flag in step ST3. This flag information is output to the sprung mass damping control amount calculating device 5 as control mode information of the sprung mass damping control.

In the sprung mass damping control amount calculating device 5, if the sprung mass damping control prohibiting flag is raised, even if the sprung mass damping control torque Twc (i.e., the sprung mass damping control amount) is determined to be some value, that sprung mass damping control torque Twc (i.e., the sprung mass damping control amount) is replaced with 0. Therefore, the adder 2a of the required vehicle driving torque calculating device 2 outputs the driver required torque Twr or the driver required torque Twr and the braking torque Tb as is. Accordingly, the sprung mass damping control is not executed even if the second motor-generator 32 outputs the motor-generator control amount set thereafter. Therefore, when the sprung mass damping control prohibiting condition is satisfied, the sprung mass damping control system of the third example embodiment prohibits the sprung mass damping control and thus will not frequently increase the system voltage. As a result, the hunting described above can be avoided, thus inhibiting a decrease in fuel efficiency.

If, on the other hand, the sprung mass damping control executing flag is raised, the sprung mass damping control amount calculating device 5 outputs the set sprung mass damping control torque Twc (i.e., the sprung mass damping control amount) to the adder 2a of the required vehicle driving torque calculating device 2 so that the sprung mass damping control is executed as usual. At this time, the sprung mass damping control is executed, but the motor-generator control amount will not go back and forth across the first sprung mass damping control prohibiting line Ls1 (or the voltage increase determining line Lvs if no first sprung mass damping control prohibiting line Ls1 is provided) which serves as the voltage increase determining line. Therefore, the hunting described above will not occur so the fuel efficiency will not be adversely affected by it.

It is helpful to prohibit the execution of the sprung mass damping control, and thereby avoid hunting, using the information related to the motor-generator control amount in the last calculation cycle in this way. Here, if the sprung mass damping control amount is adjusted, the positional relationship between the motor-generator control amount and the voltage increase determining line (i.e., the first sprung mass damping control prohibiting line Ls1) also changes. This can be used to prevent the motor-generator control amount from changing and crossing the first sprung mass damping control prohibiting line Ls1 that serves as the voltage increase determining line. Also, by adjusting the sprung mass damping control amount, the motor-generator control amount can be kept in one of the regions that sandwich the first sprung mass damping control prohibiting line Ls1 on the sprung mass damping control prohibiting condition determining map in FIG. 13. In any of these cases, increasing the sprung mass damping control amount applies unnecessarily movement to the vehicle body, so the sprung mass damping control amount is adjusted in the direction to reduce the amount. The sprung mass damping control amount, even if it is small, is included in the motor-generator control amount at this time, so sprung mass vibration can be suppressed, even if only slightly. That is, a decrease in fuel efficiency that accompanies hunting can be prevented and sprung mass vibration can be suppressed, even if only slightly, by appropriately adjusting the sprung mass damping control amount.

Therefore, in the description below, a sprung mass damping control system is described which, instead of immediately prohibiting the sprung mass damping control even if the motor-generator control amount is within the sprung mass damping control prohibiting region, adjusts the sprung mass damping control amount so that the motor-generator control amount will not cross the voltage increase determining line (i.e., the first sprung mass damping control prohibiting line Ls1) or so that the motor-generator control amount will not frequently go back and forth across that voltage increase determining line so as to prevent a decrease in fuel efficiency that accompanies hunting, while suppressing sprung mass vibration even if only slightly. In the description below, the sprung mass damping control prohibiting condition will be referred to as a sprung mass damping control restricting condition, and the sprung mass damping control prohibiting region will be referred to as a sprung mass damping control restricting region. Also, the first sprung mass damping control prohibiting line Ls1 may also be referred to as a first sprung mass damping control restricting line Ls1, and the second sprung mass damping control prohibiting line Ls1 may also be referred to as a second sprung mass damping control restricting line Ls1.

One possible example of this kind of sprung mass damping control system directly adjusts the sprung mass damping control amount. In this case, the sprung mass damping control system includes a sprung mass damping control amount adjusting apparatus that, when the motor-generator control amount (i.e., the required motor-generator torque Tmg2r and the required motor-generator speed Nmg2r) of the last calculation cycle is within the sprung mass damping control restricting region, restricts the sprung mass damping control amount so that the motor-generator control amount set in the current calculation cycle will not cross the first sprung mass damping control prohibiting line Ls1 or so that the motor-generator control amount will not frequently go back and forth across the first sprung mass damping control prohibiting line Ls1.

Figure 15:
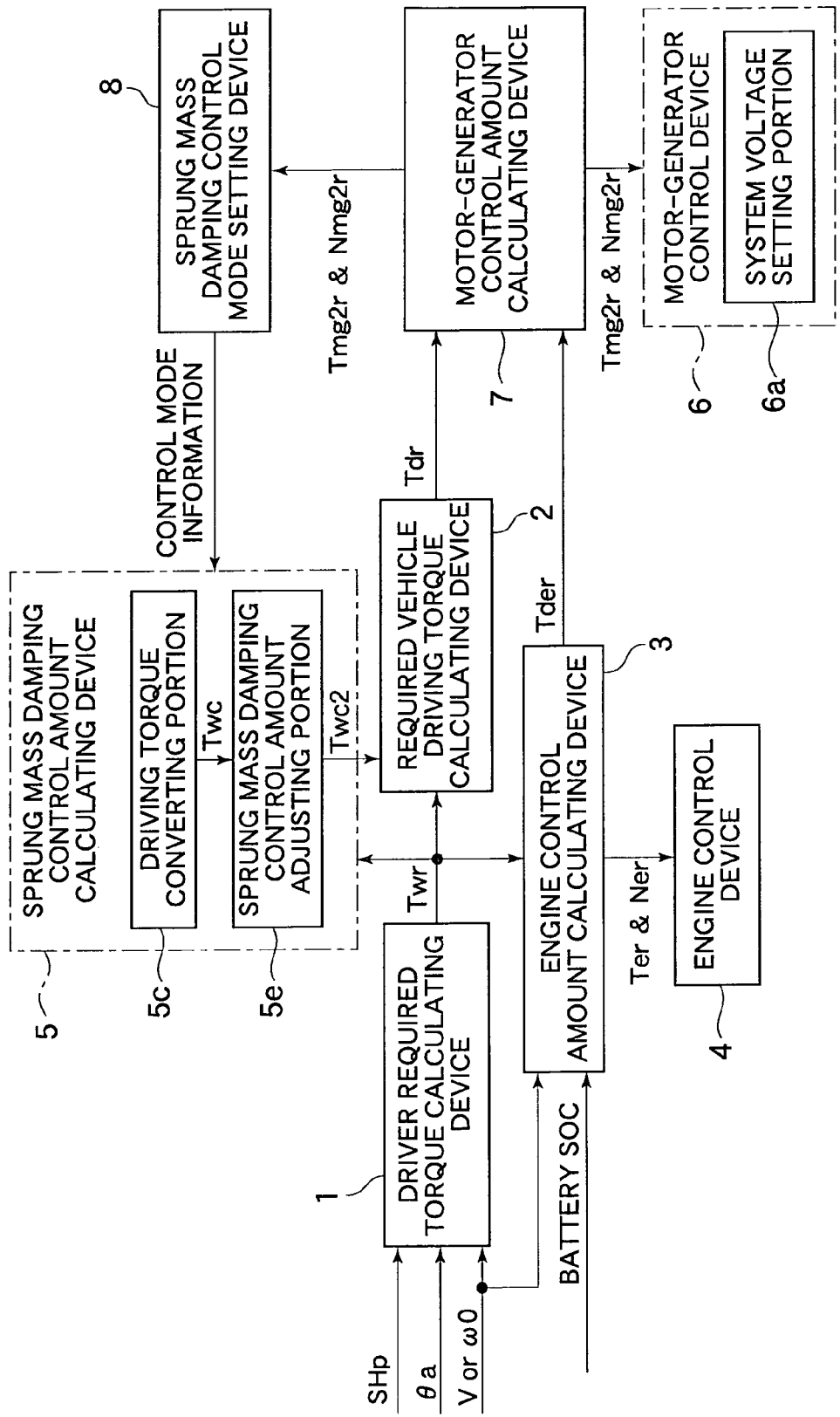
FIG. 15 is a view in the form of control blocks showing a frame format of another example of the functional structure of the sprung mass damping control system according to the third example embodiment of the invention.

As shown in FIG. 15, the sprung mass damping control system illustrated here has a sprung mass damping control amount adjusting portion 5e, which serves as the sprung mass damping control amount adjusting apparatus, provided in the sprung mass damping control amount calculating device 5 of the sprung mass damping control shown in FIG. 12. This sprung mass damping control amount adjusting portion 5e is arranged downstream or upstream of the driving torque converting portion 5c. In FIG. 15, the sprung mass damping control amount adjusting portion 5e is shown arranged upstream of the driving torque converting portion 5c as an example. Incidentally, when based on the sprung mass damping control system of the second example embodiment, the sprung mass damping control amount adjusting portion 5e may also be provided downstream of the sprung mass damping control responsiveness compensating portion 5d.

This sprung mass damping control amount adjusting portion 5e, for example, multiplies the sprung mass damping control torque Twc output from the driving torque converting portion 5c by a predetermined gain Kf (≤1), and then outputs the thus obtained sprung mass damping control torque Twc2 (=Twc×Kf) as the sprung mass damping control amount to the adder 2a of the required vehicle driving torque calculating device 2.

The gain Kf is set to 1 (i.e., Kf=1) to execute sprung mass damping control as usual if the motor-generator control amount (i.e., the required motor-generator torque Tmg2r and the required motor-generator speed Nmg2r) of the last calculation cycle is not within the sprung mass damping control restricting region.

If, on the other hand, the motor-generator control amount is within the sprung mass damping control restricting region, then fundamentally the gain Kf is preferably set to a value less than one (i.e., Kf<1) so that the motor-generator control amount set in the calculation current cycle will not cross the first sprung mass damping control prohibiting line Ls1 or will not frequently go back and forth across the first prohibiting line Ls1.

Here, the term "fundamentally" is used because there is little change in the sprung mass damping control amount between consecutive calculation cycles, and further, the sprung mass damping control amount is only a small percentage of the required motor-generator torque Tmg2r, so in most cases it is thought that the motor-generator control amount will not cross the first sprung mass damping control prohibiting line Ls1. However, the sprung mass damping control torque Twc obtained by the driving torque converting portion 5c may be not only a positive value, but also a negative value. The motor-generator control amount of the current calculation cycle becomes smaller than normal (i.e., Kf=1) if the sprung mass damping control torque Twc is a positive value, and larger than normal (i.e., Kf=1) if the sprung mass damping control torque Twc is a negative value. Moreover, the motor-generator control amount of the last calculation cycle may be in either of the two regions (i.e., either the upper region or the lower region in FIG. 13) that sandwich the first sprung mass damping control prohibiting line Ls1. Therefore, if the sprung mass damping control amount is adjusted using a gain Kf that is less than 1 when the motor-generator control amount is in the region above the first sprung mass damping control prohibiting line Ls1 (i.e., the upper region) and the sprung mass damping control torque Twc is a positive value, the motor-generator control amount of the current calculation cycle may cross the first sprung mass damping control prohibiting line Ls1 and move to the lower region. Also, if the sprung mass damping control amount is adjusted using a gain Kf that is less than 1 when the last motor-generator control amount is in the region below the first sprung mass damping control prohibiting line Ls1, i.e., the lower region, and the sprung mass damping control torque Twc is a negative value, the motor-generator control amount of the current calculation cycle may cross the first sprung mass damping control prohibiting line Ls1 and move to the upper region. Therefore, when these conditions are satisfied, the gain Kf may be set to 1 so that the sprung mass damping control amount will not be adjusted, thereby preventing the motor-generator control amount from crossing the first sprung mass damping control prohibiting line Ls1 which serves as the voltage increase determining line.

The gain Kf may be prepared in advance as map data with the motor-generator control amount (i.e., the required motor-generator torque Tmg2r and the required motor-generator speed Nmg2r) as parameters. For example, the gain Kf may be a value that is set in advance, but it is preferably set on a case-by-case basis based on the positional relationship of the motor-generator control amount and the first sprung mass damping control prohibiting line Ls1, and the sign, i.e., negative or positive, of the sprung mass damping control torque Twc, so that sprung mass damping control is performed with the maximum sprung mass damping control amount while maintaining fuel efficiency performance.

Figure 16:
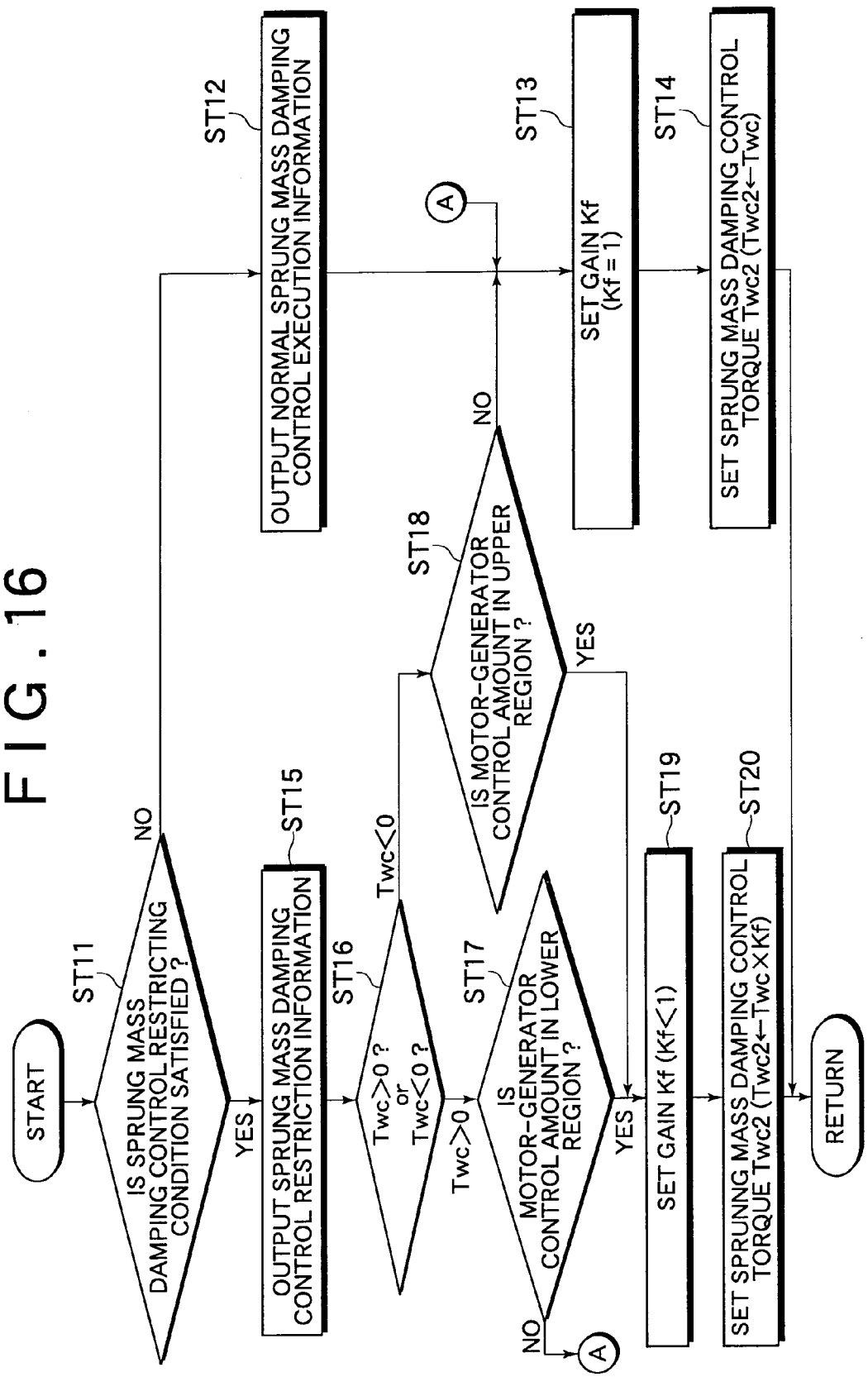
FIG. 16 is a flowchart illustrating a sprung mass damping control restricting operation of the sprung mass damping control system according to the third example embodiment.

More specifically, just as in the previous example, the sprung mass damping control mode setting device 8 in this case determines whether the motor-generator control amount set by the motor-generator control amount calculating device 7 satisfies the sprung mass damping control restricting condition, as shown in FIG. 16 (step ST11).

If it is determined in step ST11 that the sprung mass damping control restricting condition is not satisfied, then the sprung mass damping control mode setting device 8 outputs a command indicative of the normal non-restricted sprung mass damping control amount as control mode information of sprung mass damping control to the sprung mass damping control amount calculating device 5 (step ST12).

Once the sprung mass damping control amount calculating device 5 has received that control mode information, i.e., the normal sprung mass damping control execution information, the sprung mass damping control amount adjusting portion 5e sets the usual gain Kf (=1) (step ST13), and sets the sprung mass damping control torque Twc as it is from the driving torque converting portion 5c to the final sprung mass damping control torque Twc2 as the sprung mass damping control amount (step ST14). Therefore, at this time, sprung mass damping control is executed as usual. However, the required motor-generator torque Tmg2r is originally outside of the region that satisfies the sprung mass damping control restricting condition, so even if the system voltage is increased, the hunting described above will not occur and will therefore not affect the fuel efficiency.

If, on the other hand, it is determined in step ST11 that the sprung mass damping control restricting condition is satisfied, the sprung mass damping control mode setting device 8 outputs the control mode information of the sprung mass damping control restriction to the sprung mass damping control amount calculating device 5 (step ST15). The control mode information of the sprung mass damping control restriction at this time is at least a command indicating that it may become necessary to restrict the sprung mass damping control amount, and information related to the motor-generator control amount received from the motor-generator control amount calculating device 7. The motor-generator control amount received from the motor-generator control amount calculating device 7 is the motor-generator control amount set in the last calculation cycle.

Once the sprung mass damping control amount calculating device 5 has received that control mode information, i.e., the sprung mass damping control restriction information, the sprung mass damping control amount adjusting portion 5e determines whether the sprung mass damping control torque Twc obtained by the driving torque converting portion 5c in the current calculation cycle is a positive value or a negative value (step ST16). If the sprung mass damping control torque Twc is a positive value, the sprung mass damping control amount adjusting portion 5e then determines whether the motor-generator control amount received in step ST15 is in the region below the first sprung mass damping control prohibiting line Ls1 (step ST17). If, on the other hand, the sprung mass damping control torque Twc is a negative value, the sprung mass damping control amount adjusting portion 5e determines whether the motor-generator control amount is in the region above the first sprung mass damping control prohibiting line Ls1 (step ST18).

If the determination in either step ST17 or step ST18 is Yes, then the sprung mass damping control amount adjusting portion 5e sets a gain Kf that is less than 1 (step ST19), and sets the final sprung mass damping control torque Twc2 (=Twc× Kf) as the sprung mass damping control amount based on that gain Kf (<1) (step ST20).

The final sprung mass damping control torque Twc2 set in step ST20 is output to the adder 2a of the required vehicle driving torque calculating device 2 as the sprung mass damping control amount, where it is used to set the motor-generator control amount (i.e., the required motor-generator torque Tmg2r and the required motor-generator speed Nmg2r) of the current calculation cycle. If at this time the sprung mass damping control torque Twc is a positive value, the final required vehicle driving torque Tdr set in the required vehicle driving torque calculating device 2 is smaller than normal (Kf=1), so a required motor-generator torque Tmg2r that is smaller than normal is set. Therefore, the motor-generator control amount at this time remains in the region below the first sprung mass damping control prohibiting line Ls1, and thus does not cross the first sprung mass damping control prohibiting line Ls1. If, on the other hand, the sprung mass damping control torque Twc is a negative value, the final required vehicle driving torque Tdr of the required vehicle driving torque calculating device 2 is larger than normal (Kf=1), so a required motor-generator torque Tmg2r that is larger than normal is set. Therefore, the motor-generator control amount at this time remains in the region above the first sprung mass damping control prohibiting line Ls1, and thus does not cross the first sprung mass damping control prohibiting line Ls1.

Meanwhile, if the determination in either step ST17 or step ST18 is No, the process proceeds on to step ST13 where the sprung mass damping control amount adjusting portion 5e sets the usual gain Kf (=1) and the sprung mass damping control is executed as usual. In this case, if the sprung mass damping control torque Twc is a positive value, the motor-generator control amount set by the motor-generator control amount calculating device 7 remains in the region above the first sprung mass damping control prohibiting line Ls1 and does not cross that first sprung mass damping control prohibiting line Ls1. If, on the other hand, the sprung mass damping control torque Twc is a negative value, the motor-generator control amount set by the motor-generator control amount calculating device 7 remains in the region below the first sprung mass damping control prohibiting line Ls1 and does not cross that first sprung mass damping control prohibiting line Ls1.

In this way, the sprung mass damping control system here is structured such that the motor-generator control amount will not go back and forth across the first sprung mass damping control prohibiting line Ls1. Accordingly, the hunting described above can be suppressed, and sprung mass damping control can be executed while a decrease in fuel efficiency can be suppressed.

Furthermore, the sprung mass damping control amount adjusting portion 5e may use upper and lower limit guard values that restrict the sprung mass damping control amount, instead of the gain Kf described above. The sprung mass damping control amount may be a positive value or a negative value, so the upper and lower limit guard values may be such that the upper limit is a positive value and the lower limit is a negative value. For example, these upper and lower limit guard values are such that the width between the upper value and the lower value is large so as not to restrict the sprung mass damping control amount when the sprung mass damping control restricting condition is not satisfied. Here, the upper limit and the lower limit at this time will be references. If the motor-generator control amount is a positive value when the sprung mass damping control restricting condition is satisfied, the sprung mass damping control amount adjusting portion 5e changes at least the upper limit value of the reference upper and lower limit guard values to a small value. If, on the other hand, the sprung mass damping control amount is a negative value when the sprung mass damping control restricting condition is satisfied, the sprung mass damping control amount adjusting portion 5e changes at least the lower limit value of the reference upper and lower limit guard values to a large value.

The upper and lower limit guard values during the sprung mass damping control restriction may be determined based on the same concept as the gain Kf described above. Accordingly, preset upper and lower limit values may be used for the upper and lower limit guard values during this sprung mass damping control restriction, but they are preferably set on a case-by-case basis based on the positional relationship of the motor-generator control amount and the first sprung mass damping control prohibiting line Ls1 which is the voltage increase determining line, and the sign, i.e., negative or positive, of the sprung mass damping control torque Twc, so that the sprung mass damping control is performed with the maximum sprung mass damping control amount while maintaining fuel efficiency performance.

If the motor-generator control amount (i.e., the required motor-generator torque Tmg2r and the required motor-generator speed Nmg2r) of the last calculation cycle is not within the sprung mass damping control restricting region, the sprung mass damping control amount adjusting portion 5e sets the reference upper and lower guard limit values so that the sprung mass damping control will be executed as usual. Here, it is also conceivable that upper and lower limit guard values are prepared for control other than suppressing hunting this time, so the width between the upper and lower limit guard values may also be narrower than the width between the reference upper and lower limit guard values. In this case, the sprung mass damping control amount needs to be restricted in this control, so the upper and lower limit guard values for this control are preferably used as they are.

If, on the other hand, the motor-generator control amount is within the sprung mass damping control restricting range, the sprung mass damping control amount adjusting portion 5e adjusts the upper and lower limit values to the reference upper and lower limit guard values so that the motor-generator control amount set in the current calculation cycle will not cross the first sprung mass damping control prohibiting line Ls1 or so that the motor-generator control amount will not frequently go back and forth across the first sprung mass damping control prohibiting line Ls1.

More specifically, if the motor-generator control amount of the last calculation cycle is in the region below the first sprung mass damping control prohibiting line Ls1 and the sprung mass damping control torque Twc is a positive value, the sprung mass damping control amount adjusting portion 5e reduces at least the upper limit value of the reference upper and lower limit guard values and sets the upper and lower limit guard values so that the width between them is narrower. As a result, the motor-generator control amount remains in the region below the first sprung mass damping control prohibiting line Ls1, just as in the last calculation cycle. Also, if the motor-generator control amount is in the region above the first sprung mass damping control prohibiting line Ls1 and the sprung mass damping control torque Twc is a negative value, the sprung mass damping control amount adjusting portion 5e brings at least the lower limit value of the reference upper and lower limit guard values close to 0 and sets the upper and lower limit guard values so that the width between them is narrower. As a result, the motor-generator control amount remains in the region above the first sprung mass damping control prohibiting line Ls1, just as in the last calculation cycle.

If, on the other hand, that motor-generator control amount is in the region above the first sprung mass damping control prohibiting line Ls1 and the sprung mass damping control torque Twc is a positive value, or if that motor-generator control amount is in the region below the first sprung mass damping control prohibiting line Ls1 and the sprung mass damping control torque Twc is a negative value, the sprung mass damping control amount adjusting portion 5e sets the reference upper and lower limit guard values as the upper and lower limit guard values. As a result, the motor-generator control amount remains in one of the regions that sandwich the first sprung mass damping control prohibiting line Ls1, just as in the last calculation cycle.

Figure 17:
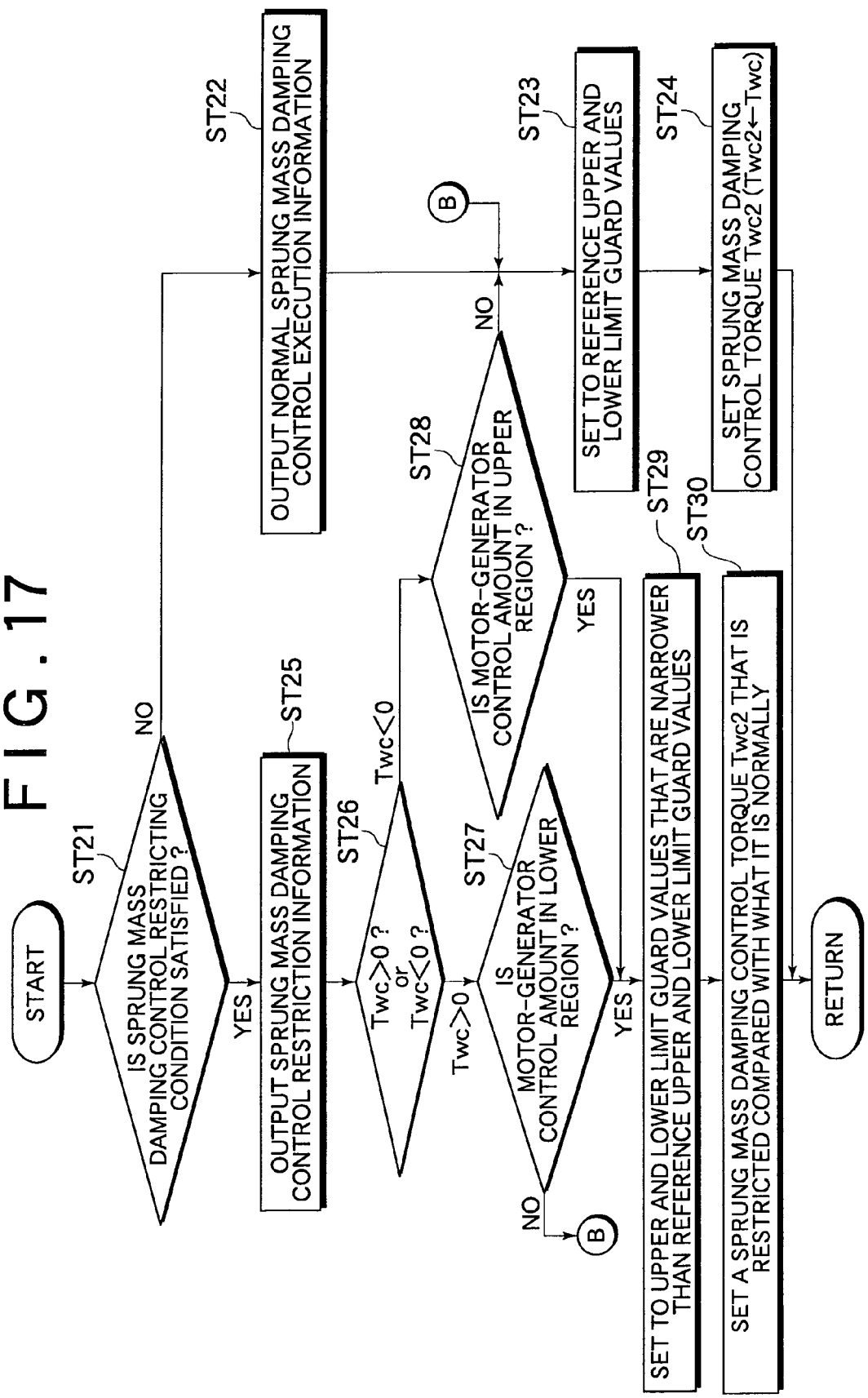
FIG. 17 is a flowchart illustrating another example of a sprung mass damping control restricting operation of the sprung mass damping control system according to the third example embodiment.

The sprung mass damping control mode setting device 8 in this case determines whether the motor-generator control amount set by the motor-generator control amount calculating device 7 satisfies the sprung mass damping control restricting condition, as shown in the flowchart in FIG. 17 (step ST21).

If it is determined in step ST21 that the sprung mass damping control restricting condition is not satisfied, then sprung mass damping control mode setting device 8 outputs a command indicative of the normal non-restricted sprung mass damping control amount as control mode information of the sprung mass damping control to the sprung mass damping control amount calculating device 5 (step ST22), just as in step ST12 in FIG. 16.

Once the sprung mass damping control amount calculating device 5 has received that normal sprung mass damping control execution information, the sprung mass damping control amount adjusting portion 5e sets the reference upper and lower guard values (step ST23), and then sets the sprung mass damping control torque Twc from the driving torque converting portion 5c as it is to the final sprung mass damping control torque Twc2 Twc2 as the sprung mass damping control value (step ST24). Therefore, at this time, sprung mass damping control is executed as usual. However, the required motor-generator torque Tmg2r is originally outside of the region that satisfies the sprung mass damping control restricting condition, so even if the system voltage is increased, the hunting described above will not occur and will therefore not affect the fuel efficiency.

If, on the other hand, it is determined in step ST21 that the sprung mass damping control restricting condition is satisfied, the sprung mass damping control mode setting device 8 outputs the control mode information of the sprung mass damping control restriction to the sprung mass damping control amount calculating device 5 (step ST25), just as in step ST15 in FIG. 16.

Once the sprung mass damping control amount calculating device 5 has received that sprung mass damping control restriction information, the sprung mass damping control amount adjusting portion 5e determines whether the sprung mass damping control torque Twc obtained by the driving torque converting portion 5c in the current calculation cycle is a positive value or a negative value (step ST26). If the sprung mass damping control torque Twc is a positive value, the sprung mass damping control amount adjusting portion 5e then determines whether the motor-generator control amount received in step ST25 is in the region below the first sprung mass damping control prohibiting line Ls1 (step ST27). If, on the other hand, the sprung mass damping control torque Twc is a negative value, the sprung mass damping control amount adjusting portion 5e determines whether the motor-generator control amount is in the region above the first sprung mass damping control prohibiting line Ls1 (step ST28).

If the determination in step ST27 or step ST28 is Yes, the sprung mass damping control amount adjusting portion 5e sets the upper and lower limit guard values so that the width between them is narrower than the width between the reference upper and lower limit guard values according to the sign, i.e., positive or negative, of the sprung mass damping control torque Twc (step ST29), and sets the final sprung mass damping control torque Twc2 Twc2 as the sprung mass damping control amount based on those upper and lower limit values (step ST30). When the sprung'mass damping control torque Twc is a positive value, the sprung mass damping control amount adjusting portion 5e changes the upper limit value of the reference upper and lower limit values to a small value and sets the final sprung mass damping control torque Twc2 smaller than that sprung mass damping control torque Twc (i.e., Twc>Twc2). If, on the other hand, the sprung mass damping control torque Twc is a negative value, the sprung mass damping control amount adjusting portion 5e changes the lower limit value of the upper and lower limit guard values to a large value and sets the final sprung mass damping control torque Twc2 larger than that sprung mass damping control torque Twc (i.e., Twc<Twc2).

The final sprung mass damping control torque Twc2 set in step ST30 is output to the adder 2a of the required vehicle driving torque calculating device 2 as the sprung mass damping control amount, where it is used to set the motor-generator control amount (i.e., the required motor-generator torque Tmg2r and the required motor-generator speed Nmg2r) in the current calculation cycle. If the sprung mass damping control torque Twc is a positive value at this time, the final required vehicle driving torque Tdr set in the required vehicle driving torque calculating device 2 is smaller than normal (i.e., when the reference upper and lower limit guard values are set), so a required motor-generator torque Tmg2r that is smaller than normal is set. Therefore, the motor-generator control amount at this time remains in the region below the first sprung mass damping control prohibiting line Ls1 and does not cross that first sprung mass damping control prohibiting line Ls1. If, on the other hand, the sprung mass damping control torque Twc is a negative value, the final required vehicle driving torque Tdr in the required vehicle driving torque calculating device 2 is larger than normal (i.e., when the reference upper and lower limit guard values are set), so a required motor-generator torque Tmg2r that is larger than normal is set. Therefore, the motor-generator control amount at this time remains in the region above the first sprung mass damping control prohibiting line Ls1 and does not cross that first sprung mass damping control prohibiting line Ls1.

If, on the other hand, the determination in step ST27 or step ST28 is No, the process proceeds on to step ST23 where the sprung mass damping control amount adjusting portion 5e sets the reference upper and lower limit guard values to upper and lower limit guard values such that the sprung mass damping control is executed as usual. In this case, if the sprung mass damping control torque Twc is a positive value, the motor-generator control amount set by the motor-generator control amount calculating device 7 remains in the region above the first sprung mass damping control prohibiting line Ls1 and does not cross that first sprung mass damping control prohibiting line Ls1. In contrast, if the sprung mass damping control torque Twc is a negative value, that motor-generator control amount remains in the region below the first sprung mass damping control prohibiting line Ls1 and does not cross that first sprung mass damping control prohibiting line Ls1.

In this way, with this sprung mass damping control system as well, the motor-generator control amount will not go back and forth across the first sprung mass damping control prohibiting line Ls1. Accordingly, the hunting described above can be suppressed, and the sprung mass damping control can be executed while a decrease in fuel efficiency can be suppressed.

Figure 18:
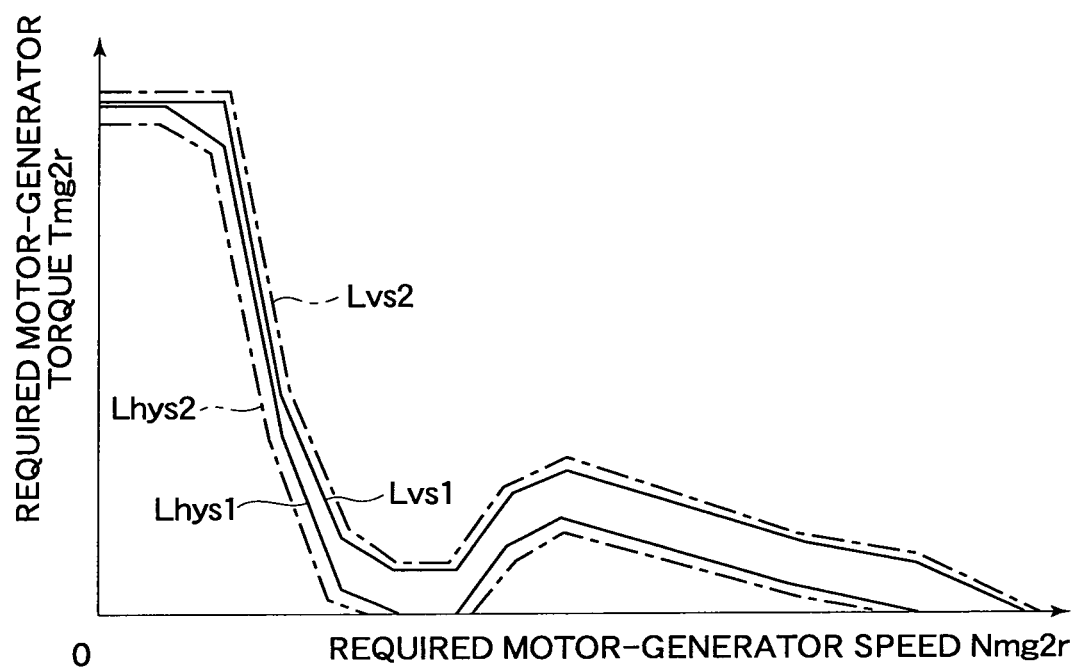
FIG. 18 is a view illustrating another example of a map for determining whether the system voltage of the inverter of the sprung mass damping control system according to the third example embodiment can be increased.

Furthermore, a voltage increase determining threshold value for when the sprung mass damping control is being prohibited may be prepared separately from a voltage increase determining threshold value for when the sprung mass damping control is being executed. In this case, for example, as shown in FIG. 18, a voltage increase determining line Lvs1 and a hysteresis line Lhys1 for when the sprung mass damping control is being prohibited may be prepared as one set of voltage increase determining threshold values, and a voltage increase determining line Lhys2 and a hysteresis line Lhys2 for when the sprung mass damping control is being executed may be prepared as another set of voltage increase determining threshold values.

Figure 11:
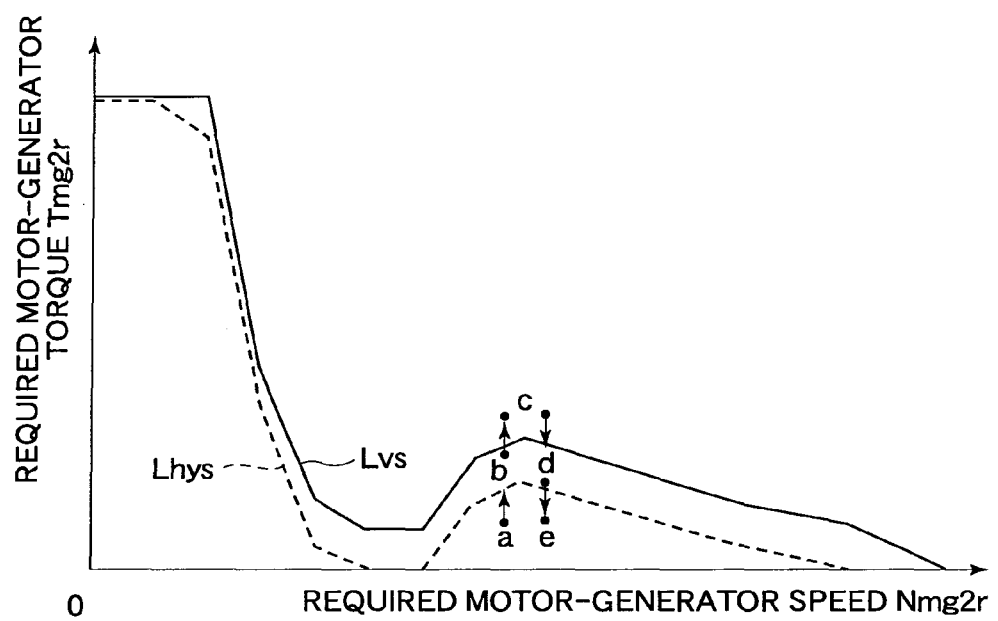
FIG. 11 is a view illustrating an example of a map for determining whether the system voltage of the inverter can be increased.

The voltage increase determining line Lvs1 and the hysteresis line Lhys1 for when the sprung mass damping control is being prohibited may be the same as the voltage increase determining line Lvs and the hysteresis line Lhys, respectively, in FIG. 11 described above, or they may be the same as the first sprung mass damping control prohibiting line Ls1 and the second sprung mass damping control prohibiting line Ls2 in FIG. 13, in which case there is more leeway.

Meanwhile, taking into account sprung mass damping control when it is assumed that the vehicle is traveling on a typical road, for example, the voltage increase determining line Lvs2 and the hysteresis line Lhys2 for when the sprung mass damping control is being executed may be set so that the system voltage is increased if the vehicle is traveling as assumed. The voltage increase determining line Lvs2 is set so that there is a motor-generator control amount for both the minimum and maximum sprung mass damping control amounts conceivable for that road, in the region around that voltage increase determining line Lvs2.

Figure 19:
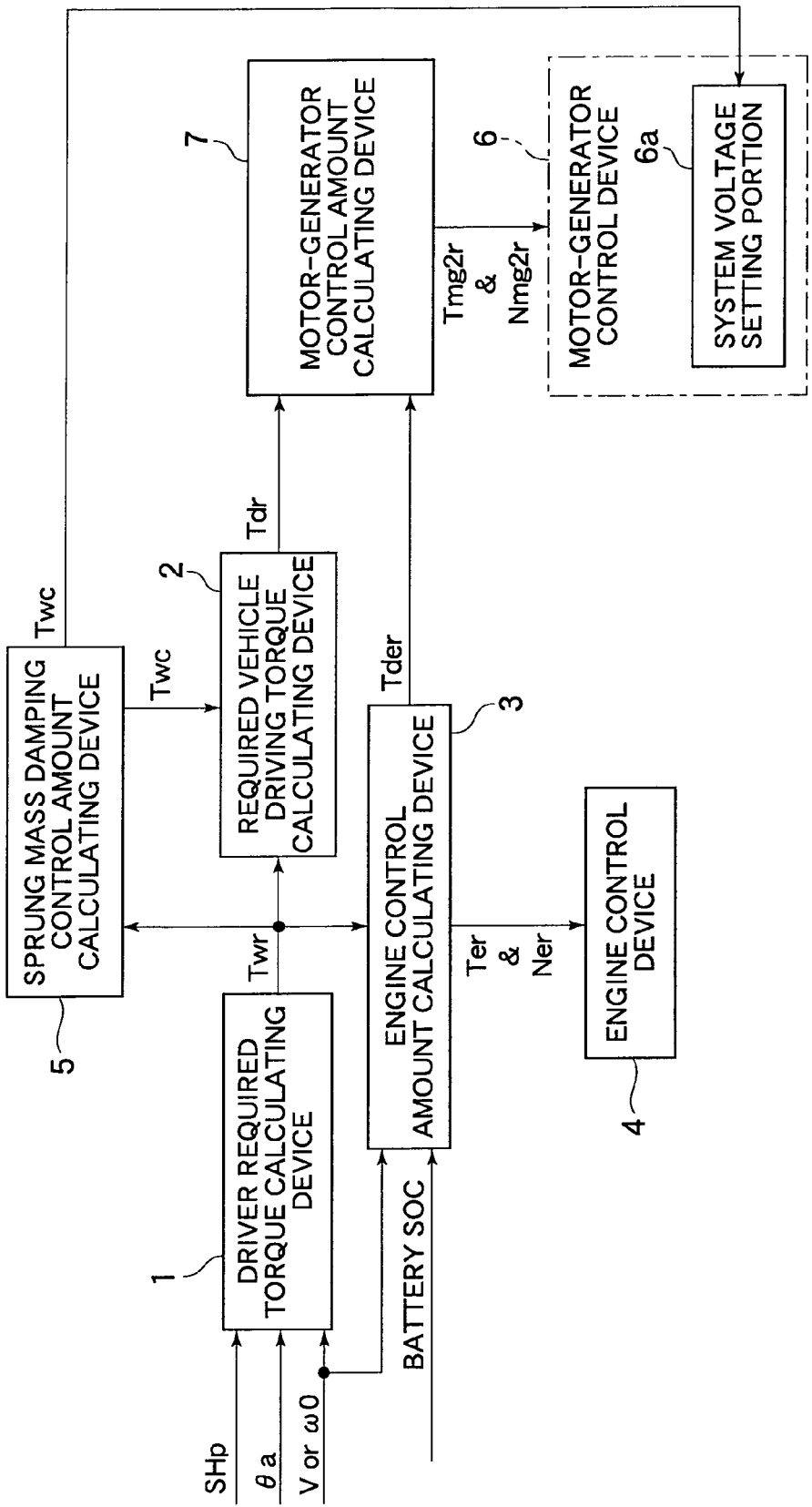
FIG. 19 is a view in the form of control blocks showing a frame format of another example of the functional structure of the sprung mass damping control system according to the third example embodiment of the invention.
Figure 20:
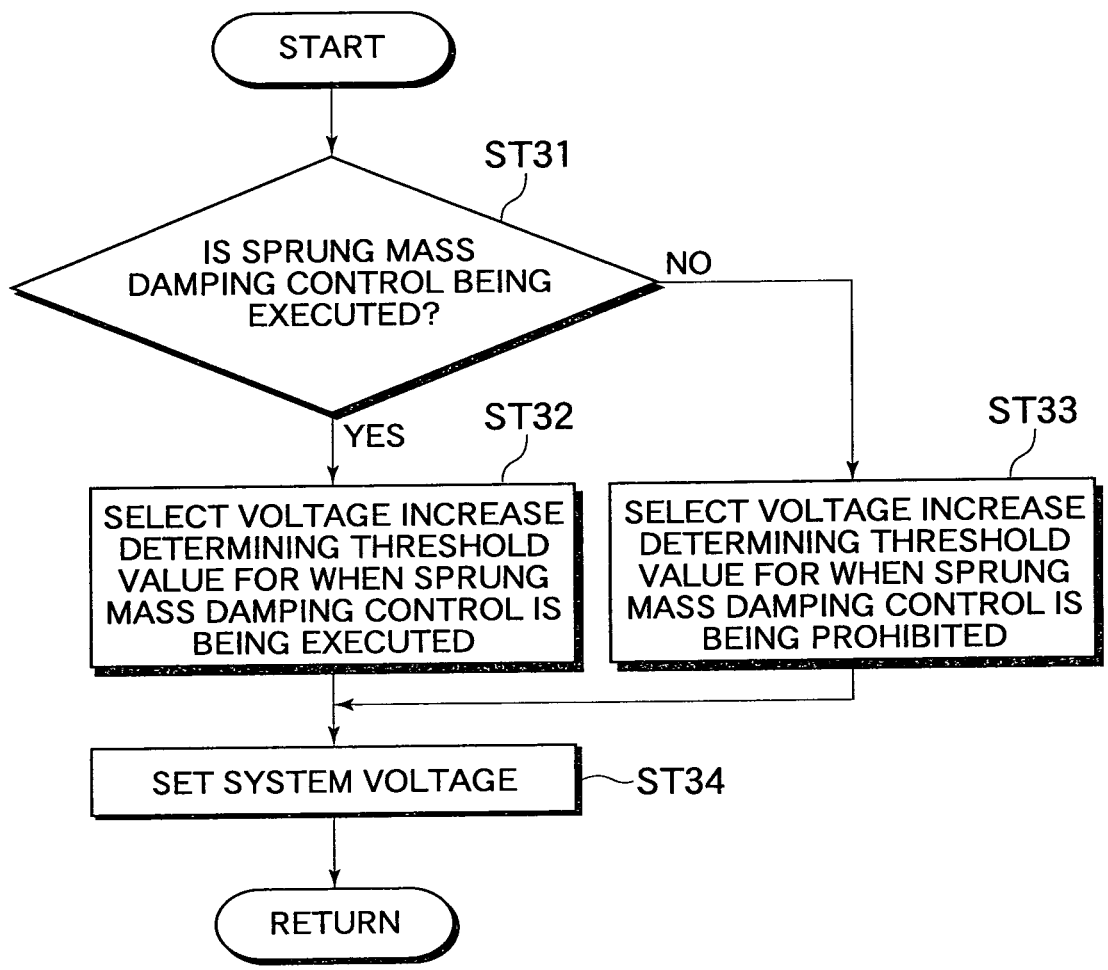
FIG. 20 is a flowchart illustrating a routine for determining whether the system voltage of the inverter can be increased when sprung mass damping control is being executed in the sprung mass damping control system according to the third example embodiment.

As shown in FIG. 19, the sprung mass damping control system is a combination of the motor-generator control device 6 of the sprung mass damping control system in the first or second example embodiment described above, and the system voltage setting portion 6a described above. In this case, this system voltage setting portion 6a switches between the voltage increase determining threshold value when prohibiting sprung mass damping control and the voltage increase determining threshold value when executing sprung mass damping control.

Also, the motor-generator control amount calculating device 7 of this sprung mass damping control system outputs the required motor-generator torque Tmg2r and the required motor-generator speed Nmg2r as the motor-generator control amount to the motor-generator control device 6. Further, the sprung mass damping control amount calculating device 5 outputs the sprung mass damping control torque Twc (i.e., the sprung mass damping control amount) converted by the driving torque converting portion 5c to the motor-generator control device 6.

More specifically, the system voltage setting portion 6a of the motor-generator control device 6 determines whether the sprung mass damping control is being executed based on the sprung mass damping control torque Twc (i.e., the sprung mass damping control amount) received from the sprung mass damping control amount calculating device 5 (step ST31 (shown in the flowchart in FIG. 20)).

If the received sprung mass damping control torque Twc (i.e., the sprung mass damping control amount) is a value other than 0, it is determined in step ST31 that sprung mass damping control is being executed. If, on the other hand, the received sprung mass damping control torque Twc (i.e., the sprung mass damping control amount) is 0, it is determined in step ST31 that sprung mass damping control is prohibited from being executed. Also, in step ST31, if the motor-generator control device 6 may receive a command prohibiting sprung mass damping control, then the system voltage setting portion 6a may determine that sprung mass damping control is being prohibited if that prohibiting command has been received, and may determine that sprung mass damping control is being executed if that prohibiting command has not been received.

If sprung mass damping control is being executed, the system voltage setting portion 6a selects the voltage increase determining threshold value for when sprung mass damping control is being executed (i.e., the voltage increase determining line Lvs2 and the hysteresis line Lhys2) (step ST32). If sprung mass damping control is being prohibited, the system voltage setting portion 6a selects the voltage increase determining threshold value for when sprung mass damping control is being prohibited (i.e., the voltage increase determining line Lvs1 and the hysteresis line Lhys1) (step ST33).

Then the system voltage setting portion 6a sets the system voltage of the inverter 42 using the selected voltage increase determining threshold value (step ST34). If at this time sprung mass damping control is being executed, the system voltage setting portion 6a determines whether the system voltage needs to be increased, using the voltage increase determining threshold values (i.e., the voltage increase determining line Lvs2 and the hysteresis line Lhys2) that are optimized for when sprung mass damping control is being executed. In this case, as described above, if the vehicle is traveling as assumed, the system voltage setting portion 6a sets this voltage increase determining threshold value for when sprung mass damping control is being executed so that the system voltage will not be increased. Accordingly, in this sprung mass damping control system, even while sprung mass damping control is being executed, as long as the vehicle is traveling in an expected state, the motor-generator control amount will not frequently go back and forth across the voltage increase determining line Lvs2. Accordingly, the hunting described above can be suppressed, and sprung mass damping control can be executed while a decrease in fuel efficiency can be suppressed.

Figure 21:
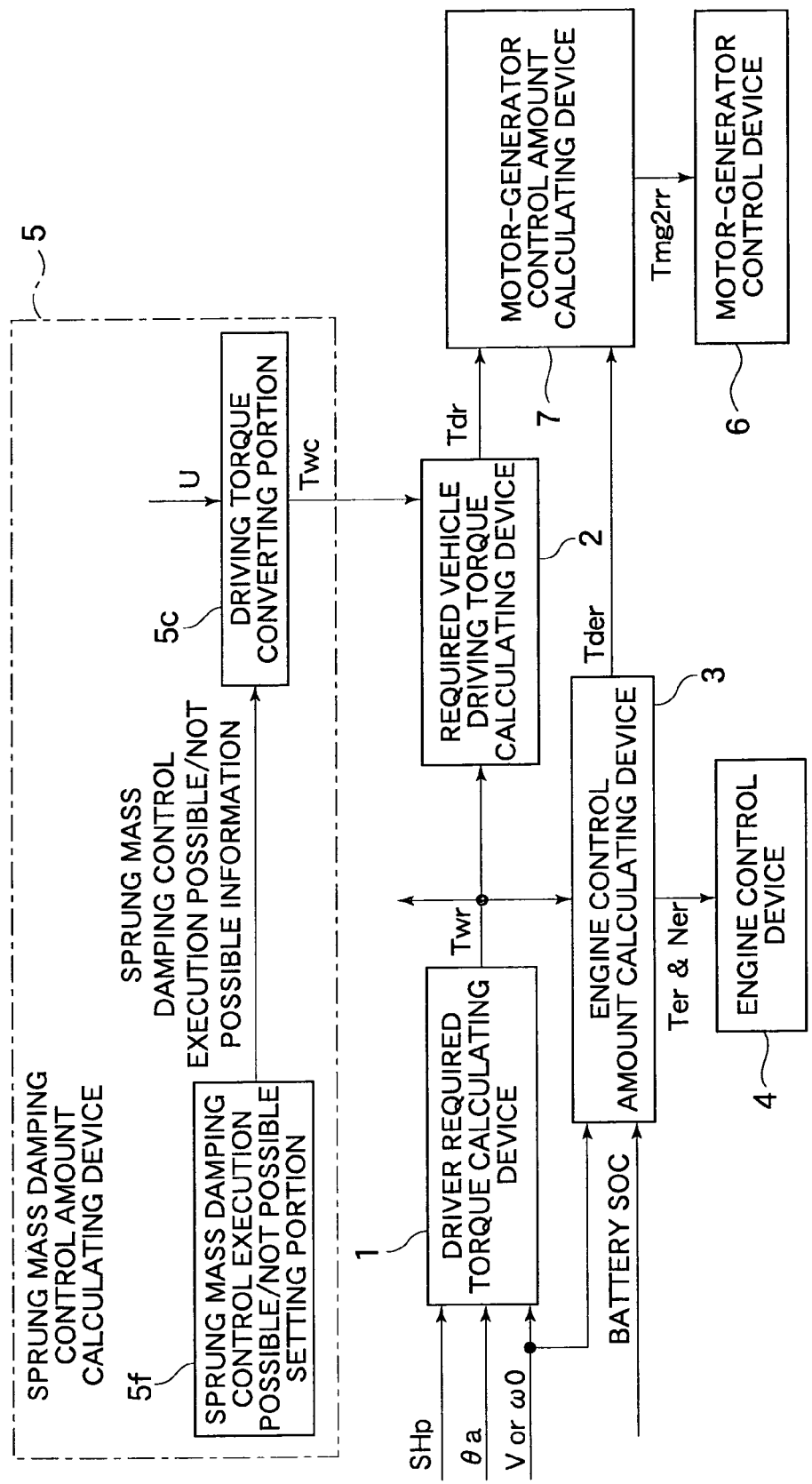
FIG. 21 is a view in the form of control blocks showing a frame format of an example of the functional structure of a sprung mass damping control system according to a fourth example embodiment of the invention.

Next, a fourth example embodiment of the sprung mass damping control system according to the invention will be described with reference to FIGS. 21 to 23.

The sprung mass damping control according to this fourth example embodiment differs from the sprung mass damping control system in any one of the first to the third example embodiments described above in the following ways.

The sprung mass damping control system according to this fourth example embodiment is applied to a vehicle such as an electric vehicle or a hybrid vehicle in which a motor-generator is provided as a drive source, just as in each of the first to the third example embodiments, and aims to suppress sprung mass vibration of the vehicle body by generating the sprung mass damping control amount using the motor-generator torque Tmg2 of the second motor-generator 32.

Incidentally, in the drive train (e.g., the gear sets and the propeller shaft and the like) of the vehicle, drive train vibration caused by any of a variety of factors, the representative ones being described below, occurs. For example, drive train vibration may occur due to drive train resonance. Also, drive train vibration may occur following startup and shut down of the engine 10 in the hybrid vehicle illustrated in the first to the third example embodiments described above. Furthermore, in a vehicle provided with an automatic transmission, drive train vibration occurs with tip-in vibration and tip-out vibration of that automatic transmission. Therefore, when drive train vibration occurs in the vehicle, control to suppress this drive train vibration (hereinafter referred to as "drive train damping control") is executed. This drive train damping control is executed by a drive train damping control apparatus provided in the vehicle. In a vehicle provided with a motor-generator as a drive source, this drive train damping control apparatus generates a drive train damping control amount (such as rotational torque) to suppress drive train vibration using the motor-generator torque of that motor-generator. For example, in the hybrid vehicle illustrated in each of the first to the third example embodiments, the drive train damping control apparatus generates the drive train damping control amount using the motor-generator torque Tm1 of the first motor-generator 31 and/or the motor-generator torque Tmg2, of the second motor-generator 32.

In this case, when the sprung mass damping control described above is performed, the motor-generator torque Tmg2 of the second motor-generator 32 may be output by supplying power from the battery 41. With drive train damping control as well, the motor-generator torque Tmg1 of the first motor-generator 31 or the motor-generator torque Tmg2 of the second motor-generator 32 that generates this drive train damping control amount may be output by supplying power from the battery 41.

When sprung mass vibration and drive train vibration occur at the same time, sprung mass damping control and drive train damping control are executed at the same timing. When power from the battery 41 is used for both of these damping controls, the SOC of the battery 41 decreases as one damping control is executed, and as a result, the battery 41 may not be able to supply sufficient power needed to execute the other damping control. For example, if drive train damping control according to the desired drive train damping control amount is unable to be executed due to insufficient power from the battery 41, drive train vibration may not be able to be appropriately suppressed, so controllability of the drive train damping control deteriorates. Also, if sprung mass damping control according to the desired sprung mass damping control amount is unable to be executed due to insufficient power from the battery 41, sprung mass vibration generated in the vehicle body may not be able to be appropriately suppressed, so controllability of the sprung mass damping control deteriorates.

Therefore, the sprung mass damping control system of this fourth example embodiment is structured so that when sprung mass damping control and drive train damping control are performed at the same time, damping control in which priority is given to one of those controls is appropriately executed. For example, drive train vibration may reduce drivability as well as result in a decrease in durability due to drive train resonance. Accordingly, it is preferable to give priority to drive train vibration over sprung mass vibration. Therefore, in the description below, an example is given of a sprung mass damping control system in which drive train damping control is set as the damping control that to be preferentially executed (i.e., given priority).

This sprung mass damping control system is a combination of the sprung mass damping control system in any one of the first to the third example embodiments described above and a sprung mass damping control execution possible/not possible setting device which determines whether it is possible to execute the sprung mass damping control and then executes or prohibits the sprung mass damping control based on that determination result. For example, in this case, the sprung mass damping control amount calculating device 5 is provided with a sprung mass damping control execution possible/not possible setting portion 5f as that sprung mass damping control execution possible/not possible setting apparatus, as shown in FIG. 21. Here, the vehicle described is the hybrid vehicle shown in FIG. 1, just as in the first to the third example embodiments. Incidentally, the drive train damping control apparatus described above, not shown, is provided in this hybrid vehicle equipped with this sprung mass damping control system.

Figure 22:
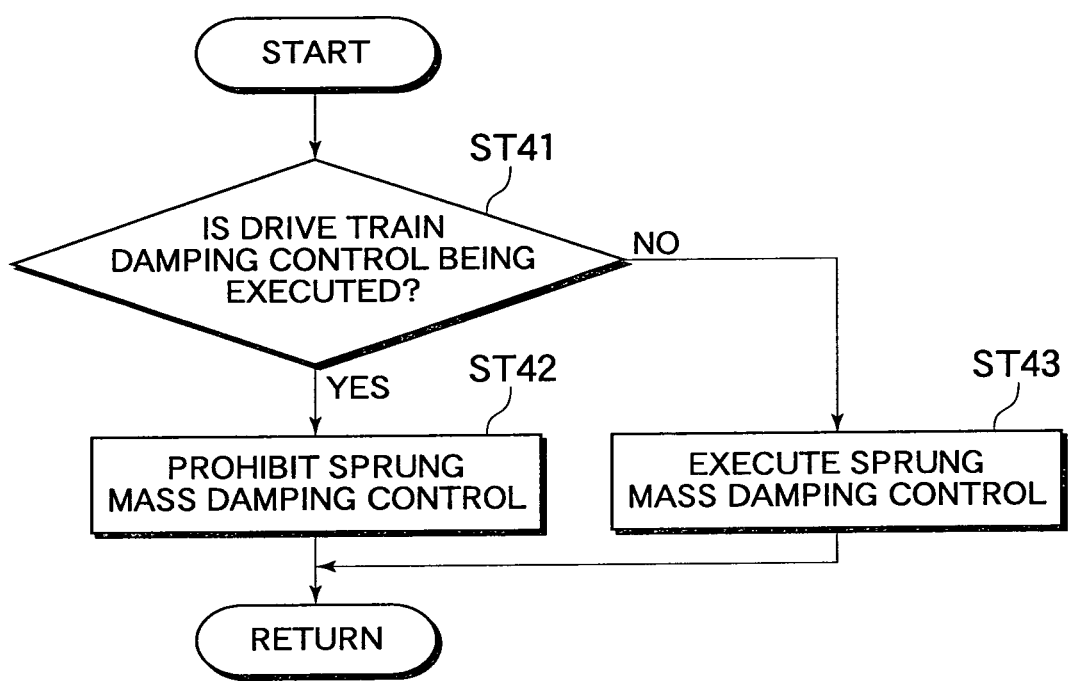
FIG. 22 is a flowchart illustrating a sprung mass damping control prohibiting operation in the sprung mass damping control system according to the fourth example embodiment.

More specifically, as shown in FIG. 22, the sprung mass damping control execution possible/not possible setting portion 5f determines whether the drive train damping control is being executed (step ST41). For example, in this case, the drive train damping control apparatus outputs a drive train damping control requirement-on flag indicating that drive train damping control is being executed and a drive train damping control requirement-off flag indicating that drive train damping control is being prohibited, to the sprung mass damping control amount calculating device 5. If the sprung mass damping control execution possible/not possible setting portion 5f receives the drive train damping control requirement-on flag, then the sprung mass damping control execution possible/not possible setting portion 5f determines that drive train damping control is being executed. If, on the other hand, the sprung mass damping control execution possible/not possible setting portion 5f receives the drive train damping control requirement-off flag, then the sprung mass damping control execution possible/not possible setting portion 5f determines that drive train damping control is not being executed.

In the sprung mass damping control system of the fourth example embodiment, if it is determined that drive train damping control is being executed, then sprung mass damping control is prohibited from being executed (step ST42). If, on the other hand, it is determined that drive train damping control is not being executed, then sprung mass damping control is executed (step ST43).

For example, the sprung mass damping control execution possible/not possible setting portion 5f determines that sprung mass damping control cannot to be executed when it is determined that drive train damping control is being executed, and determines that sprung mass damping control can be executed when it is determined that drive train damping control is not being executed. The sprung mass damping control execution possible/not possible setting portion 5f generates one of these determination results as sprung mass damping control execution possible/not possible information. In the sprung mass damping control system of the fourth example embodiment, the sprung mass damping control is executed or prohibited according to the content of that sprung mass damping control execution possible/not possible information. Here, the sprung mass damping control execution possible/not possible information is output to the driving torque converting portion 5c.

If the sprung mass damping control execution possible/not possible information indicates that sprung mass damping control execution is not possible, the driving torque converting portion 5c replaces the converted sprung mass damping control torque Twc (i.e., the sprung mass damping control amount) with 0 and outputs this to the adder 2a of the required vehicle driving torque calculating device 2 so that sprung mass damping control is not executed. If, on the other hand, the sprung mass damping control execution possible/not possible information indicates that sprung mass damping control execution is possible, the driving torque converting portion 5c outputs the sprung mass damping control torque Twc (i.e., the sprung mass damping control amount) as it is to the adder 2a of the required vehicle driving torque calculating device 2 so that sprung mass damping control is executed.

The sprung mass damping control system of the fourth example embodiment thus prohibits sprung mass damping control from being executed if drive train damping control is being executed, and executes sprung mass damping control if drive train damping control is not being executed. Therefore, while drive train damping control is being executed, power from the battery 41 is not being used for sprung mass damping control, so that drive train damping control can be continued with the desired drive train damping control amount. In this way, this sprung mass damping control system is able to preferentially execute drive train damping control which is considered more important than sprung mass damping control. Accordingly, it is possible to prevent drivability from deteriorating, as well as prevent a decrease in durability due to drive train resonance.

In this example, the power of the battery 41 is not taken into consideration so sprung mass damping control ends up being prohibited even when there is sufficient power. Therefore, in the description below, the determination as to whether sprung mass damping control can be executed is made taking the power of the battery 41 into account.

The sprung mass damping control execution possible/not possible setting portion 5f ascertains the power Wd of the battery 41 necessary for drive train damping control (hereinafter, this power will be referred to as the power required for drive train damping control), and the power Ws of the battery 41 required for sprung mass damping control (hereinafter, this power will be referred to as the power Ws required for sprung mass damping control). The power Wd required for drive train damping control is calculated based on the required motor-generator torque Tmgd for generating the drive train damping control amount and the required motor-generator speed Nmgd when outputting that required motor-generator torque Tmgd, as shown in Expression 21 below. Also, the power Ws required for sprung mass damping control is calculated based on the required motor-generator torque Tmg2s for generating the sprung mass damping control amount and the required motor-generator speed Nmg2s required when outputting that required motor-generator torque Tmg2s, as shown in Expression 22 below.

[Expression 21]
$$Wd = \frac{2\pi \times Tmgd \times Nmgd}{60} \quad (21)$$

[Expression 22]
$$Ws = \frac{2\pi \times Tmg2s \times Nmg2s}{60} \quad (22)$$

In order to execute not only drive train damping control but also sprung mass damping control, it is necessary to reduce the total required power of the power Wd required for drive train damping control and the power Ws required for sprung mass damping control combined so that it is less than the remaining power Wbr in the battery 41. However, in actuality, some power needs to be supplied to the engine 10 and electrical equipment so all of the remaining power Wbr cannot be used for drive train damping control and sprung mass damping control. Therefore, the difference in power of that remaining power Wbr minus at least the power required for the other equipment is set as the upper limit threshold value power W1. When the total required power (i.e., Wd+Ws) is less than this upper limit threshold value power W1, the sprung mass damping control execution possible/not possible setting portion 5f determines that sprung mass damping control can be executed. In this case, a certain margin that accounts for detection error and durability and the like of the battery 41 is further subtracted from that power, and the result is set as the upper limit threshold value power W1. Also, if that remaining power Wbr is so little that charging is required, for example, it is preferable to give priority to increasing the remaining power Wbr by charging the battery 41 over using the power in the battery 41 to perform sprung mass damping control, even if the total required power is less than that remaining power Wbr. Therefore, the remaining power Wbr, which is low enough so that charging will be required if the sprung mass damping control is also executed, for example, is set as the lower limit threshold value power W2. If the total required power (i.e., Wd+Ws) is more than this lower limit threshold value power W2, the sprung mass damping control execution possible/not possible setting portion 5f determines that sprung mass damping control can be executed. The upper limit threshold value power W1 and the lower limit threshold value power W2 may be obtained through testing or simulation.

Figure 23:
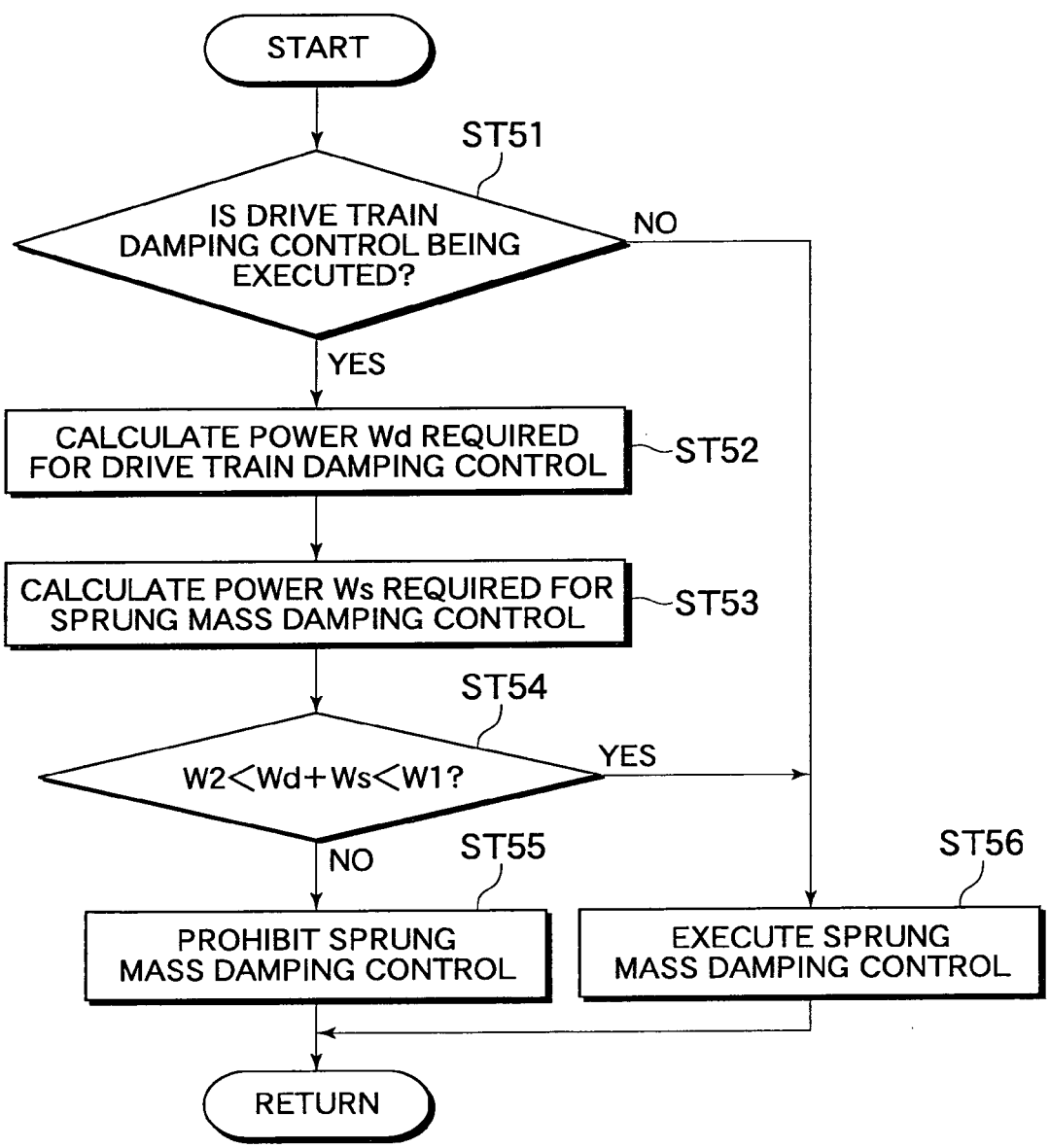
FIG. 23 is a flowchart illustrating a sprung mass damping control restricting operation in the sprung mass damping control system according to the fourth example embodiment.

More specifically, the sprung mass damping control execution possible/not possible setting portion 5f determines whether drive train damping control is being executed, just as in the previous example, as shown in the flowchart in FIG. 23 (step ST51).

If it is determined that drive train damping control is being executed, the sprung mass damping control execution possible/not possible setting portion 5f calculates the power Wd required for drive train damping control and the power Ws required for sprung mass damping control described above (steps ST52 and ST53), and then compares the combined total required power with the upper limit threshold value power W1 and the lower limit threshold value power W2 (step ST54).

If that total required power (Wd+Ws) is equal to or less than the lower limit threshold value power W2 or equal to or greater than the upper limit threshold value power W1, the sprung mass damping control system illustrated here prohibits sprung mass damping control from being executed (step ST55). If, on the other hand, that total required power (Wd+Ws) is greater than the lower limit threshold value power W2 and less than the upper limit threshold value power W1, the sprung mass damping control system executes sprung mass damping control (step ST56). Also, if it is determined in step ST51 that drive train damping control is not being executed, the process proceeds on to step ST56 and the sprung mass damping control system executes sprung mass damping control.

For example, if the total required power (Wd+Ws) is equal to or less than the lower limit threshold value power W2 or equal to or greater than the upper limit threshold power W1, the sprung mass damping control execution possible/not possible setting portion 5f determines that the battery 41 does not have sufficient power to execute both drive train damping control and sprung mass damping control, and thus determines that sprung mass damping control cannot be executed. If, on the other hand, the total required power (Wd+Ws) is greater than the lower limit threshold value power W2 and less than the upper limit threshold power W1, the sprung mass damping control execution possible/not possible setting portion 5f determines that the battery 41 has sufficient power to execute both drive train damping control and sprung mass damping control, and thus determines that sprung mass damping control can be executed. The sprung mass damping control execution possible/not possible setting portion 5f generates one of those determination results as sprung mass damping control execution possible/not possible information, which it then outputs to the driving torque converting portion 5c. Just as in the previous example, if the sprung mass damping control execution possible/not possible information indicates that sprung mass damping control cannot be executed, the driving torque converting portion 5c replaces the converted sprung mass damping control torque Twc (i.e., the sprung mass damping control amount) with 0 so that sprung mass damping control will not be executed. If, on the other hand, the sprung mass damping control execution possible/not possible information indicates that sprung mass damping control can be executed, the driving torque converting portion 5c leaves the sprung mass damping control torque Twc (i.e., the sprung mass damping control amount) as it is so that sprung mass damping control will be executed.

This sprung mass damping control system thus determines whether sprung mass damping control can be executed, so the same results as those obtained in the previous example can be obtained. Also, in this sprung mass damping control system, if there is sufficient power remaining in the battery 41, sprung mass damping control is executed even if drive train damping control is being executed, which differs from the previous example. Therefore, this sprung mass damping control system is able to suppress sprung mass vibration over a wider range than the previous example.

Incidentally, in the example described above, sprung mass damping control is prohibited at times other than when it is being executed. However, instead of prohibiting sprung mass damping control, it may be restricted by reducing the sprung mass damping control amount. For example, the remaining power Wbr of the battery 41 may be taken into account and the sprung mass damping control amount at this time may be set lower as the remaining power Wbr decreases. As a result, sprung mass vibration can be suppressed over an even wider range.

Incidentally, if sprung mass damping control is considered more important than drive train damping control, then drive train damping control may be prohibited from being executed while sprung mass damping control is being executed, and drive train damping control may be executed when sprung mass damping control is not being executed.

Next, a fifth example embodiment of the sprung mass damping control system according to the invention will be described with reference to FIG. 24.

The sprung mass damping control system in the fifth example embodiment differs from the sprung mass damping control system in any one of the first to the fourth example embodiments described above in the following ways.

The sprung mass damping control system in the fifth example embodiment is applied to a hybrid vehicle provided with a motor-generator as a drive source, and aims to suppress sprung mass vibration of the vehicle body by generating a sprung mass damping control amount using the motor-generator torque Tmg2 of the second motor-generator 32. The vehicle described in this fifth example embodiment is the hybrid vehicle shown in FIG. 1, just as in the first to the fourth example embodiments.

In this hybrid vehicle performs so-called intermittent operation in which it restarts the engine 10 after stopping the engine 10. This hybrid vehicle may also be provided with an apparatus which adjusts the position of the piston in the cylinder, not shown, to the optimum position for startup, in order to improve startability when restarting the engine 10. For example, this apparatus is provided as a crank angle position controlling apparatus that rotates the crankshaft (i.e., the output shaft 11) with a motor or the like to bring the crank angle position to the optimum position. This crank angle position controlling apparatus finishes controlling the crank angle position of the crank shaft (i.e., crank angle position control) at least by the time the engine 10 is restarted. As a result, startup takes less time when restarting the engine 10, and drivability and emission performance are improved. For example, this crank angle position control apparatus performs crank angle position control by adjusting the motor-generator torque Tmg1 of the first motor-generator 31.

Incidentally, it is possible that sprung mass damping control may be executed in the middle of this crank angle position control. At this time, the first motor-generator 31 and the second motor-generator 32 generate motor-generator torque Tmg1 and Tmg2, respectively, using power from the battery 41. Under these conditions, there may not be enough power in the battery 41 so crank angle position control and sprung mass damping control may not be able to be performed simultaneously. As a result, crank angle position control may not be able to be appropriately performed. Also, in the hybrid vehicle illustrated here, the output shaft 11 of the engine 10 is connected to the rotating shaft 31a of the first motor-generator 31 and the rotating shaft 32a of the second motor-generator 32 via the power split device 20, so the output shaft 11 of the engine 10 may end up rotating if sprung mass damping control is performed with the second motor-generator 32. Therefore, if the second motor-generator 32 performs sprung mass damping control while crank angle position control is being performed by the first motor-generator 31, the output shaft 11 of the engine 10 will not be able to be appropriately controlled to the desired crank angle position. Incidentally, in this hybrid vehicle, crank angle position control may be executed numerous times until the engine 10 is restarted.

Startability of the engine 10 will deteriorate unless appropriate crank angle position control can be performed, so when the engine 10 is restarted in that state, it may take longer to start and drivability and emission performance may deteriorate and the like. Accordingly, the sprung mass damping control system in this fifth example embodiment is structured so as not to perform sprung mass damping control while crank angle position control is being executed.

The sprung mass damping control system of this fifth example embodiment is a combination of the sprung mass damping control system in any one of the first to the fourth example embodiments described above, and a sprung mass damping control execution possible/not possible setting apparatus that determines whether sprung mass damping control can be executed according to whether crank angle position control is being executed, and then executes or prohibits sprung mass damping control according to that determination result. In this case, the sprung mass damping control amount calculating device 5 is provided with the sprung mass damping control execution possible/not possible setting portion 5f as that sprung mass damping control execution possible/not possible setting apparatus. Incidentally, in the sprung mass damping control system based on the fourth example embodiment, the sprung mass damping control execution possible/not possible setting portion 5f may include the functions of the sprung mass damping control execution possible/not possible setting apparatuses of both the fourth and fifth example embodiment. Also, this sprung mass damping control system may be provided with the crank angle position control apparatus, not shown, described above.

Figure 24:
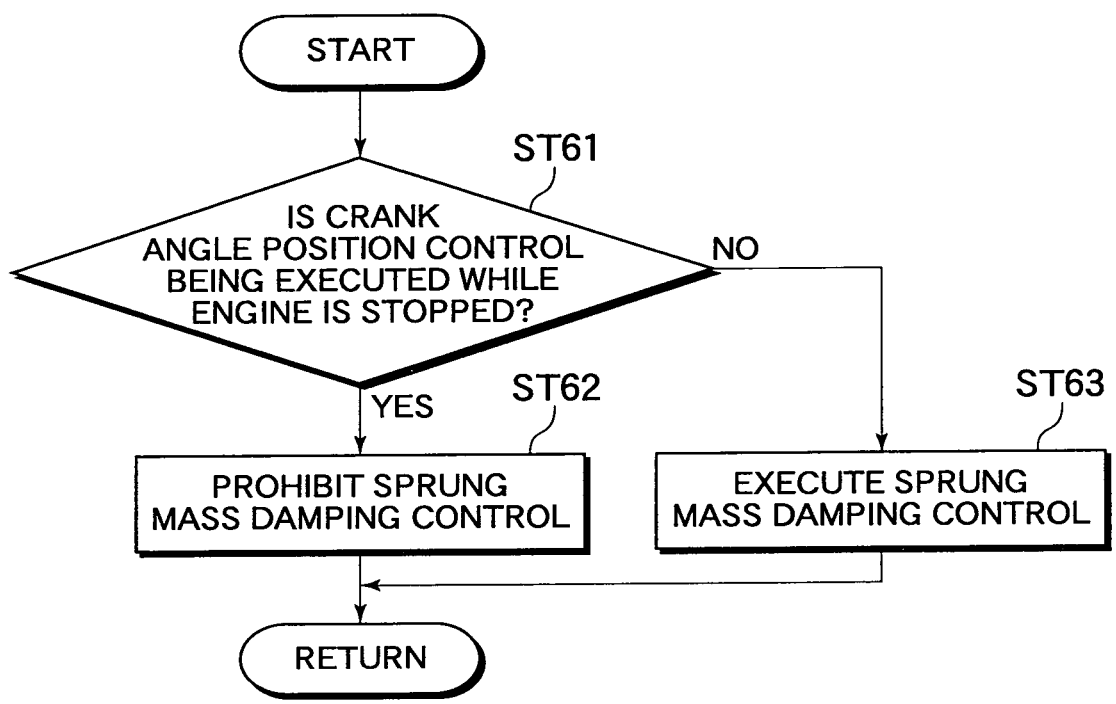
FIG. 24 is a flowchart illustrating a sprung mass damping control prohibiting operation in a sprung mass damping control system according to a fifth example embodiment of the invention.

More specifically, the sprung mass damping control execution possible/not possible setting portion 5f determines whether crank angle position control is being executed while the engine 10 is stopped, as shown in the flowchart in FIG. 24 (step ST61). For example, in this case, it may be determined that the engine 10 is stopped if an engine stop command has been output from the main ECU 101 to the engine ECU 102. Also, in this case, the crank angle position control apparatus outputs a crank angle position control requirement-on flag indicating that crank angle position control is being executed and a crank angle position control requirement-off flag indicating that crank angle position control is being prohibited, to the sprung mass damping control amount calculating device 5. If the sprung mass damping control execution possible/not possible setting portion 5f receives the crank angle position control requirement-on flag, then the sprung mass damping control execution possible/not possible setting portion 5f determines that crank angle position control is being executed. If, on the other hand, the sprung mass damping control execution possible/not possible setting portion 5f receives the crank angle position control requirement-off flag, then the sprang mass damping control execution possible/not possible setting portion 5f determines that crank angle position control is not being executed.

In the sprung mass damping control system of this fifth example embodiment, if it is determined that crank angle position control is being executed, sprung mass damping control is prohibited from being executed (step ST62). If, on the other hand, it is determined that crank angle position control is not being executed, sprung mass damping control is executed (step ST63).

For example, the sprung mass damping control execution possible/not possible setting portion 5f determines that sprung mass damping control cannot to be executed when it is determined that crank angle position control is being executed, and determines that sprung mass damping control can be executed when it is determined that crank angle position control is not being executed. The sprung mass damping control execution possible/not possible setting portion 5f generates one of these determination results as sprung mass damping control execution possible/not possible information. In the sprung mass damping control system of the fifth example embodiment, the sprung mass damping control is executed or prohibited according to the content of that sprung mass damping control execution possible/not possible information. Here, the sprung mass damping control execution possible/not possible information is output to the driving torque converting portion 5c, just as in the fourth example embodiment.

If the sprung mass damping control execution possible/not possible information indicates that sprung mass damping control execution is not possible, the driving torque converting portion 5c replaces the converted sprung mass damping control torque Twc (i.e., the sprung mass damping control amount) with 0 and outputs this to the adder 2a of the required vehicle driving torque calculating device 2 so that sprung mass damping control is not executed. If, on the other hand, the sprung mass damping control execution possible/not possible information indicates that sprung mass damping control execution is possible, the driving torque converting portion 5c outputs the sprung mass damping control torque Twc (i.e., the sprung mass damping control amount) as it is to the adder 2a of the required vehicle driving torque calculating device 2 so that sprung mass damping control is executed.

The sprung mass damping control system of the fifth example embodiment thus prohibits sprung mass damping control from being executed if crank angle position control is being executed, and executes sprung mass damping control if crank angle position control is not being executed. Therefore, sprung mass damping control is not executed while crank angle position control is being executed, so power from the battery 41 is not used for sprung mass damping control. Therefore, the output shaft 11 of the engine 10 can be appropriately controlled to the desired crank angle position. In this way, this sprung mass damping control system is able to preferentially execute crank angle position control which is considered more important than sprung mass damping control. Accordingly, it is possible to maintain good startability of the engine 10, shorten the startup time when the engine 10 is restarted, and improve drivability and emission performance, and the like.

Incidentally, in the example described above, sprung mass damping control is prohibited at times other than when it is being executed. However, If the crank angle position of the output shaft of the engine 10 can be appropriately controlled by restricting the sprung mass damping control, sprung mass damping control may be restricted by reducing the sprung mass damping control amount, instead of being prohibited. In a hybrid vehicle in which the output shaft 11 of the engine 10 is not connected to the rotating shaft 32*a* of the second motor-generator 32, even if sprung mass damping control is performed with the second motor-generator 32, rotation torque at that time will not be transmitted to the output shaft 11 of the engine 10, so sprung mass damping control can be performed while crank angle position control is being performed. Therefore, in this kind of hybrid vehicle, sprung mass damping control may be restricted as necessary by taking the remaining power Wbr of the battery 41 into account and setting the sprung mass damping control amount at this time lower as the remaining power Wbr decreases.

Figure 25:
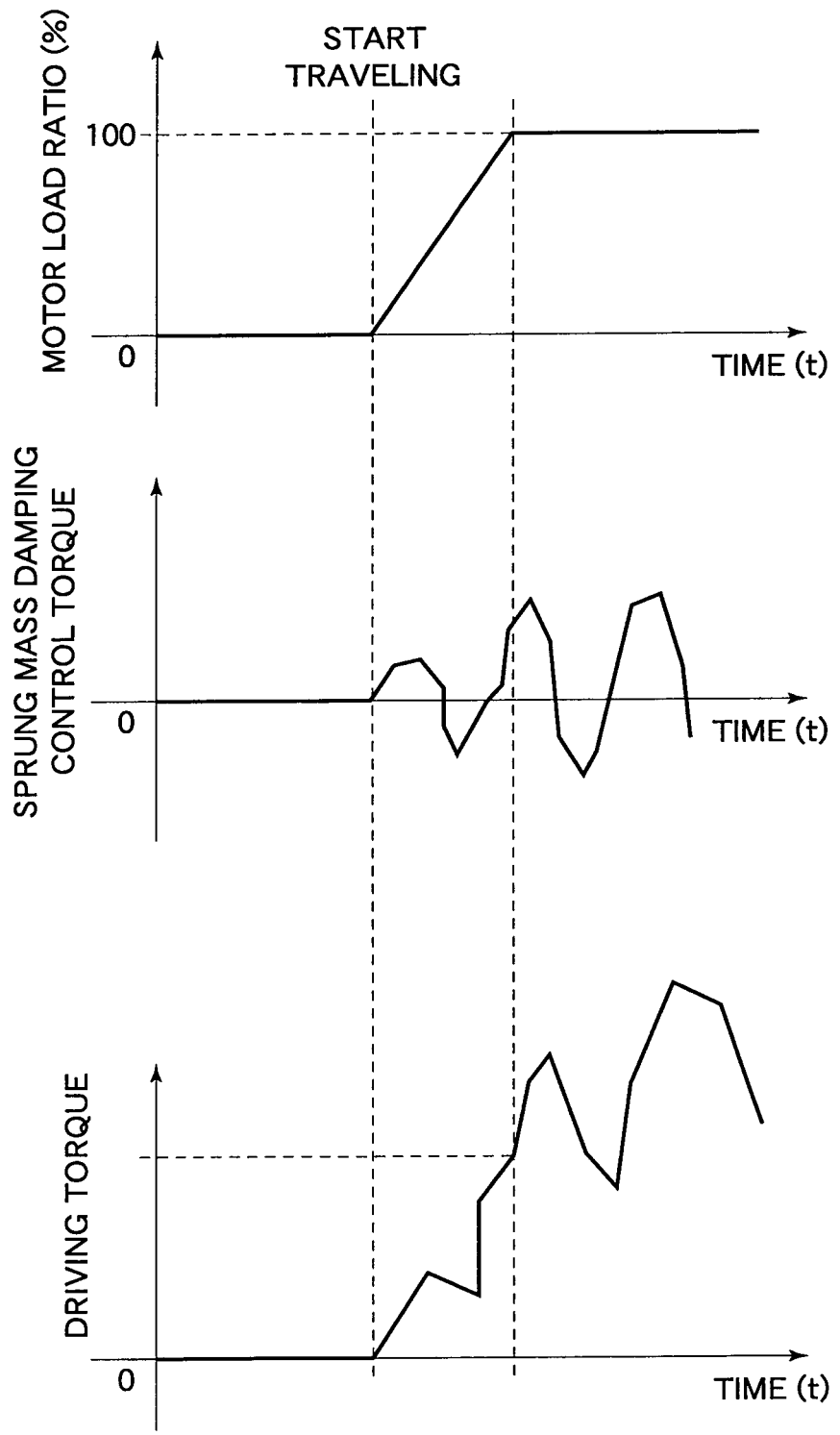
FIG. 25 is a time chart showing the relationship between sprung mass damping control torque and driving torque during motor load ratio restricting control according to related art.

Next, a sixth example embodiment of the sprung mass damping control system of a vehicle according to the invention will be described with reference to FIGS. 25 to 27.

The sprung mass damping control according to this sixth example embodiment differs from the sprung mass damping control system in any one of the first to the fifth example embodiments described above in the following ways.

The sprung mass damping control system according to this sixth example embodiment is applied to a vehicle such as an electric vehicle or a hybrid vehicle in which a motor-generator is provided as a drive source, and aims to suppress sprung mass vibration of the vehicle body by generating the sprung mass damping control amount using the motor-generator torque Tmg2 of the second motor-generator 32.

In a vehicle that uses a motor-generator as a drive source, when the speed range of the transmission is returned from a speed range such as the N (Neutral) range in which the driving force is 0 to a speed range such as the D (Drive) range, the motor-generator torque of that motor-generator gradually increases instead of increasing all at once to the target value. At this time, the motor load ratio of the motor-generator is adjusted so that it gradually increases to 100%. The reason for performing this kind of motor load ratio restricting control is because if the motor load ratio is increased to 100% from the beginning, a large amount of driving torque would be instantaneously transmitted to the driving wheels, which would cause a jolt at takeoff. Performing this kind of motor load ratio restricting control prevents this from occurring.

Here, sprung mass vibration is also generated during takeoff, so depending on the condition of the road at this time, output of a large sprung mass damping control amount (i.e., a large amount of motor-generator torque for sprung mass damping control) may be required of the motor-generator. However, if this kind of sprung mass damping control is performed while motor load ratio restricting control is being executed, driving torque may fluctuate greatly by an amount corresponding to a large sprung mass damping control amount when the motor load ratio restricting control ends and the motor load ratio reaches 100%. For example, the sprung mass damping control torque Twc (i.e., the sprung mass damping control amount) gradually increases from 0 as the vehicle starts to travel, and is then output at a set value, as shown in FIG. 25. At the same time, the driving torque gradually increases when the motor load ratio starts to increase as the vehicle starts to travel. In this way, when sprung mass damping control and motor load ratio restricting control are performed simultaneously, the sprung mass damping control torque Twc when the motor load ratio reaches 100% needs to be a large value, and the torque corresponding to this large amount of sprung mass damping control torque Twc may of course be added to the driving torque, as shown in FIG. 25. At this time, the added torque for sprung mass damping control appears in the vehicle as a jolt.

Therefore, the sprung mass damping control system of this sixth example embodiment is structured so that sprung mass damping control is not performed while motor load ratio restricting control is being executed. The vehicle described in this sixth example embodiment is the hybrid vehicle shown in FIG. 1, just as in the first to the fifth example embodiments.

The sprung mass damping control system of this sixth example embodiment is a combination of the sprung mass damping control system in any one of the first to the fifth example embodiments described above and a sprung mass damping control execution possible/not possible setting device which determines whether it is possible to execute the sprung mass damping control according to whether motor load ratio restricting control is being executed, and then executes or prohibits the sprung mass damping control based on that determination result. In this case, the sprung mass damping control amount calculating device 5 is provided with the sprung mass damping control execution possible/not possible setting portion 5*f* as that sprung mass damping control execution possible/not possible setting apparatus. Incidentally, in the sprung mass damping control system based on the fourth or fifth example embodiment, the sprung mass damping control execution possible/not possible setting portion 5*f* may include the functions of the sprung mass damping control execution possible/not possible setting apparatuses of both the fourth and fifth example embodiment. Also, this sprung mass damping control system may be provided with a motor load ratio restricting control apparatus, not shown, that performs motor load ratio restricting control.

Figure 26:
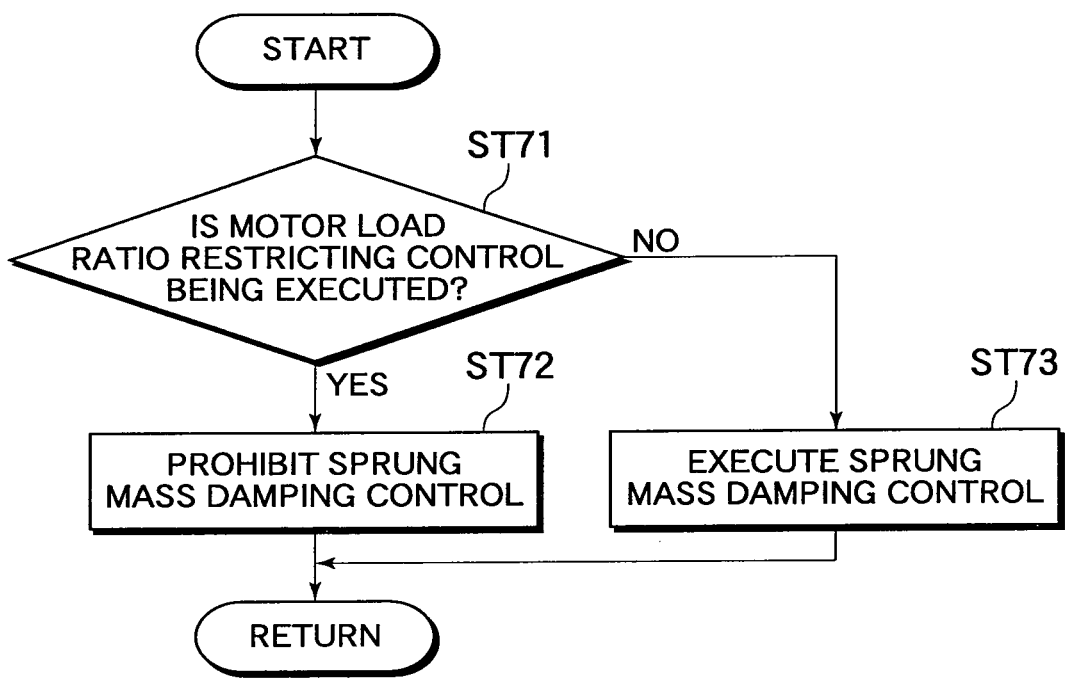
FIG. 26 is a flowchart illustrating a sprung mass damping control prohibiting operation in a sprung mass damping control system according to a sixth example embodiment of the invention.
Figure 27:
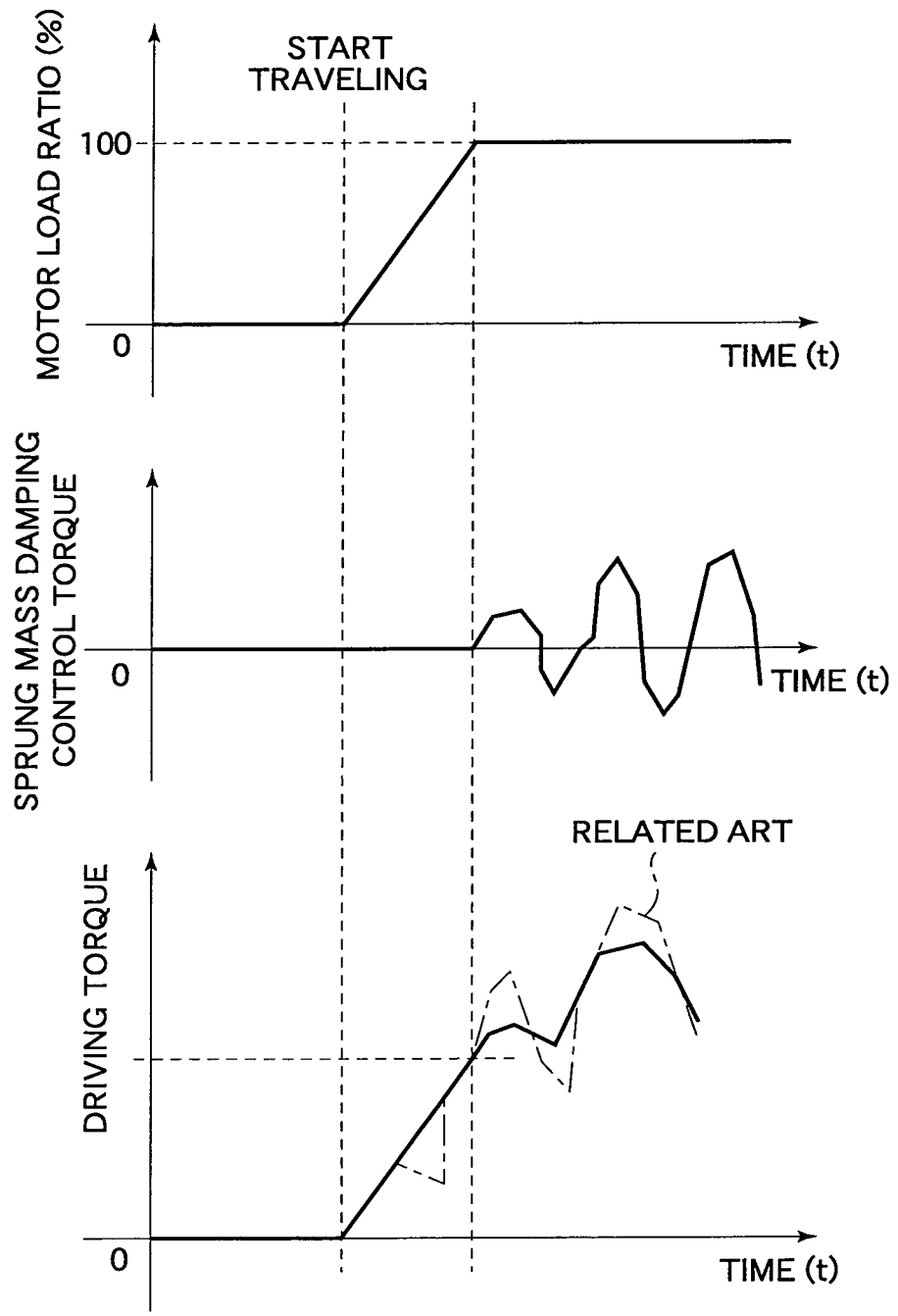
FIG. 27 is a time chart showing the relationships among motor load ratio, sprung mass damping control torque, and driving torque during the sprung mass damping control prohibiting operation in the sprung mass damping control system according to the sixth example embodiment.

More specifically, the sprung mass damping control execution possible/not possible setting portion 5*f* determines whether motor load ratio restricting control is being executed, as shown in the flowchart in FIG. 26 (step ST71). For example, it may be determined that motor load restricting control is being executed if a motor load ratio restricting command has been output from the main ECU 101 to the motor-generator ECU 103.

In the sprung mass damping control system of this sixth example embodiment, if it is determined that motor load ratio restricting control is being executed, sprung mass damping control is prohibited from being executed (step ST72). If, on the other hand, it is determined that motor load ratio restricting control is not being executed, sprung mass damping control is executed (step ST73).

For example, the sprung mass damping control execution possible/not possible setting portion 5*f* determines that sprung mass damping control cannot to be executed when it is determined that motor load ratio restricting control is being executed, and determines that sprung mass damping control can be executed when it is determined that motor load ratio restricting control is not being executed. The sprung mass damping control execution possible/not possible setting portion 5*f* generates one of these determination results as sprung mass damping control execution possible/not possible information. In the sprung mass damping control system of the sixth example embodiment, the sprung mass damping control is executed or prohibited according to the content of that sprung mass damping control execution possible/not possible information. Here, the sprung mass damping control execution possible/not possible information is output to the driving torque converting portion 5c, just as in the fourth and fifth example embodiments.

If the sprung mass damping control execution possible/not possible information indicates that sprung mass damping control execution is not possible, the driving torque converting portion 5c replaces the converted sprung mass damping control torque Twc (i.e., the sprung mass damping control amount) with 0 and outputs this to the adder 2a of the required vehicle driving torque calculating device 2 so that sprung mass damping control is not executed. If, on the other hand, the sprung mass damping control execution possible/not possible information indicates that sprung mass damping control execution is possible, the driving torque converting portion 5c outputs the sprung mass damping control torque Twc (i.e., the sprung mass damping control amount) as it is to the adder 2a of the required vehicle driving torque calculating device 2 so that sprung mass damping control is executed.

The sprung mass damping control system of the sixth example embodiment thus prohibits sprung mass damping control from being executed if motor load ratio restricting control is being executed, and executes sprung mass damping control if motor load ratio restricting control is not being executed. Therefore, sprung mass damping control is not executed while motor load ratio restricting control is being executed, so driving torque gradually increases as the motor load ratio increases, as shown in FIG. 27. Then if sprung mass vibration needs to be suppressed, sprung mass damping control is started when the motor load ratio reaches 100%. At this time, the sprung mass damping control torque Twc (i.e., the sprung mass damping control amount) gradually increases from 0 as the motor load ratio reaches 100%, and is then output at a set value, as shown in FIG. 27. Therefore, as shown in FIG. 27, the driving torque gradually increases as the sprung mass damping control torque Twc (i.e., the sprung mass damping control amount) increases after the motor load ratio reaches 100%. Accordingly, this sprung mass damping control system is able to prevent a jolt from occurring when the motor load ratio reaches 100%. Incidentally, FIG. 27 shows an example when the sprung mass damping control torque Twc (i.e., the sprung mass damping control amount) starts out as a positive value when starting sprung mass damping control.

Figure 28:
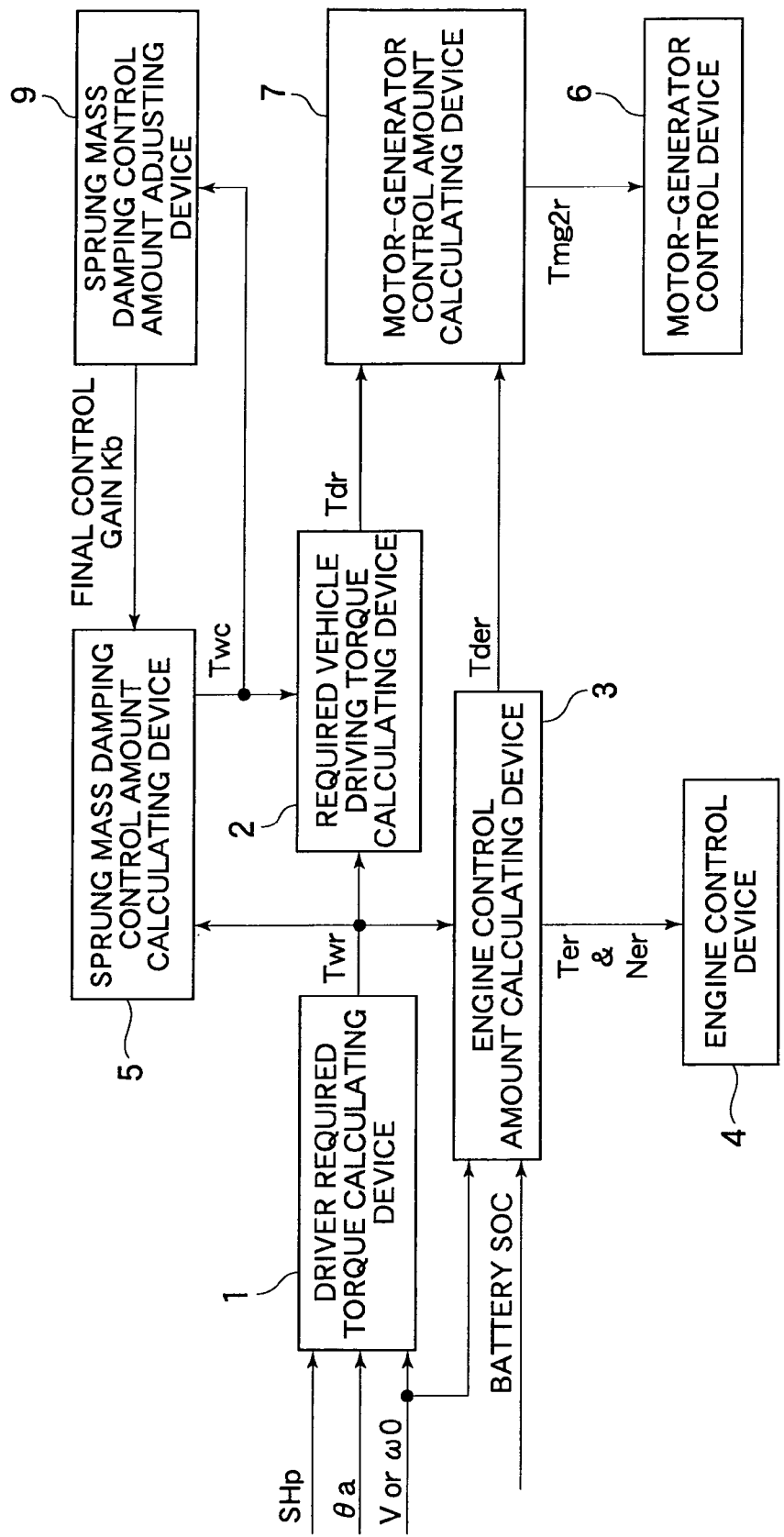
FIG. 28 is a view in the form of control blocks showing a frame format of an example of the functional structure of a sprung mass damping control system according to a seventh example embodiment of the invention.

Next, a seventh example embodiment of the sprung mass damping control system of a vehicle according to the invention will be described with reference to FIGS. 28 to 30.

The sprung mass damping control according to this seventh example embodiment differs from the sprung mass damping control system in any one of the first to the sixth example embodiments described above in the following ways.

The sprung mass damping control system according to this seventh example embodiment is applied to a vehicle such as an electric vehicle or a hybrid vehicle in which a motor-generator is provided as a drive source, and aims to suppress sprung mass vibration of the vehicle body by generating the sprung mass damping control amount using the motor-generator torque Tmg2 of the second motor-generator 32.

In this hybrid vehicle, vibration in the longitudinal direction of the vehicle can be generated by a variety of factors.

For example, this hybrid vehicle is provided with various types of rotating bodies (such as the engine 10, the first motor-generator 31, and the second motor-generator 32). Therefore, in this hybrid vehicle, fluctuations in rotation due to the primary rotation frequency component or the like of each of the rotating bodies are transmitted to the driving wheels via the drive train, such as the power split device 20, which may cause vibration in the longitudinal direction of the vehicle in the vehicle body.

Vibration in the longitudinal direction of the vehicle can also be generated by a fluctuation in torque during a misfire of the engine 10. Also, the engine 10 may cause a fluctuation in torque also when the combustion state is unstable, which may also generate vibration in the longitudinal direction of the vehicle. For example, in the engine 10, catalyst degradation suppressing control which inhibits catalyst degradation by supplying fuel together with exhaust gas to a catalyst and reacting that fuel with oxygen, is performed during self-sustained operation. "Self-sustained operation" in this case refers to operation of the engine that is performed when the driving force required by the driver is obtained using only the output from the second motor-generator 32, and which at a low enough load so that auxiliary equipment such as an air conditioner of the engine 10 can be driven. During this self-sustained operation as well, the output shaft 11 of the engine 10 is connected to the drive train via the power split device 20 and the like. In this case, when catalyst degradation suppressing control is performed during self-sustained operation, the engine 10 is operated in a low speed range and with a lean air-fuel ratio mixture in order to suppress a decrease in the fuel efficiency. Therefore, at this time combustion in the engine 10 may become unstable, resulting in a fluctuation in torque which may generate vibration in the longitudinal direction of the vehicle.

Also, the operating state of the engine 10 includes operation under a load, which uses the output of the engine 10 to driving force required by the driver. When operating under a load, the engine speed is feedback controlled by adjusting the output of the first motor-generator 31 in order to correct the difference between the required engine speed and the actual engine speed. If this feedback control of the engine speed interferes with the feedback loop (i.e., wheel speed→motor-generator torque→engine torque→engine speed) of sprung mass damping control, stability of these controls may be lost, and as a result, vibration in the longitudinal direction of the vehicle may be occur.

In this way, in this hybrid vehicle, when vibration in the longitudinal direction of the vehicle may occur and the frequency of that vibration is close to the resonant frequency of the drive train, it may induce resonance.

Here, in the sprung mass damping control in the first to the sixth example embodiments described above, the wheel speed Vw (=r×ω) or the angular velocity ω of the driving wheels Wh and Wh is the input information. Also, in sprung mass damping control, the rotation speeds of the rotating bodies described above may also be used as the input information. Therefore, when the rotating speeds of the rotating bodies are within a predetermined range, the frequency component of the sprung mass damping control amount (i.e., the sprung mass damping control torque Twc) may include a resonant frequency component, and if sprung mass damping control is executed while the resonance described above is being induced, that resonance may become worse.

Therefore, the sprung mass damping control system of this seventh example embodiment is structured so as not to amplify the resonance that accompanies the execution of sprung mass damping control.

For example, if there is a possibility that the sprung mass damping control amount (i.e., the sprung mass damping control torque Twc) includes a resonant frequency component, the sprung mass damping control system adjusts the sprung mass damping control amount so that that resonant frequency component is not output. The sprung mass damping control system of this seventh example embodiment is provided with a sprung mass damping control amount adjusting device 9 that adjusts that sprung mass damping control amount, as shown in FIG. 28. This sprung mass damping control amount adjusting device 9 adjusts the sprung mass damping control amount by changing the control gain Kb of the sprung mass damping control amount. The control gain Kb to be changed is, for example, the gain K of the driver required torque correcting portion $5a_2$ and/or the FF/FB weighted and adjusted gain of the FF/FB weighted and adjusted gain control portion $5b_2$ (see FIGS. 9A and 9B).

More specifically, the sprung mass damping control amount adjusting device 9 includes an input processing portion 9a that analyzes the frequency and amplitude of the input signal, a first control gain change necessary/unnecessary determining portion 9b that determines whether the control gain Kb of the sprung mass damping control amount needs to be changed based on the analyzed frequency and amplitude, and a control gain setting portion 9c that sets the final control gain Kb.

At least one input signal, from among input signals indicative of the motor-generator speed Nmg1 of the first motor-generator 31, the motor-generator speed Nmg2 of the second motor-generator 32, the engine speed Ne, the wheel speed Vw, the vehicle longitudinal acceleration G or the pitch rate q of the hybrid vehicle, for example, is input to the input processing portion 9a. Incidentally, the pitch rate q may be detected by a pitch rate sensor or the like, not shown.

This input processing portion 9a analyzes the frequency and amplitude by performing Fast Fourier Transform (FFT) on the input signal. This input processing portion 9a may also estimate the frequency based on the amplitude and cycle of each 0 cross point of the input signal passing through a high pass filter (HPF) in order to remove high frequency components such as noise.

Here, the frequency analyzed by the input processing portion 9a is at least one of an Nth rotation frequency of the first motor-generator 31, an Nth rotation frequency of the second motor-generator 32, an Nth rotation frequency of the engine 10, or the Nth rotation frequency of the wheel speed Vw, or the difference frequency of any two of these.

The first control gain change necessary/unnecessary determining portion 9b determines that the control gain Kb needs to be changed when i) the analyzed frequency of the input signal is equal to or greater than a predetermined frequency or that frequency is in a predetermined frequency range, and/or ii) the analyzed amplitude of the input signal is equal to or greater than a predetermined amplitude. If this requirement is not satisfied, the first control gain change necessary/unnecessary determining portion 9b determines that the control gain Kb does not need to be changed. Here, the predetermined frequency, the predetermined frequency range, and the predetermined amplitude are set based on the results of a simulation or testing beforehand. During this testing or simulation, sprung mass damping control is performed without changing the control gain Kb. For example, the predetermined frequency may be set to a frequency at the boundary beyond which resonance becomes worse. This concept may also be applied when setting the predetermined amplitude. Also, with the predetermined frequency range, a frequency at which the resonance becomes worse may be set. For example, the drive train resonant frequency range and/or the unsprung mass resonant frequency range may be set as the predetermined frequency range. The first control gain change necessary/unnecessary determining portion 9b outputs this determination result to the control gain setting portion 9c.

The control gain setting portion 9c sets the final control gain Kb by, for example, setting a correction gain Kc1 that corrects the control gain Kb, and multiplying the control gain Kb by this correction gain Kc1. If it is determined that the control gain Kb does not need to be changed, the correction gain Kc1 is set to 1 (i.e., Kc1=1). If on the other hand it is determined that the control gain Kb needs to be changed, the correction gain Kc1 is set to a value that is less than 1 (i.e., Kc1<1). The correction gain Kc1 in this case is set to a value that will not cause the resonance described above to become worse due to execution of sprung mass damping control when the sprung mass damping control amount (i.e., sprung mass damping control torque Twc) is set according to the corrected final control gain Kb. This set value is set beforehand through testing or simulation as map data derived based on the analyzed frequency and amplitude of the input signal. Therefore, the first control gain change necessary/unnecessary determining portion 9b may output the determination result indicating that the control gain Kb needs to be changed, as well as the information related to the analyzed frequency and amplitude of the input signal, to the control gain setting portion 9c.

The set final control gain Kb is output from the control gain setting portion 9c to the sprung mass damping control amount calculating device 5. The sprung mass damping control amount calculating device 5 then corrects gain K of the driver required torque correcting portion $5a_2$ and/or the FF/FB weighed and adjusted gain of the FF/FB weighted and adjusted gain controlling portion $5b_2$, based on the received final control gain Kb. Here, in order to prevent the sprung mass damping control amount (i.e., the sprung mass damping control torque Twc) from changing suddenly, the control gain setting portion 9c preferably makes the correction to obtain the final control gain Kb after a predetermined period of time has passed, or gradually makes a sweeping correction up to the final control gain Kb, or makes a sweeping correction up to the final control gain Kb after a predetermined period of time has passed.

Accordingly, the sprung mass damping control system of this seventh example embodiment corrects the control gain Kb when necessary and adjusts the sprung mass damping control amount (i.e., the sprung mass damping control torque Twc), thereby making it possible to avoid amplification of the resonance following execution of sprung mass damping control.

Figure 29:
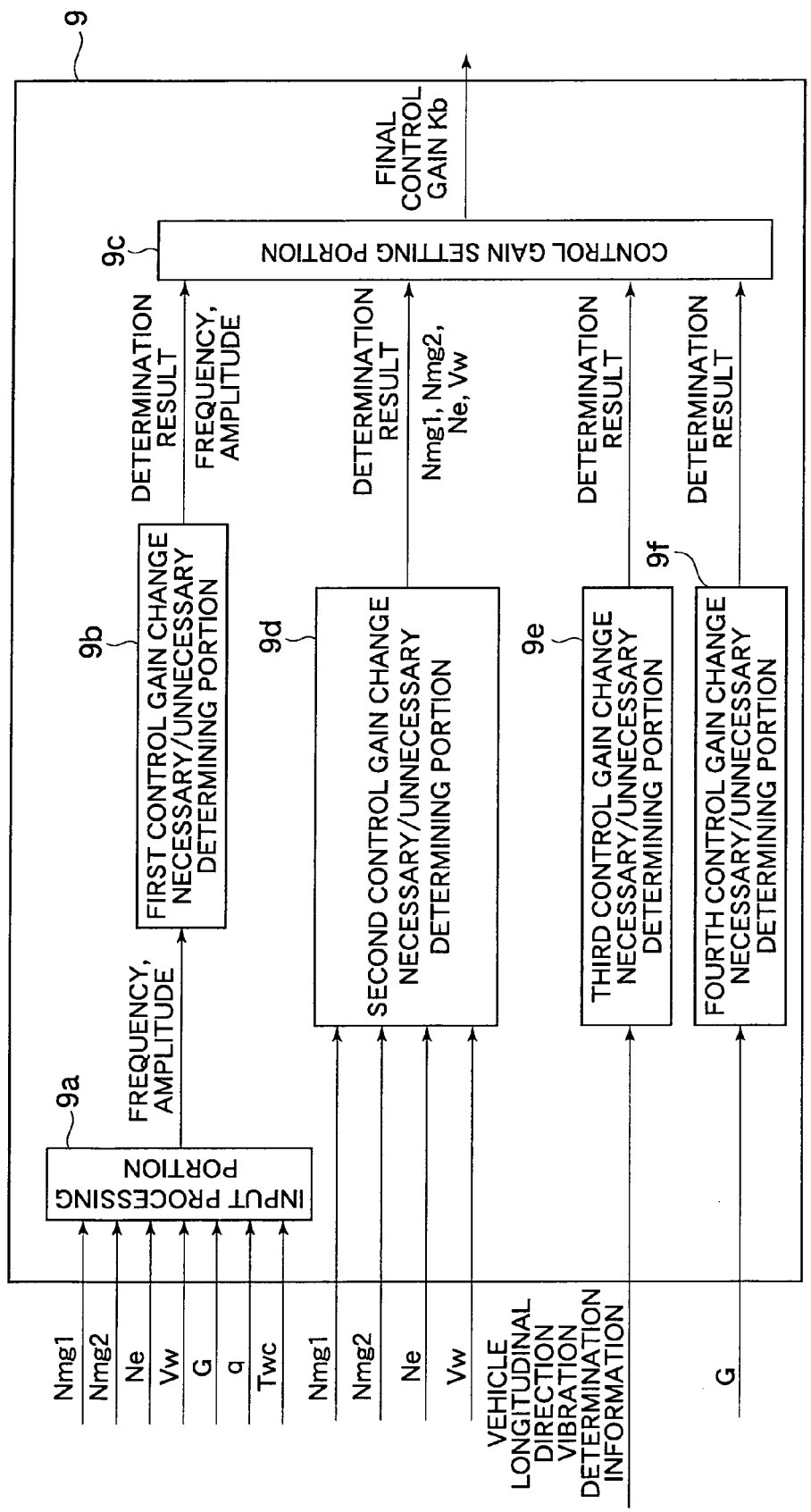
FIG. 29 is a view in the form of control blocks showing a frame format of an example of a sprung mass damping control amount adjusting device of the sprung mass damping control system according to the seventh example embodiment of the invention.
Figure 30:
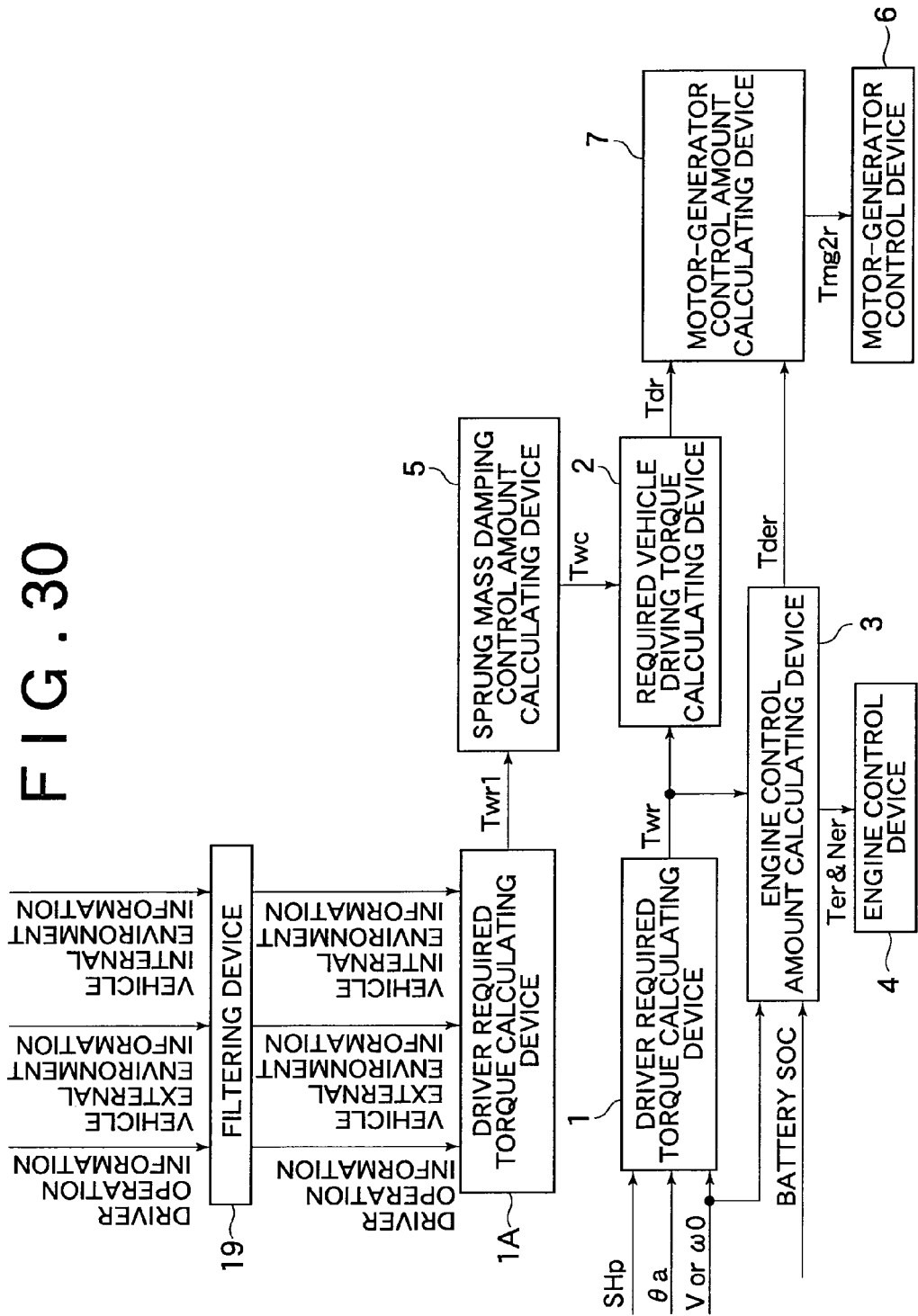
FIG. 30 is a view in the form of control blocks showing a frame format of another example of the functional structure of the sprung mass damping control system according to the seventh example embodiment of the invention.

Here, the input processing portion 9a in FIG. 29 is structured to receive the sprung mass damping control amount (i.e., the sprung mass damping control torque Twc). That is, the sprung mass damping control system of this seventh example embodiment may also analyze the frequency and amplitude of the sprung mass damping control amount (i.e., the sprung mass damping control torque Twc). If i) the analyzed frequency is equal to or greater than a predetermined frequency or that frequency is in a predetermined frequency range, and/or ii) the analyzed amplitude is equal to or greater than a predetermined amplitude, the sprung mass damping control system may determine that the control gain Kb needs to be changed and adjust the sprung mass damping control amount (i.e., the sprung mass damping control torque Twc) by correcting the control gain Kb, just as described above. The sprung mass damping control system of the seventh example embodiment having this structure may also be designed to avoid amplification of the resonance following execution of the sprung mass damping control.

Also, the input processing portion 9a shown in FIG. 29 may also be structured to receive information related to the vehicle longitudinal acceleration G That is, the sprung mass damping control system of this seventh example embodiment may also analyze the frequency and amplitude of the vehicle longitudinal acceleration G. If i) the analyzed frequency is equal to or greater than a predetermined frequency or that frequency is in a predetermined frequency range, and/or ii) the analyzed amplitude is equal to or greater than a predetermined amplitude, the sprung mass damping control system may determine that the control gain Kb needs to be changed and adjust the sprung mass damping control amount (i.e., the sprung mass damping control torque Twc) by correcting the control gain Kb, just as described above. The sprung mass damping control system of the seventh example embodiment having this structure may also be designed to avoid amplification of the resonance following execution of the sprung mass damping control.

Accordingly, in the example described above, the frequency and amplitude of the input signal are analyzed and the determination as to whether the control gain Kb needs to be changed is made based on that analysis. However, this determination may also be made using the input signal itself. For example, the sprung mass damping control amount adjusting device 9 shown in FIG. 29 includes a second control gain change necessary/unnecessary determining portion 9d which determines whether it is necessary to change the control gain Kb of the sprung mass damping control amount based on the input signal. Signals indicative of the motor-generator speed Nmg1 of the first motor-generator 31, the motor-generator speed Nmg2 of the second motor-generator 32, the engine speed Ne, and the wheel speed Vw may be used as the input signals. At least one of these is input. If this input signal is in a predetermined region, the second control gain change necessary/unnecessary determining portion 9d determines that the control gain Kb needs to be changed. If the input signal is not in the predetermined region, the second control gain change necessary/unnecessary determining portion 9d determines that the control gain Kb does not need to be changed. This predetermined region is set for each kind of input signal. For example, at least one of a region in which drive train resonance occurs or a region in which unsprung mass resonance occurs is set in advance.

Here, the determination result of the second control gain change necessary/unnecessary determining portion 9d is output to the control gain setting portion 9c described above which sets the final control gain Kb based on the determination result of the first control gain change necessary/unnecessary determining portion 9b and/or the determination result of the second control gain change necessary/unnecessary determining portion 9d. The control gain setting portion 9c sets a correction gain Kc2 according to the determination result of the second control gain change necessary/unnecessary determining portion 9d. This correction gain Kc2 is used to adjust the control gain Kb, similar to the correction gain Kc1. If it is determined that the control gain Kb does not need to be changed, the correction gain Kc2 is set to 1 (i.e., Kc2=1). If on the other hand it is determined that the control gain Kb needs to be changed, the correction gain Kc2 is set to a value that is less than 1 (i.e., Kc2<1). The correction gain Kc2 in this case may be determined just like the correction gain Kc1. For example, the correction gain Kc2 may be set based on the corresponding input signal (e.g., the motor-generator speed Nmg1 of the first motor-generator 31, the motor-generator speed Nmg2 of the second motor-generator 32, the engine speed Ne, or the wheel speed Vw). Accordingly, the second control gain change necessary/unnecessary determining portion 9d outputs not only that determination result, but also that input signal to the control gain setting portion 9c. If the final control gain Kb is set using only the determination result of the second control gain change necessary/unnecessary determining portion 9d, the control gain setting portion 9c obtains the final control gain Kb by multiplying the control gain Kb by the correction gain Kc2. On the other hand, if the final control gain Kb is set using both the determination result from the first control gain change necessary/unnecessary determining portion 9b and the determination result from the second control gain change necessary/unnecessary determining portion 9d, the control gain setting portion 9c obtains the final control gain Kb by multiplying the control gain Kb, the correction gain Kc1, and the correction gain Kc2 together, for example.

With this structure as well, the sprung mass damping control system of the seventh example embodiment is able to adjust the sprung mass damping control amount (i.e., the sprung mass damping control torque Twc) by correcting the control gain Kb when necessary, and thus avoid amplification of the resonance following execution of sprung mass damping control.

Also, the control gain Kb may be changed when a condition in which vibration in the longitudinal direction of the vehicle may occur is satisfied. The sprung mass damping control amount adjusting device 9 in this seventh example embodiment includes a third control gain change necessary/unnecessary determining portion 9e which determines whether the control gain Kb of the sprung mass damping control amount needs to be changed according to whether that condition is satisfied, as shown in FIG. 29.

Information related to the operating state of the engine 10 may be used as the information related to whether the condition in which vibration in the longitudinal direction of the vehicle may occur (hereinafter, simply referred to as "vehicle longitudinal direction vibration determination information"). For example, the third control gain change necessary/unnecessary determining portion 9e determines that the condition in which vibration in the longitudinal direction of the vehicle may occur is satisfied, and thus determines that the control gain Kb needs to be changed, i) when it obtains information in the form of a flag or the like indicating that the engine 10 is operating, ii) when it obtains information in the form of a flag or the like that the engine 10 is in operating under a load, iii) when it obtains information in the form of a flag or the like indicating that the engine 10 is operating on its own, or iv) when it receives information indicating in the form of a flag or the like that catalyst degradation suppressing control is being executed in the engine 10. In this case, vibration in the longitudinal direction of the vehicle may occur when the engine 10 remains in one of the states described above for a predetermined period of time. Therefore, the determination that the control gain Kb needs to be changed is preferably made when the engine 10 remains in one of those states for a predetermined period of time.

Also, a fluctuation in torque occurs when the engine 10 misfires. Therefore, the third control gain change necessary/unnecessary determining portion 9e may also determine that the condition in which vibration in the longitudinal direction of the vehicle may occur is satisfied, and thus determine that the control gain Kb needs to be changed, when it obtains information in the form of a flag or the like indicating an engine misfire which is also vehicle longitudinal direction vibration determination information.

Vibration in the longitudinal direction of the vehicle may also occur due to drive train resonance. When drive train vibration is generated by that drive train resonance, drive train damping control is performed using the motor-generator torque Tmg1 of the first motor-generator 31 and/or the motor-generator torque Tmg2 of the second motor-generator 32, as described above. Accordingly, the third control gain change necessary/unnecessary determining portion 9e may also determine that the condition in which vibration in the longitudinal direction of the vehicle may occur is satisfied, and thus determine that the control gain Kb needs to be changed, when it obtains information indicating that it is time to execute drive train damping control which is also vehicle longitudinal direction vibration determination information.

The third control gain change necessary/unnecessary determining portion 9e determines whether the condition in which vibration in the longitudinal direction of the vehicle may occur is satisfied based on at least one of the types of information described above. The third control gain change necessary/unnecessary determining portion 9e determines that the control gain Kb needs to be changed when it is determined that that condition is satisfied, and determines that the control gain Kb does not need to be changed when it is determined that that condition is not satisfied. The third control gain change necessary/unnecessary determining portion 9e then outputs that determination result to the control gain setting portion 9c which sets the final control gain Kb based on at least one of the determination result of the first control gain change necessary/unnecessary determining portion 9b, the determination result of the second control gain change necessary/unnecessary determining portion 9d, or the determination result of the third control gain change necessary/unnecessary determining portion 9e. A correction gain Kc3 set by the control gain setting portion 9c so as to correspond to the determination result of the third control gain change necessary/unnecessary determining portion 9e may be determined beforehand according to the various types of information described above so that the same effects that are obtained by the correction gain Kc1 and the like can be obtained. The control gain setting portion 9c selects the appropriate correction gain, from among the correction gains Kc1, Kc2, and Kc3, according to the determination result used, and obtains the final control gain Kb by multiplying the control gain Kb by that selected correction gain.

With this kind of structure as well, the sprung mass damping control system of this seventh example embodiment is able to adjust the sprung mass damping control amount (i.e., the sprung mass damping control torque Twc) by correcting the control gain Kb when necessary, and thus avoid amplification of the resonance following execution of sprung mass damping control.

Also, vibration in the longitudinal direction of the vehicle can also occur when a vehicle longitudinal acceleration G equal to or greater than a predetermined vehicle longitudinal acceleration G is detected. Therefore, at this time it may be determined that the condition in which vibration in the longitudinal direction of the vehicle may occur is satisfied, and thus it may be determined that the control gain Kb needs to be changed. The sprung mass damping control amount adjusting device 9 in FIG. 29 is provided with a fourth control gain change necessary/unnecessary determining portion 9f which makes that determination. Vibration in the longitudinal direction of the vehicle may occur when the vehicle longitudinal acceleration G that is equal to or greater than the predetermined vehicle longitudinal acceleration is repeatedly detected for a predetermined period of time or longer. Therefore, the determination that the control gain Kb needs to be changed may also be made when a vehicle longitudinal acceleration G equal to or greater than a predetermined vehicle longitudinal acceleration G continues to be detected for a predetermined period of time or longer.

This fourth control gain change necessary/unnecessary determining portion 9f determines that the control gain Kb needs to be changed when it is determined that the condition in which vibration in the longitudinal direction of the vehicle may occur is satisfied, and determines that the control gain Kb does not need to be changed when it is determined that the condition in which vibration in the longitudinal direction of the vehicle may occur is not satisfied. The fourth control gain change necessary/unnecessary determining portion 9f then outputs that determination result to the control gain setting portion 9c which sets the final control gain Kb based on at least one of the determination result of the first control gain change necessary/unnecessary determining portion 9b, the determination result of the second control gain change necessary/unnecessary determining portion 9d, the determination result of the third control gain change necessary/unnecessary determining portion 9e, or the determination result of the fourth control gain change necessary/unnecessary determining portion 9f. A correction gain Kc4 set by the control gain setting portion 9c so as to correspond to the determination result of the fourth control gain change necessary/unnecessary determining portion 9f may be determined beforehand according to the vehicle longitudinal acceleration G so that the same effects that are obtained by the correction gain Kc1 and the like can be obtained. The control gain setting portion 9c selects the appropriate correction gain, from among the correction gains Kc1, Kc2, Kc3, and Kc4 according to the determination result used, and obtains the final control gain Kb by multiplying the control gain Kb by that selected correction gain.

With this kind of structure as well, the sprung mass damping control system of this seventh example embodiment is able to adjust the sprung mass damping control amount (i.e., the sprung mass damping control torque Twc) by correcting the control gain Kb when necessary, and thus avoid amplification of the resonance following execution of sprung mass damping control.

Incidentally, in the example shown in FIG. 29, the sprung mass damping control amount (i.e., the sprung mass damping control torque Twc) is adjusted by correcting the control gain Kb. Alternatively, however, that sprung mass damping control amount (i.e., the sprung mass damping control torque Twc) may be adjusted by applying a predetermined filtering process to the input signal of the sprung mass damping control system. This sprung mass damping control system is provided with a filtering device 19 as the sprung mass damping control amount adjusting apparatus, as shown in FIG. 30.

This filtering device 19 applies a filter at a predetermined frequency to the signal input to the driver required torque calculating device, and aims to adjust the sprung mass damping control torque Twc by performing a calculation based on the driver required torque Twr corresponding to the filtered input signal.

Here, in the examples described thus far, when the driver required torque Twr is obtained using the filtered input signal, there ends up being a deviation in the calculation results and the like of the engine control amount, for example. Therefore, in this case, a driver required torque calculating device 1A that is like the driver required torque calculating device 1 is provided, as shown in FIG. 30, and the filtering device 19 is arranged upstream of this driver required torque calculating device 1A. Also, in this case, the driver required torque calculating device 1A outputs its calculation results (i.e., the driver required torque Twr1 corresponding to the filtered input signal) to the sprung mass damping control amount calculating device 5 which then obtains the sprung mass damping control torque Twc (i.e., the sprung mass damping control amount) based on that driver required torque Twr1.

This filtering device 19 receives signals indicative of driver operation information such as information relating to the accelerator operation amount θa, information relating to the environment outside the vehicle (hereinafter referred to as "vehicle external environment information"), and information relating to the environment inside the vehicle (hereinafter referred to as "vehicle internal environment information") as input signals. Here, sprung mass damping control is performed by adjusting the driving torque of the driving wheels, so a signal indicative of the accelerator operation amount θa is input as the signal indicative of the driver operation information. However, if sprung mass damping control is performed by adjusting the driving force, information relating to the brake pedal operation amount may be input as the driver operation information. Also, if sprung mass damping control is performed by adjusting the steering angle of the steered wheels, information relating to the steering operation amount may be input as the driver operation information. Also, the vehicle external environment information is information that may end up applying disturbance to the vehicle. This information may be, for example, weather information indicating rain or snow or the like, or road conditions such as the friction coefficient of the road or the bumpiness of the road. Also, the vehicle internal environment information may be, for example, output information from various sensors (i.e., the wheel speed Vw and the engine speed Ne), occupant information such as the number of people and the like in the vehicle, control information relating to various control systems, and control information of various actuators. In this example, signals indicative of the wheel speed Vw and the engine speed Ne are input as the input signals.

At least one of i) a low-pass filter (LPF) in which a predetermined cutoff frequency is set, ii) a fixed band-cut filter (BCF) that cuts off a predetermined frequency, or iii) a variable BCF that varies the cutoff frequency according to the wheel speed Vw and the engine speed Ne, is used as the filtering device 19. With the LPF, the cutoff frequency is set to prevent amplification of the resonance described above when sprung mass damping control is performed with the sprung mass damping control torque Twc (i.e., the sprung mass damping control amount) set in the sprung mass damping control amount calculating device 5. Also, the cutoff frequencies of the fixed BCF and the variable BCF are set to prevent amplification of the resonance described above when sprung mass damping control is performed with that sprung mass damping control torque Twc (i.e., the sprung mass damping control amount).

With this kind of structure as well, the sprung mass damping control system of this seventh example embodiment is able to appropriately adjust the sprung mass damping control amount (i.e., the sprung mass damping control torque Twc), and is thus able to prevent amplification of the resonance following execution of sprung mass damping control. Also, the fixed BCF and variable BCF will not impair the control performance of sprung mass damping control unless a frequency of around 1.5 Hz of the sprung mass vibration is included in the cutoff frequency, which is helpful.

Here, this filtering device 19 and the sprung mass damping control amount adjusting device 9 described above may be combined and still obtain the same effect.

The seventh example embodiment described above restricts the sprung mass damping control by reducing the sprung mass damping control amount when vibration in the longitudinal direction of the vehicle occurs in the vehicle body. However, another possible way to deal with vibration in the longitudinal direction of the body occurring in the vehicle body is to not only restrict the sprung mass damping control but to prohibit it altogether.

Incidentally, in each of the first to seventh example embodiments described above, the vehicle described is a hybrid vehicle or an electric vehicle that performs sprung mass damping control by controlling the motor-generator control amount of a motor-generator (i.e., the second motor-generator 32) provided as a drive source. However, the invention described in the each of the first to seventh example embodiments is not necessarily limited to this. For example, a motor can be applied instead of the motor-generator. In this type of vehicle, sprung mass damping control may be executed by adjusting the motor control amount (i.e., the driving control amount) of the motor. This sprung mass damping control is executed by a motor control device (i.e., a drive source control device) that controls the motor. Also, a generator capable of operating as a motor may be applied instead of the motor-generator. In this type of vehicle, sprung mass damping control may be executed by adjusting the motor control amount (i.e., the driving control amount) of the generator. This sprung mass damping control is executed by a generator control device (i.e., a drive source control device) that controls the generator.

Further, the structure below may also be added to any one of the sprung mass damping control systems of the first to seventh example embodiments. This added structure is a sprung mass damping control amount adjusting apparatus that adjusts the phase or amplitude of a sprung mass damping control signal related to the sprung mass damping control amount according to the state of the vehicle. More specifically, the motor-generator, a motor, or a generator capable of operating as a motor is driven by a waveform signal, and this sprung mass damping control amount adjusting apparatus adjusts the phase or amplitude of the sprung mass damping control signal related to the sprung mass damping control amount according to the waveform signal (i.e., waveform signal modulation method). When this structure is used, a phase-compensated sprung mass damping control amount is set. For example, when sprung mass damping control is being executed, the second motor-generator 32 is controlled by the modulation method after the switch, so there is a lag in the phase of the sprung mass damping control signal according to the sprung mass damping control torque Twc (i.e., the sprung mass damping control amount). However, this structure advances the phase by the amount of this lag in advance, so variation in the output responsiveness of the sprung mass damping control amount before and after the modulation method is switched is dealt with (eliminated or reduced) in the sprung mass damping control. Therefore, even if the modulation method is switched, it is possible to reduce or eliminate variation in the output responsiveness of the sprung mass damping control amount between modulation methods. Accordingly, the sprung mass damping control system is able to compensate for the variation in the output responsiveness of the sprung mass damping control amount of each modulation method regardless of the type of modulation method. Therefore, a decrease in the damping effect that accompanies a decrease in that output responsiveness can be prevented, such that the desired sprung mass damping control can be executed. Incidentally, the state of the vehicle includes not only the waveform signal (i.e., the waveform signal modulation method) described above, but also i) the operating state such as the speed or the like of the engine 10 (in the case of a gasoline engine, the phase or amplitude of the sprung mass damping control signal is adjusted when the engine 10 is operating at low speed and high torque and the torque gradient at that time is large. In the case of a diesel engine, the phase or amplitude of the sprung mass damping control signal is adjusted when the engine 10 is operating at low speed.), ii) the SOC of the battery 41 (the phase or amplitude of the sprung mass damping control signal is adjusted when the SOC is low.), and iii) the speed of the transmission (the phase or amplitude of the sprung mass damping control signal is adjusted when the speed of the transmission is a low speed) and the like.

In this way, the sprung mass damping control system of a vehicle according to the invention is useful as technology capably of precisely suppressing sprung mass vibration in a vehicle provided with at least a motor-generator as a drive source.

The invention claimed is:

1. A sprung mass damping control system of a vehicle, which is configured to suppress sprung mass vibration generated in a vehicle body of a vehicle provided with at least one of a motor-generator, a motor, or a generator capable of operating as motor, as a drive source, the sprung mass damping control system comprising:
 a sprung mass damping control amount calculating device that sets a sprung mass damping control amount for suppressing the sprung mass vibration;
 a drive source control device that executes sprung mass damping control by controlling a motor-generator control amount of the motor-generator or a motor control amount of the motor or the generator to realize the sprung mass damping control amount, and
 a sprung mass damping control responsiveness compensating device that, when the sprung mass damping control responsiveness decreases due to a smoothing process being performed on the set sprung mass damping control amount, performs a compensating process that compensates for that decrease in order to achieve a desired sprung mass damping control responsiveness.

2. The sprung mass damping control system according to claim 1, wherein, when the vehicle is a hybrid vehicle that is also provided with an engine as a drive source, sprung mass damping control is executed by controlling the motor-generator control amount of the motor-generator or the motor control amount of the motor or the generator even while the engine is operating.

3. The sprung mass damping control system according to claim 1, further comprising:
 a required vehicle driving amount calculating device that overlaps the sprung mass damping control amount with a required vehicle driving amount when setting a final required vehicle driving amount of a hybrid vehicle that is also provided with an engine as the drive source;
 an engine control amount calculating device that sets an engine control amount of the engine; and
 a motor-generator control amount calculating device that calculates the motor-generator control amount of the motor-generator by subtracting the engine control amount from the final required vehicle driving amount, or calculates the motor control amount of the motor or the generator by subtracting the engine control amount from the final required vehicle driving amount.

4. The sprung mass damping control system according to claim 1, further comprising:
 a required vehicle driving amount calculating device that overlaps the sprung mass damping control amount with the required vehicle driving amount before a basic performance compensating amount of the hybrid vehicle is overlapped with the required vehicle driving amount, when setting a final required vehicle driving amount of a hybrid vehicle that is also provided with an engine as the drive source.

5. The sprung mass damping control system according to claim 1, wherein the vehicle is a hybrid vehicle that is also provided with an engine as the drive source, and the sprung mass damping control using the motor-generator, the motor, or the generator is executed in a region where sprung mass damping control is not possible using the engine.

6. The sprung mass damping control system according to claim 1, wherein the compensating process for the sprung mass damping control responsiveness is a process in which the set sprung mass damping control amount is input to an inverse function of a transfer function of the smoothing process, or a process that compensates for a phase lag amount of the sprung mass damping control amount that results from the smoothing process.

7. A sprung mass damping control system of a vehicle, which is configured to suppress sprung mass vibration generated in a vehicle body of a vehicle provided with at least one of a motor-generator, a motor, or a generator capable of operating as motor, as a drive source, the sprung mass damping control system comprising:
 a sprung mass damping control amount calculating device that sets a sprung mass damping control amount for suppressing the sprung mass vibration; and
 a drive source control device that executes sprung mass damping control by controlling a motor-generator control amount of the motor-generator or a motor control amount of the motor or the generator to realize the sprung mass damping control amount, wherein
 i) when the motor-generator control amount is a value that is the same as or close to a voltage increase determining threshold value of a system voltage of an inverter, sprung mass damping control using the motor-generator is restricted by prohibiting sprung mass damping control using the motor-generator or by reducing the sprung mass damping control amount, or
 ii) when the motor control amount is a value that is the same as or close to a voltage increase determining threshold value of a system voltage of an inverter, sprung mass damping control using the motor or the generator is restricted by prohibiting sprung mass damping control using the motor or the generator or by reducing the sprung mass damping control amount.

8. The sprung mass damping control system according to claim 7, wherein a voltage increase determining threshold value of a system voltage of an inverter is changed according to whether sprung mass damping control using the motor-generator, the motor, or the generator is being executed.

9. A sprung mass damping control system of a vehicle, which is configured to suppress sprung mass vibration generated in a vehicle body of a vehicle provided with at least one of a motor-generator, a motor, or a generator capable of operating as motor, as a drive source, the sprung mass damping control system comprising:
 a sprung mass damping control amount calculating device that sets a sprung mass damping control amount for suppressing the sprung mass vibration; and
 a drive source control device that executes sprung mass damping control by controlling a motor-generator control amount of the motor-generator or a motor control amount of the motor or the generator to realize the sprung mass damping control amount, wherein the control mode of sprung mass damping control is determined according to the usage state of the motor-generator, the motor, or the generator, wherein the usage state of the motor-generator, the motor, or the generator is a state in which output of the motor-generator, the motor, or the generator is being used to execute damping control other than the sprung mass damping control, wherein the other damping control is drive train damping control that suppresses drive train vibration in the vehicle, and when the drive train damping control is executed simultaneously with sprung mass damping control using the motor-generator, the motor, or the generator, sprung mass damping control using the motor-generator, the motor, or the generator is restricted by prohibiting sprung mass damping control using the motor-generator, the motor, or the generator, or by reducing the sprung mass damping control amount.

10. The sprung mass damping control system according to claim 9, wherein when motor load ratio restricting control of the motor-generator, the motor, or the generator is being executed, sprung mass damping control using the motor-generator, the motor, or the generator is restricted by prohibiting sprung mass damping control using the motor-generator, the motor, or the generator, or by reducing the sprung mass damping control amount.

11. A sprung mass damping control system of a vehicle, which is configured to suppress sprung mass vibration generated in a vehicle body of a vehicle provided with at least one of a motor-generator, a motor, or a generator capable of operating as motor, as a drive source, the sprung mass damping control system comprising:
 a sprung mass damping control amount calculating device that sets a sprung mass damping control amount for suppressing the sprung mass vibration; and
 a drive source control device that executes sprung mass damping control by controlling a motor-generator control amount of the motor-generator or a motor control amount of the motor or the generator to realize the sprung mass damping control amount, wherein
 the control mode of sprung mass damping control is determined according to the usage state of the motor-generator, the motor, or the generator,
 wherein the vehicle is a hybrid vehicle that is also provided with an engine as the drive source, sprung mass damping control using the motor-generator, the motor, or the generator is restricted by prohibiting sprung mass damping control using the motor-generator, the motor, or the generator, or by reducing the sprung mass damping control amount, when a crank angle position is being controlled using output from the motor-generator, the motor, or the generator while the engine is stopped.

12. The spring mass damping control system according to claim 11, wherein when motor load ratio restricting control of the motor-generator, the motor, or the generator is being executed, sprung mass damping control using the motor-generator, the motor, or the generator is restricted by prohibiting sprung mass damping control using the motor-generator, the motor, or the generator, or by reducing the sprung mass damping control amount.

13. A sprung mass damping control system of a vehicle, which is configured to suppress sprung mass vibration generated in a vehicle body of a vehicle provided with at least one of a motor-generator, a motor, or a generator capable of operating as motor, as a drive source, the sprung mass damping control system comprising:
 a sprung mass damping control amount calculating device that sets a sprung mass damping control amount for suppressing the sprung mass vibration; and
 a drive source control device that executes sprung mass damping control by controlling a motor-generator control amount of the motor-generator or a motor control amount of the motor or the generator to realize the sprung mass damping control amount,
 wherein, when there is a possibility of resonance that accompanies execution of the sprung mass damping control being amplified, sprung mass damping control using the motor-generator, the motor, or the generator is restricted by prohibiting sprung mass damping control using the motor-generator, the motor, or the generator, or by reducing the sprung mass damping control amount,
 wherein the vehicle is a hybrid vehicle that is also provided with an engine as the drive source, and there is a possibility of resonance that accompanies execution of the sprung mass damping control being amplified when i) there is a misfire in the engine, ii) catalyst degradation suppressing control of the engine is being executed, or iii) the speed of the engine is being controlled by the output of the motor-generator, the motor, or the generator.

14. The sprung mass damping control system according to claim 13, wherein there is a possibility of resonance that accompanies execution of the sprung mass damping control being amplified when the speed of the drive source is within a predetermined range.

15. The sprung mass damping control system according to claim 13, wherein the sprung mass damping control is restricted by filtering an input signal to the sprung mass damping control amount calculating device at a predetermined frequency.

\* \* \* \* \*